United States Patent
Shimezawa et al.

(10) Patent No.: US 9,844,039 B2
(45) Date of Patent: *Dec. 12, 2017

(54) TERMINAL, BASE STATION, AND COMMUNICATION METHOD

(71) Applicant: Sharp Kabushiki Kaisha, Osaka-shi, Osaka (JP)

(72) Inventors: Kazuyuki Shimezawa, Osaka (JP); Toshizo Nogami, Osaka (JP); Alvaro Ruiz Delgado, Osaka (JP); Naoki Kusashima, Osaka (JP); Takashi Hayashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 89 days.

This patent is subject to a terminal disclaimer.

(21) Appl. No.: 15/024,489

(22) PCT Filed: Sep. 22, 2014

(86) PCT No.: PCT/JP2014/075126
§ 371 (c)(1),
(2) Date: Mar. 24, 2016

(87) PCT Pub. No.: WO2015/046165
PCT Pub. Date: Apr. 2, 2015

(65) Prior Publication Data
US 2016/0234833 A1    Aug. 11, 2016

(30) Foreign Application Priority Data

Sep. 26, 2013 (JP) .................................. 2013-199906

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1812* (2013.01); *H04L 5/0053* (2013.01);
(Continued)

(58) Field of Classification Search
CPC ............. H04W 72/0413; H04W 72/04; H04W 72/0446; H04W 88/02; H04W 88/08;
(Continued)

(56) References Cited

U.S. PATENT DOCUMENTS

| | | | | |
|---|---|---|---|---|
| 2014/0126491 A1* | 5/2014 | Ekpenyong | ........... | H04L 5/0055 370/329 |
| 2014/0269338 A1* | 9/2014 | Jung | ..................... | H04L 5/0055 370/241 |
| 2015/0103792 A1* | 4/2015 | Zhang | .................. | H04L 1/1822 370/329 |

FOREIGN PATENT DOCUMENTS

WO    2012/106840 A1    8/2012

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, Jun. 2013, pp. 1-108.
(Continued)

*Primary Examiner* — Obaidul Huq
(74) *Attorney, Agent, or Firm* — Keating & Bennett, LLP

(57) ABSTRACT

A terminal communicates with a base station and includes a transmission unit that transmits a physical uplink control channel by using a physical uplink control channel resource for transmitting HARQ-ACK in a subframe n. The physical uplink control channel resource is given by at least a value of a first control channel element used for transmitting a corresponding physical downlink control channel or a corresponding extended physical downlink control channel, in a subframe n-k. The physical uplink control channel
(Continued)

resource is given by a first arithmetic operation when a value of the element k is the same as a value of an element in a first set. The physical uplink control channel resource is given by a second arithmetic operation when a value of the element k is the same as a value of an element in a second set.

10 Claims, 22 Drawing Sheets

(51) Int. Cl.
  *H04L 5/00* (2006.01)
  *H04L 5/14* (2006.01)
  *H04L 1/00* (2006.01)
  *H04W 88/02* (2009.01)
  *H04W 88/08* (2009.01)
(52) U.S. Cl.
  CPC ............ *H04L 5/0055* (2013.01); *H04L 5/14* (2013.01); *H04L 5/1469* (2013.01); *H04W 72/04* (2013.01); *H04W 72/0446* (2013.01); *H04L 1/00* (2013.01); *H04W 88/02* (2013.01); *H04W 88/08* (2013.01)

(58) Field of Classification Search
  CPC ... H04L 1/1812; H04L 5/0053; H04L 5/0055; H04L 5/14; H04L 5/1469; H04L 1/00
  USPC ......................................... 370/310, 328, 329
  See application file for complete search history.

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, pp. 1-176.
Samsung, "On PDSCH HARQ transmission", 3GPP TSG RAN WG1 #74, R1-133095, Aug. 19-23, 2013, pp. 1-4.
Intel Corporation, "HARQ aspect for TDD eIMTA", 3GPP TSG RAN WG1 #74, R1-132927, Aug. 19-23, 2013, pp. 1-4.
Shimezawa et al. "Terminal, Base Station, and Communication Method", U.S. Appl. No. 15/022,607, filed Mar. 17, 2016.

* cited by examiner

FIG. 10

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

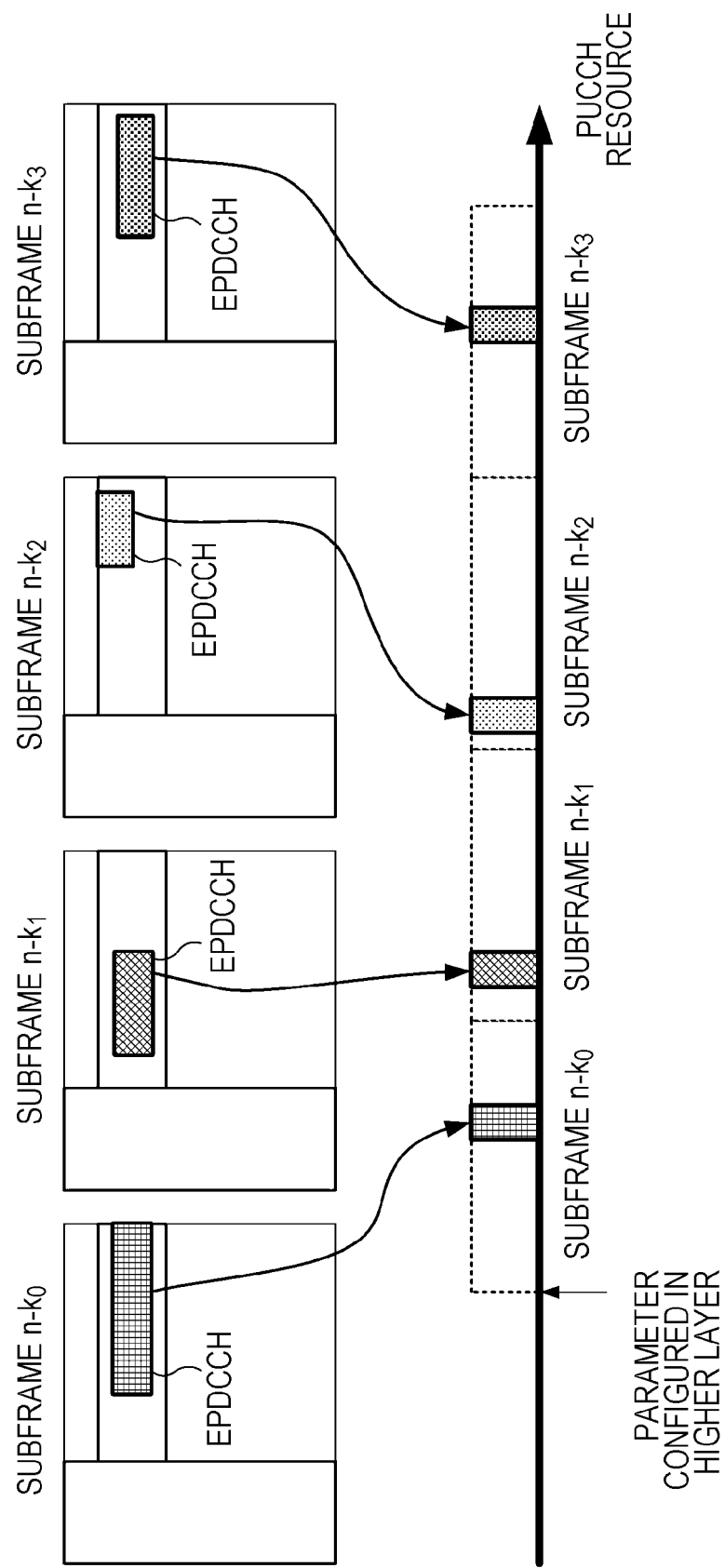

FIG. 13

| UL/DL CONFIGURATION 1 | UL/DL CONFIGURATION 2 | \multicolumn{10}{c}{Subframe n} |
|---|---|---|---|---|---|---|---|---|---|---|---|

| UL/DL CONFIGURATION 1 | UL/DL CONFIGURATION 2 | 0 | 1 | 2 | 3 | 4 | 5 | 6 | 7 | 8 | 9 |
|---|---|---|---|---|---|---|---|---|---|---|---|
| 0 | 0 | D | S | U | U | U | D | S | U | U | U |
| 0 | 1 | D | S | U | U | F | D | S | U | U | F |
| 0 | 2 | D | S | U | F | F | D | S | U | F | F |
| 0 | 3 | D | S | U | U | U | D | S | F | F | F |
| 0 | 4 | D | S | U | U | F | D | S | F | F | F |
| 0 | 5 | D | S | U | F | F | D | S | F | F | F |
| 0 | 6 | D | S | U | U | U | D | S | U | U | F |
| 1 | 0 | D | S | U | U | D | D | S | U | U | D |
| 1 | 1 | D | S | U | U | D | D | S | U | U | D |
| 1 | 2 | D | S | U | F | D | D | S | U | F | D |
| 1 | 3 | D | S | U | U | D | D | S | F | F | D |
| 1 | 4 | D | S | U | U | D | D | S | F | F | D |
| 1 | 5 | D | S | U | F | D | D | S | F | F | D |
| 1 | 6 | D | S | U | U | D | D | S | U | U | D |
| 2 | 0 | D | S | U | D | D | D | S | U | D | D |
| 2 | 1 | D | S | U | D | D | D | S | U | D | D |
| 2 | 2 | D | S | U | D | D | D | S | U | D | D |
| 2 | 3 | D | S | U | D | D | D | S | F | D | D |
| 2 | 4 | D | S | U | D | D | D | S | F | D | D |
| 2 | 5 | D | S | U | D | D | D | S | F | D | D |
| 2 | 6 | D | S | U | D | D | D | S | U | D | D |
| 3 | 0 | D | S | U | U | U | D | D | D | D | D |
| 3 | 1 | D | S | U | U | F | D | D | D | D | D |
| 3 | 2 | D | S | U | F | F | D | D | D | D | D |
| 3 | 3 | D | S | U | U | U | D | D | D | D | D |
| 3 | 4 | D | S | U | U | F | D | D | D | D | D |
| 3 | 5 | D | S | U | F | F | D | D | D | D | D |
| 3 | 6 | D | S | U | U | U | D | D | D | D | D |
| 4 | 0 | D | S | U | U | D | D | D | D | D | D |
| 4 | 1 | D | S | U | U | D | D | D | D | D | D |
| 4 | 2 | D | S | U | F | D | D | D | D | D | D |
| 4 | 3 | D | S | U | U | D | D | D | D | D | D |
| 4 | 4 | D | S | U | U | D | D | D | D | D | D |
| 4 | 5 | D | S | U | F | D | D | D | D | D | D |
| 4 | 6 | D | S | U | U | D | D | D | D | D | D |
| 5 | 0 | D | S | U | D | D | D | D | D | D | D |
| 5 | 1 | D | S | U | D | D | D | D | D | D | D |
| 5 | 2 | D | S | U | D | D | D | D | D | D | D |
| 5 | 3 | D | S | U | D | D | D | D | D | D | D |
| 5 | 4 | D | S | U | D | D | D | D | D | D | D |
| 5 | 5 | D | S | U | D | D | D | D | D | D | D |
| 5 | 6 | D | S | U | D | D | D | D | D | D | D |
| 6 | 0 | D | S | U | U | U | D | S | U | U | D |
| 6 | 1 | D | S | U | U | F | D | S | U | U | D |
| 6 | 2 | D | S | U | F | F | D | S | U | F | D |
| 6 | 3 | D | S | U | U | U | D | S | F | F | D |
| 6 | 4 | D | S | U | U | F | D | S | F | F | D |
| 6 | 5 | D | S | U | F | F | D | S | F | F | D |
| 6 | 6 | D | S | U | U | U | D | S | U | U | D |

FIG. 14

| UL/DL CONFIGURATION 1 | UL/DL CONFIGURATION 2 | \multicolumn{10}{c}{Subframe n} |
|---|---|---|---|---|---|---|---|---|---|---|---|
| | | 0 | 1 | 2 | 3 | 4 | 5 | 6 | 7 | 8 | 9 |
| 0 | 0 | | | 6 | | 4 | | | 6 | | 4 |
| 0 | 1 | | | 7,6 | 4 | | | | 7,6 | 4 | |
| 0 | 2 | | | 7,6,4,8 | | | | | 7,6,4,8 | | |
| 0 | 3 | | | 7,11,5 | 7,5 | 4,5 | | | | | |
| 0 | 4 | | | 12,11,5,8 | 8,7,4,5 | | | | | | |
| 0 | 5 | | | 12,7,11,6,13,4,5,8,9 | | | | | | | |
| 0 | 6 | | | 7,6 | 4 | 4 | | | 6 | | |
| 1 | 0 | | | 7,6 | 4 | | | | 7,6 | 4 | |
| 1 | 1 | | | 7,6 | 4 | | | | 7,6 | 4 | |
| 1 | 2 | | | 8,7,6,4 | | | | | 8,7,6,4 | | |
| 1 | 3 | | | 12,8,7,11,6,4,5 | 4 | | | | | | |
| 1 | 4 | | | 12,8,7,11,6,4,5 | 4 | | | | | | |
| 1 | 5 | | | 13,12,8,7,11,6,4,5,9 | | | | | | | |
| 1 | 6 | | | 7,6 | 4 | | | | 7,6 | 4 | |
| 2 | 0 | | | 8,7,4,6 | | | | | 8,7,4,6 | | |
| 2 | 1 | | | 8,7,4,6 | | | | | 8,7,4,6 | | |
| 2 | 2 | | | 8,7,4,6 | | | | | 8,7,4,6 | | |
| 2 | 3 | | | 13,12,9,8,7,4,11,6,5 | | | | | | | |
| 2 | 4 | | | 13,12,9,8,7,4,11,6,5 | | | | | | | |
| 2 | 5 | | | 13,12,9,8,7,4,11,6,5 | | | | | | | |
| 2 | 6 | | | 8,7,4,6 | | | | | 8,7,4,6 | | |
| 3 | 0 | | | 7,6,11 | 6,5 | 5,4 | | | | | |
| 3 | 1 | | | 12,7,11,8 | 6,5,4,7 | | | | | | |
| 3 | 2 | | | 13,12,7,6,5,4,11,8,9 | | | | | | | |
| 3 | 3 | | | 7,6,11 | 6,5 | 5,4 | | | | | |
| 3 | 4 | | | 12,7,11,8 | 6,5,4,7 | | | | | | |
| 3 | 5 | | | 13,12,7,6,5,4,11,8,9 | | | | | | | |
| 3 | 6 | | | 7,6,11 | 6,5 | 5,4 | | | | | |
| 4 | 0 | | | 12,8,7,11 | 6,5,4,7 | | | | | | |
| 4 | 1 | | | 12,8,7,11 | 6,5,4,7 | | | | | | |
| 4 | 2 | | | 13,12,8,7,5,4,11,6,9 | | | | | | | |
| 4 | 3 | | | 12,8,7,11 | 6,5,4,7 | | | | | | |
| 4 | 4 | | | 12,8,7,11 | 6,5,4,7 | | | | | | |
| 4 | 5 | | | 13,12,8,7,5,4,11,6,9 | | | | | | | |
| 4 | 6 | | | 12,8,7,11 | 6,5,4,7 | | | | | | |
| 5 | 0 | | | 13,12,9,8,7,5,4,11,6 | | | | | | | |
| 5 | 1 | | | 13,12,9,8,7,5,4,11,6 | | | | | | | |
| 5 | 2 | | | 13,12,9,8,7,5,4,11,6 | | | | | | | |
| 5 | 3 | | | 13,12,9,8,7,5,4,11,6 | | | | | | | |
| 5 | 4 | | | 13,12,9,8,7,5,4,11,6 | | | | | | | |
| 5 | 5 | | | 13,12,9,8,7,5,4,11,6 | | | | | | | |
| 5 | 6 | | | 13,12,9,8,7,5,4,11,6 | | | | | | | |
| 6 | 0 | | | 7 | 7 | 5 | | | 7 | 7 | |
| 6 | 1 | | | 7 | 4,7 | | | | 7 | 7,4 | |
| 6 | 2 | | | 7,6,4,8 | | | | | 8,7,6,4 | | |
| 6 | 3 | | | 7,11,5 | 7,5 | 5,4 | | | | | |
| 6 | 4 | | | 12,7,11,8 | 4,7,5,6 | | | | | | |
| 6 | 5 | | | 13,12,7,11,6,4,5,8,9 | | | | | | | |
| 6 | 6 | | | 7 | 7 | 5 | | | 7 | 7 | |

FIG. 15

| PDCCH | $n^{(1)}_{\text{PUCCH},i} = (M - i - 1) \cdot N_c + i \cdot N_{c+1} + n_{\text{CCE},i} + N^{(1)}_{\text{PUCCH}}$ ···EXPRESSION(a) |
|---|---|
| EPDCCH | CASE OF DISTRIBUTED TRANSMISSION<br>$n^{(1)}_{\text{PUCCH},i} = n_{\text{ECCE},q} + \sum_{i1=0}^{i-1} N_{\text{ECCE},q,n-k_{i1}} + \Delta_{ARO} + N^{(e1)}_{\text{PUCCH},q}$ ···EXPRESSION(b-1)<br><br>CASE OF LOCALIZED TRANSMISSION<br>$n^{(1)}_{\text{PUCCH},i} = \left\lfloor \dfrac{n_{\text{ECCE},q}}{N^{\text{ECCE},q}_{RB}} \right\rfloor \cdot N^{\text{ECCE},q}_{RB} + \sum_{i1=0}^{i-1} N_{\text{ECCE},q,n-k_{i1}} + n' + \Delta_{ARO} + N^{(e1)}_{\text{PUCCH},q}$ ···EXPRESSION(b-2) |

WHERE, c IS SELECTED FROM {0, 1, 2, 3} SO AS TO SATISFY $N_c \le n_{\text{CCE},i} < N_{c+1}$ , $N_c = \max\left\{0, \left\lfloor N^{DL}_{RB} \cdot (N^{RB}_{sc} \cdot c - 4)/36 \right\rfloor\right\}$.

FIG. 16

| UL/DL CONFIGURATION 1 | UL/DL CONFIGURATION 2 | Set 1 Subframe n | | | | | | | | | | Set 2 Subframe n | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| 0 | 0 | | | 6 | | 4 | | | 6 | | 4 | | | | | | | | | | |
| | 1 | | | 7,6 | | | | | 7,6 | | | | | | 4 | | | | | 4 | |
| | 2 | | | 7,6 | | | | | 7,6 | | | | | 4,8 | | | | | 4,8 | | |
| | 3 | | | 7,11 | 7 | 4 | | | | | | | | 5 | 5 | 5 | | | | | |
| | 4 | | | 12,11 | 8,7 | | | | | | | | | 5,8 | 4,5, | | | | | | |
| | 5 | | | 12,7,11,6 | | | | | | | | | | 13,4,5,8,9 | | | | | | | |
| | 6 | | | 7,6 | | 4 | | | 6 | | | | | 4 | | | | | | | |
| 1 | 0 | | | 7,6 | 4 | | | | 7,6 | 4 | | | | | | | | | | | |
| | 1 | | | 7,6 | 4 | | | | 7,6 | 4 | | | | | | | | | | | |
| | 2 | | | 8,7,6 | | | | | 8,7,6 | | | | | 4 | | | | | 4 | | |
| | 3 | | | 12,8,7,11,6 | 4 | | | | | | | | | 4,5 | | | | | | | |
| | 4 | | | 12,8,7,11,6 | 4 | | | | | | | | | 4,5 | | | | | | | |
| | 5 | | | 13,12,8,7,11,6 | | | | | | | | | | 4,5,9 | | | | | | | |
| | 6 | | | 7,6 | 4 | | | | 7,6 | 4 | | | | | | | | | | | |
| 2 | 0 | | | 8,7,4,6 | | | | | 8,7,4,6 | | | | | | | | | | | | |
| | 1 | | | 8,7,4,6 | | | | | 8,7,4,6 | | | | | | | | | | | | |
| | 2 | | | 8,7,4,6 | | | | | 8,7,4,6 | | | | | | | | | | | | |
| | 3 | | | 13,12,9,8,7,4,11,6 | | | | | | | | | | 5 | | | | | | | |
| | 4 | | | 13,12,9,8,7,4,11,6 | | | | | | | | | | 5 | | | | | | | |
| | 5 | | | 13,12,9,8,7,4,11,6 | | | | | | | | | | 5 | | | | | | | |
| | 6 | | | 8,7,4,6 | | | | | 8,7,4,6 | | | | | | | | | | | | |
| 3 | 0 | | | 7,6,11 | 6,5 | 5,4 | | | | | | | | | | | | | | | |
| | 1 | | | 12,7,11 | 6,5,4,7 | | | | | | | | | 8 | | | | | | | |
| | 2 | | | 13,12,7,6,5,4,11 | | | | | | | | | | 8,9 | | | | | | | |
| | 3 | | | 7,6,11 | 6,5 | 5,4 | | | | | | | | | | | | | | | |
| | 4 | | | 12,7,11 | 6,5,4,7 | | | | | | | | | 8 | | | | | | | |
| | 5 | | | 13,12,7,6,5,4,11 | | | | | | | | | | 8,9 | | | | | | | |
| | 6 | | | 7,6,11 | 6,5 | 5,4 | | | | | | | | | | | | | | | |
| 4 | 0 | | | 12,8,7,11 | 6,5,4,7 | | | | | | | | | | | | | | | | |
| | 1 | | | 12,8,7,11 | 6,5,4,7 | | | | | | | | | | | | | | | | |
| | 2 | | | 13,12,8,7,5,4,11,6 | | | | | | | | | | 9 | | | | | | | |
| | 3 | | | 12,8,7,11 | 6,5,4,7 | | | | | | | | | | | | | | | | |
| | 4 | | | 12,8,7,11 | 6,5,4,7 | | | | | | | | | | | | | | | | |
| | 5 | | | 13,12,8,7,5,4,11,6 | | | | | | | | | | 9 | | | | | | | |
| | 6 | | | 12,8,7,11 | 6,5,4,7 | | | | | | | | | | | | | | | | |
| 5 | 0 | | | 13,12,9,8,7,5,4,11,6 | | | | | | | | | | | | | | | | | |
| | 1 | | | 13,12,9,8,7,5,4,11,6 | | | | | | | | | | | | | | | | | |
| | 2 | | | 13,12,9,8,7,5,4,11,6 | | | | | | | | | | | | | | | | | |
| | 3 | | | 13,12,9,8,7,5,4,11,6 | | | | | | | | | | | | | | | | | |
| | 4 | | | 13,12,9,8,7,5,4,11,6 | | | | | | | | | | | | | | | | | |
| | 5 | | | 13,12,9,8,7,5,4,11,6 | | | | | | | | | | | | | | | | | |
| | 6 | | | 13,12,9,8,7,5,4,11,6 | | | | | | | | | | | | | | | | | |
| 6 | 0 | | | 7 | 7 | 5 | | | 7 | 7 | | | | | | | | | | | |
| | 1 | | | 7 | 4,7 | | | | 7 | 7 | | | | | | | | | | 4 | |
| | 2 | | | 7,6 | | | | | 8,7,6 | | | | | 4,8 | | | | | 4 | | |
| | 3 | | | 7,11 | 7 | 5,4 | | | | | | | | 5 | 5 | | | | | | |
| | 4 | | | 12,7,11 | 4,7 | | | | | | | | | 8 | 5,6 | | | | | | |
| | 5 | | | 13,12,7,11,6 | | | | | | | | | | 4,5,8,9 | | | | | | | |
| | 6 | | | 7 | 7 | 5 | | | 7 | 7 | | | | | | | | | | | |

FIG. 17

| | | |
|---|---|---|
| PDCCH | FIRST SET | $n^{(1)}_{PUCCH,i} = (M_a - i - 1) \cdot N_c + i \cdot N_{c+1} + n_{CCE,i} + N^{(1)}_{PUCCH}$ ...EXPRESSION(a-1) |
| | SECOND SET | $n^{(1)}_{PUCCH,i} = M_a \cdot N_3 + (M_b - (i - M_a) - 1) \cdot N_c + (i - M_a) \cdot N_{c+1} + n_{CCE,i} + N^{(1)}_{PUCCH}$ ...EXPRESSION(a-2) <br> or <br> $n^{(1)}_{PUCCH,i} = M_a \cdot N_3 + (M - i - 1) \cdot N_c + (i - M_a) \cdot N_{c+1} + n_{CCE,i} + N^{(1)}_{PUCCH}$ |
| EPDCCH | FIRST SET AND SECOND SET | CASE OF DISTRIBUTED TRANSMISSION <br> $n^{(1)}_{PUCCH,i} = n_{ECCE,q} + \sum_{i1=0}^{i-1} N_{ECCE,q,n-k_{i1}} + \Delta_{ARO} + N^{(e1)}_{PUCCH,q}$ ...EXPRESSION(b-1) <br> CASE OF LOCALIZED TRANSMISSION <br> $n^{(1)}_{PUCCH,i} = \left\lfloor \frac{n_{ECCE,q}}{N_{RB}^{ECCE,q}} \right\rfloor \cdot N_{RB}^{ECCE,q} + \sum_{i1=0}^{i-1} N_{ECCE,q,n-k_{i1}} + n' + \Delta_{ARO} + N^{(e1)}_{PUCCH,q}$ ...EXPRESSION(b-2) |

WHERE, c IS SELECTED FROM {0, 1, 2, 3} SO AS TO SATISFY $N_c \leq n_{CCE,i} < N_{c+1}$, $N_c = \max\left\{0, \left\lfloor [N^{DL}_{RB} \cdot (N^{RB}_{sc} \cdot c - 4)]/36 \right\rfloor\right\}$.

FIG. 18

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 4 | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 19

| (UL/DL CONFIGURATION 1, UL/DL CONFIGURATION 2) | REFERENCE UL/DL CONFIGURATION |
|---|---|
| (0,0) | 0 |
| (0,1), (1,0), (1,1), (1,6), (6,1) | 1 |
| (0,2), (1,2), (2,0), (2,1), (2,2), (2,6), (6,2) | 2 |
| (0,3), (3,0), (3,3), (3,6), (6,3) | 3 |
| (0,4), (1,3), (1,4), (3,1), (3,4), (4,0), (4,1), (4,3), (4,4), (4,6), (6,4) | 4 |
| (0,5), (1,5), (2,3), (2,4), (2,5), (3,2), (3,5), (4,2), (4,5), (5,0), (5,1), (5,2), (5,3), (5,4), (5,5), (5,6), (6,5) | 5 |
| (0,6), (6,0), (6,6) | 6 |

FIG. 20

| UL/DL CONFIGURATION 1 | UL/DL CONFIGURATION 2 | Set 1 Subframe n | | | | | | | | | | Set 2 Subframe n | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| 0 | 0 | | | 6 | | 4 | | | 6 | | 4 | | | | | | | | | | |
| | 1 | | | 6 | | | | | 6 | | | | | 7 | 4 | | | | 7 | 4 | |
| | 2 | | | 6 | | | | | 6 | | | | | 7,4,8 | | | | | 7,4,8 | | |
| | 3 | | | 6 | | 4 | | | | | | | | 7,11 | 5,6 | 5 | | | | | |
| | 4 | | | 6 | | | | | | | | | | 12,11,8 | 8,4,5,6 | | | | | | |
| | 5 | | | 6 | | | | | | | | | | 12,7,11,13,4,5,8,9 | | | | | | | |
| | 6 | | | 6 | | 4 | | | 6 | | | | | 7 | 4 | | | | | | |
| 1 | 0 | | | 7,6 | 4 | | | | 7,6 | 4 | | | | | | | | | | | |
| | 1 | | | 7,6 | 4 | | | | 7,6 | 4 | | | | | | | | | | | |
| | 2 | | | 7,6 | | | | | 7,6 | | | | | 8,4 | | | | | 8,4 | | |
| | 3 | | | 7,6 | 4 | | | | | | | | | 12,11 | 9,5,6 | | | | | | |
| | 4 | | | 7,6 | 4 | | | | | | | | | 12,11 | 9,5,6 | | | | | | |
| | 5 | | | 7,6 | | | | | | | | | | 13,12,8,11,4,5,9 | | | | | | | |
| | 6 | | | 7,6 | 4 | | | | 7,6 | 4 | | | | | | | | | | | |
| 2 | 0 | | | 8,7,4,6 | | | | | 8,7,4,6 | | | | | | | | | | | | |
| | 1 | | | 8,7,4,6 | | | | | 8,7,4,6 | | | | | | | | | | | | |
| | 2 | | | 8,7,4,6 | | | | | 8,7,4,6 | | | | | | | | | | | | |
| | 3 | | | 8,7,4,6 | | | | | | | | | | 13,12,9,11,5 | | | | | | | |
| | 4 | | | 8,7,4,6 | | | | | | | | | | 13,12,9,11,5 | | | | | | | |
| | 5 | | | 8,7,4,6 | | | | | | | | | | 13,12,9,11,5 | | | | | | | |
| | 6 | | | 8,7,4,6 | | | | | 8,7,4,6 | | | | | | | | | | | | |
| 3 | 0 | | | 7,6,11 | 6,5 | 5,4 | | | | | | | | | | | | | | | |
| | 1 | | | 7,6,11 | 6,5 | | | | | | | | | 12 | 4,9 | | | | | | |
| | 2 | | | 7,6,11 | | | | | | | | | | 13,12,5,4,8,9 | | | | | | | |
| | 3 | | | 7,6,11 | 6,5 | 5,4 | | | | | | | | | | | | | | | |
| | 4 | | | 7,6,11 | 6,5 | | | | | | | | | 12 | 4,9 | | | | | | |
| | 5 | | | 7,6,11 | | | | | | | | | | 13,12,5,4,8,9 | | | | | | | |
| | 6 | | | 7,6,11 | 6,5 | 5,4 | | | | | | | | | | | | | | | |
| 4 | 0 | | | 12,8,7,11 | 6,5,4,7, | | | | | | | | | | | | | | | | |
| | 1 | | | 12,8,7,11 | 6,5,4,7, | | | | | | | | | | | | | | | | |
| | 2 | | | 12,8,7,11 | | | | | | | | | | 13,5,4,6,9 | | | | | | | |
| | 3 | | | 12,8,7,11 | 6,5,4,7, | | | | | | | | | | | | | | | | |
| | 4 | | | 12,8,7,11 | 6,5,4,7, | | | | | | | | | | | | | | | | |
| | 5 | | | 12,8,7,11 | | | | | | | | | | 13,5,4,6,9 | | | | | | | |
| | 6 | | | 12,8,7,11 | 6,5,4,7, | | | | | | | | | | | | | | | | |
| 5 | 0 | | | 13,12,9,8,7,5,4,11,6 | | | | | | | | | | | | | | | | | |
| | 1 | | | 13,12,9,8,7,5,4,11,6 | | | | | | | | | | | | | | | | | |
| | 2 | | | 13,12,9,8,7,5,4,11,6 | | | | | | | | | | | | | | | | | |
| | 3 | | | 13,12,9,8,7,5,4,11,6 | | | | | | | | | | | | | | | | | |
| | 4 | | | 13,12,9,8,7,5,4,11,6 | | | | | | | | | | | | | | | | | |
| | 5 | | | 13,12,9,8,7,5,4,11,6 | | | | | | | | | | | | | | | | | |
| | 6 | | | 13,12,9,8,7,5,4,11,6 | | | | | | | | | | | | | | | | | |
| 6 | 0 | | | 7 | 7 | 5 | | | 7 | 7 | | | | | | | | | | | |
| | 1 | | | 7 | 7 | | | | 7 | 7 | | | | | 4 | | | | | 4 | |
| | 2 | | | 7 | | | | | 7 | | | | | 6,4,8 | | | | | 8,6,4 | | |
| | 3 | | | 7 | 7 | 5 | | | | | | | | 11,5 | 5 | 4 | | | | | |
| | 4 | | | 7 | 7 | | | | | | | | | 12,11,8 | 4,5,6 | | | | | | |
| | 5 | | | 7 | | | | | | | | | | 13,12,11,6,4,5,8,9 | | | | | | | |
| | 6 | | | 7 | 7 | 5 | | | 7 | 7 | | | | | | | | | | | |

FIG. 21

| | | |
|---|---|---|
| PDCCH | FIRST SET | $n_{\text{PUCCH},i}^{(1)} = (M_a - i - 1) \cdot N_c + i \cdot N_{c+1} + n_{\text{CCE},i} + N_{\text{PUCCH},\text{Ka}}^{(1)}$ ···EXPRESSION(a-1) |
| | SECOND SET | $n_{\text{PUCCH},i}^{(1)} = (M_b - (i - M_a) - 1) \cdot N_c + (i - M_a) \cdot N_{c-1} + n_{\text{CCE},i} + N_{\text{PUCCH},\text{Kb}}^{(1)}$<br>or<br>$n_{\text{PUCCH},i}^{(1)} = (M - i - 1) \cdot N_c + (i - M_a) \cdot N_{c+1} + n_{\text{CCE},i} + N_{\text{PUCCH},\text{Kb}}^{(1)}$ ···EXPRESSION(a-2) |
| EPDCCH | FIRST SET | CASE OF DISTRIBUTED TRANSMISSION<br>$n_{\text{PUCCH},i}^{(1)} = n_{\text{ECCE},q} + \sum_{i1=0}^{i-1} N_{\text{ECCE},q,n-k_{i1}} + \Delta_{ARO} + N_{\text{PUCCH},\text{Ka},q}^{(e1)}$ ···EXPRESSION(b-1)<br>CASE OF LOCALIZED TRANSMISSION<br>$n_{\text{PUCCH},i}^{(1)} = \left\lfloor \dfrac{n_{\text{ECCE},q}}{N_{RB}^{\text{ECCE},q}} \right\rfloor \cdot N_{RB}^{\text{ECCE},q} + \sum_{i1=0}^{i-1} N_{\text{ECCE},q,n-k_{i1}} + n' + \Delta_{ARO} + N_{\text{PUCCH},\text{Ka},q}^{(e1)}$ ···EXPRESSION(b-2) |
| | SECOND SET | CASE OF DISTRIBUTED TRANSMISSION<br>$n_{\text{PUCCH},i}^{(1)} = n_{\text{ECCE},q} + \sum_{i1=Ma}^{i-1} N_{\text{ECCE},q,n-k_{i1}} + \Delta_{ARO} + N_{\text{PUCCH},\text{Kb},q}^{(e1)}$ ···EXPRESSION(b-3)<br>CASE OF LOCALIZED TRANSMISSION<br>$n_{\text{PUCCH},i}^{(1)} = \left\lfloor \dfrac{n_{\text{ECCE},q}}{N_{RB}^{\text{ECCE},q}} \right\rfloor \cdot N_{RB}^{\text{ECCE},q} + \sum_{i1=Ma}^{i-1} N_{\text{ECCE},q,n-k_{i1}} + n' + \Delta_{ARO} + N_{\text{PUCCH},\text{Kb},q}^{(e1)}$ ···EXPRESSION(b-4) |

WHERE, c IS SELECTED FROM {0, 1, 2, 3} SO AS TO SATISFY $N_c \leq n_{\text{CCE},i} < N_{c+1}$, $N_c = \max\left\{0, \left\lfloor \left[N_{RB}^{DL} \cdot (N_{sc}^{RB} \cdot c - 4)\right]/36 \right\rfloor\right\}$.

FIG. 22

| | | |
|---|---|---|
| PDCCH | FIRST SET | $n_{PUCCH,i}^{(1)} = (M_a - i - 1) \cdot N_c + i \cdot N_{c+1} + n_{CCE,i} + N_{PUCCH}^{(1)}$ ... EXPRESSION(a-1) |
| | SECOND SET | $n_{PUCCH,i}^{(1)} = (i-1) \cdot N_3 + n_{CCE,i} + N_{PUCCH}^{(1)}$ ... EXPRESSION(a-2) |
| EPDCCH | FIRST SET AND SECOND SET | CASE OF DISTRIBUTED TRANSMISSION<br>$n_{PUCCH,i}^{(1)} = n_{ECCE,q} + \sum_{il=0}^{i-1} N_{ECCE,q,n-k_{i1}} + \Delta_{ARO} + N_{PUCCH,q}^{(e1)}$ ... EXPRESSION(b-1)<br>CASE OF LOCALIZED TRANSMISSION<br>$n_{PUCCH,i}^{(1)} = \left\lfloor \dfrac{n_{ECCE,q}}{N_{RB}^{ECCE,q}} \right\rfloor \cdot N_{RB}^{ECCE,q} + \sum_{il=0}^{i-1} N_{ECCE,q,n-k_{i1}} + n' + \Delta_{ARO} + N_{PUCCH,q}^{(e1)}$ ... EXPRESSION(b-2) |

WHERE, c IS SELECTED FROM {0, 1, 2, 3} SO AS TO SATISFY $N_c \le n_{CCE,i} < N_{c+1}$, $N_c = \max\left\{0, \left\lfloor N_{RB}^{DL} \cdot (N_{sc}^{RB} \cdot c - 4)/36 \right\rfloor\right\}$.

US 9,844,039 B2

TERMINAL, BASE STATION, AND COMMUNICATION METHOD

TECHNICAL FIELD

The present invention relates to a terminal, a base station, and a communication method.

The present application claims priority based on Japanese Patent Application No. 2013-199906, filed Sep. 26, 2013, the contents of which are incorporated herein by reference.

BACKGROUND ART

A radio access system and a radio network (hereinafter, referred to as "Long Term Evolution: LTE" or "Evolved Universal Terrestrial Radio Access: EUTRA") of cellular mobile communication have been discussed in a 3rd Generation Partnership Project (3GPP). In LTE, a base station device (base station) is also referred to as eNodeB (evolved NodeB), and a mobile station device (mobile station, terminal) is referred to as UE (User Equipment). LTE is a cellular communication system where a plurality of areas covered by the base station devices are allocated in cell structure. A single base station device may manage a plurality of cells.

LTE corresponds to frequency division duplex (FDD) and time division duplex (TDD). LTE using the FDD system is also referred to as FD-LTE or LTE FDD. TDD is a technique which performs frequency division multiplexing on an uplink signal and a downlink signal, enabling full duplex communication in at least two frequency bands. LTE using the TDD system is also referred to as TD-LTE or LTE TDD. TDD is a technique which performs time division multiplexing on an uplink signal and a downlink signal, enabling full duplex communication in a single frequency band. The details of FD-LTE and TD-LTE are disclosed in NPL 1.

A base station can transmit, to a terminal, a reference signal (also referred to as RS) which is a known signal between the base station and the terminal. In regards to the reference signal, a plurality of reference signals can be transmitted for various purposes, such as demodulation of signals or channels and reports of channel states. For example, a cell-specific reference signal is transmitted as a reference signal specific to a cell in all downlink subframes. For example, a UE-specific reference signal is transmitted as a reference signal specific to a terminal in a resource to which a data signal to the terminal is mapped. The details of the reference signal are disclosed in NPL 1.

In a communication system, a base station and a terminal can implement communication using control information. In particular, in the downlink of LTE, the base station can notify the terminal of the control information through control channels, such as a PDCCH (Physical Downlink Control Channel) and an EPDCCH (Enhanced Physical Downlink Control Channel). The PDCCH is transmitted in association with a cell-specific reference signal, and the EPDCCH is transmitted in association with a UE-specific reference signal. In the LTE of the related art, the PDCCH can be mapped to a common search space (CSS) which is a region specific to a cell and/or to a UE-specific search space (USS) which is a region specific to a terminal. The EPDCCH can be mapped only to the UE-specific search space. For this reason, for example, when transmitting the control channel using the common search space, the base station notifies of control information through the PDCCH. The details of the control channel are disclosed in NPL 2.

CITATION LIST

Non Patent Document

[Non Patent Document 1] 3rd Generation Partnership Project; Technical Specification Group Radio Access Network; Evolved Universal Terrestrial Radio Access (E-UTRA); Physical Channels and Modulation (Release 11), 3GPP TS 36.211 V11.3.0 (2013-06).

[Non Patent Document 2] 3rd Generation Partnership Project; Technical Specification Group Radio Access Network; Evolved Universal Terrestrial Radio Access (E-UTRA); Physical layer procedures (Release 11), 3GPP TS 36.213 V11.3.0 (2013-06).

DISCLOSURE OF THE INVENTION

Problems to be Solved by the Invention

However, since the PDCCH is transmitted in association with the cell-specific reference signal, the common search space is limited only to a subframe to which the cell-specific reference signal is mapped. This limitation interferes with efficient notification of the control information, leading to significant deterioration in transmission efficiency.

The invention has been accomplished in consideration of the above-described problems, and an object of an embodiment of the invention is to provide a base station, a terminal, a communication system, a communication method, and an integrated circuit capable of improving transmission efficiency in a communication system where a base station and a terminal communicate with each other.

Means for Solving the Problems (1) In order to attain the above-described object, the invention provides the following means. That is, according to a first aspect of the invention, there is provided a terminal which communicates with a base station and includes a transmission unit. The transmission unit transmits a physical uplink control channel by using a physical uplink control channel resource for transmitting HARQ-ACK in a subframe n. The physical uplink control channel resource is given by at least a value of a first control channel element used for transmitting a corresponding physical downlink control channel or a corresponding extended physical downlink control channel, in a subframe n-k. The physical uplink control channel resource is given by a first arithmetic operation in a case where a value of the element k is the same as a value of an element in a first set. The physical uplink control channel resource is given by a second arithmetic operation in a case where a value of the element k is the same as a value of an element in a second set.

(2) In the first aspect of the invention, the element k may be included only in the first set in a case where the terminal is not configured with a higher layer parameter, and the element k may be included in either of the first set and the second set in a case where the terminal is configured with the higher layer parameter.

(3) In the first aspect of the invention, the physical uplink control channel resource given by the second arithmetic operation may be based on at least the physical uplink control channel resource given by the first arithmetic operation.

(4) According to a second aspect of the invention, there is provided a base station which communicates with a terminal and includes a reception unit. The reception unit receives a physical uplink control channel transmitted by using a physical uplink control channel resource for transmitting HARQ-ACK, in a subframe n. The physical uplink control channel resource is given by at least a value of a first control channel element used for transmitting a corresponding physical downlink control channel or a corresponding extended physical downlink control channel, in a subframe n-k. The physical uplink control channel resource is given by a first arithmetic operation in a case where a value of the element k is the same as a value of an element in a first set. The physical uplink control channel resource is given by a second arithmetic operation in a case where a value of the element k is the same as a value of an element in a second set.

(5) In the second aspect of the invention, the element k may be included only in the first set in a case where the terminal is not configured with a higher layer parameter, and the element k may be included in either of the first set and the second set in a case where the terminal is configured with the higher layer parameter.

(6) In the second aspect of the invention, the physical uplink control channel resource given by the second arithmetic operation may be based on at least the physical uplink control channel resource given by the first arithmetic operation.

(7) According to a third aspect of the invention, there is provided a communication method used in a terminal which communicates with a base station. The communication method includes a step of transmitting a physical uplink control channel by using a physical uplink control channel resource for transmitting HARQ-ACK in a subframe n. The physical uplink control channel resource is given by at least a value of a first control channel element used for transmitting a corresponding physical downlink control channel or a corresponding extended physical downlink control channel, in a subframe n-k. The physical uplink control channel resource is given by a first arithmetic operation in a case where a value of the element k is the same as a value of an element in a first set. The physical uplink control channel resource is given by a second arithmetic operation in a case where a value of the element k is the same as a value of an element in a second set.

(8) According to a fourth aspect of the invention, there is provided a communication method used in a base station which communicates with a terminal. The communication method includes a step of receiving a physical uplink control channel transmitted by using a physical uplink control channel resource for transmitting HARQ-ACK in a subframe n. The physical uplink control channel resource is given by at least a value of a first control channel element used for transmitting a corresponding physical downlink control channel or a corresponding extended physical downlink control channel, in a subframe n-k. The physical uplink control channel resource is given by a first arithmetic operation in a case where a value of the element k is the same as a value of an element in a first set. The physical uplink control channel resource is given by a second arithmetic operation in a case where a value of the element k is the same as a value of an element in a second set.

Effects of the Invention

According to the embodiments of the invention, it is possible to improve transmission efficiency in a radio communication system where a base station and a terminal communicate with each other.

BRIEF DESCRIPTION OF THE DRAWINGS

FIG. 10 is a diagram illustrating an example of an uplink-downlink configuration.

FIG. 12 is a diagram illustrating an example of the HARQ response information multiplexing in the PDSCH transmission, which is represented by an EPDCCH.

FIG. 13 is an example of a subframe configuration given by an uplink-downlink configuration 1 and an uplink-downlink configuration 2.

FIG. 14 is a diagram illustrating an example of an index K: $\{k_0, k_1, \ldots, k_{M-1}\}$ of a downlink association set.

FIG. 15 is a diagram illustrating an example of an expression which gives a PUCCH resource used in transmission of HARQ response information.

FIG. 16 is a diagram illustrating an example of an index Ka: $\{k_0, k_1, \ldots, k_{Ma-1}\}$ and an index Kb: $\{k_{Ma}, k_{Ma+1}, \ldots, k_{M-1}\}$ of downlink association sets.

FIG. 17 is a diagram illustrating an example of the expression which gives the PUCCH resource used in transmission of the HARQ response information.

FIG. 18 is a diagram illustrating an example of an index K: $\{k_0, k_1, \ldots, k_{M-1}\}$ of the downlink association set.

FIG. 19 is a diagram illustrating an example of a reference uplink-downlink configuration (reference UL/DL configuration) given by a pair of the uplink-downlink configuration 1 and the uplink-downlink configuration 2.

FIG. 20 is a diagram illustrating an example of the index Ka: $\{k_0, k_1, \ldots, k_{Ma-1}\}$ and the index Kb: $\{k_{Ma}, k_{Ma+1}, \ldots, k_{M-1}\}$ of the downlink association sets.

FIG. 21 is a diagram illustrating an example of the expression which gives the PUCCH resource used in transmission of the HARQ response information.

FIG. 22 is a diagram illustrating an example of the expression which gives the PUCCH resource used in transmission of the HARQ response information.

MODE FOR CARRYING OUT THE INVENTION

Hereinafter, an embodiment of the invention will be described.

In this embodiment, a plurality of cells are set in a mobile station device. A technique in which the mobile station device performs communication through a plurality of cells is referred to as cell aggregation or carrier aggregation. The invention may be applied in each of a plurality of cells set in the mobile station device. The invention may be applied in some of a plurality of set cells. The cell configured in the mobile station device are also referred to as a serving cell.

A plurality of set serving cells include one primary cell and one or a plurality of secondary cells. The primary cell is a serving cell where an initial connection establishment procedure is performed, a serving cell where a connection re-establishment procedure starts, or a cell which is indicated as a primary cell in a handover procedure. When or after an RRC connection is established, the secondary cells may be set.

A radio communication system of this embodiment uses a TDD (Time Division Duplex) system. In case of cell aggregation, the TDD system may be applied to all of a plurality of cells. In case of cell aggregation, cells where the TDD system is applied and cells where an FDD (Frequency Division Duplex) system is applied may be put together. When cells where TDD is applied and cells where FDD is applied are put together, the invention can be applied to cells where TDD is applied.

When a plurality of cells where TDD is applied are aggregated, a half-duplex TDD system or a full-duplex TDD system can be applied.

A mobile station device transmits, to a base station device, information representing combinations of bands where carrier aggregation is supported by the mobile station device. The mobile station device transmits, to the base station device, information indicating whether or not simultaneous transmission and reception in the plurality of serving cells in a plurality of different bands are supported for each combination of bands.

In this embodiment, "X/Y" includes the meaning of "X or Y". In this embodiment, "X/Y" includes the meaning of "X and Y". In this embodiment, "X/Y" includes the meaning of "X and/or Y".

Figure 1:
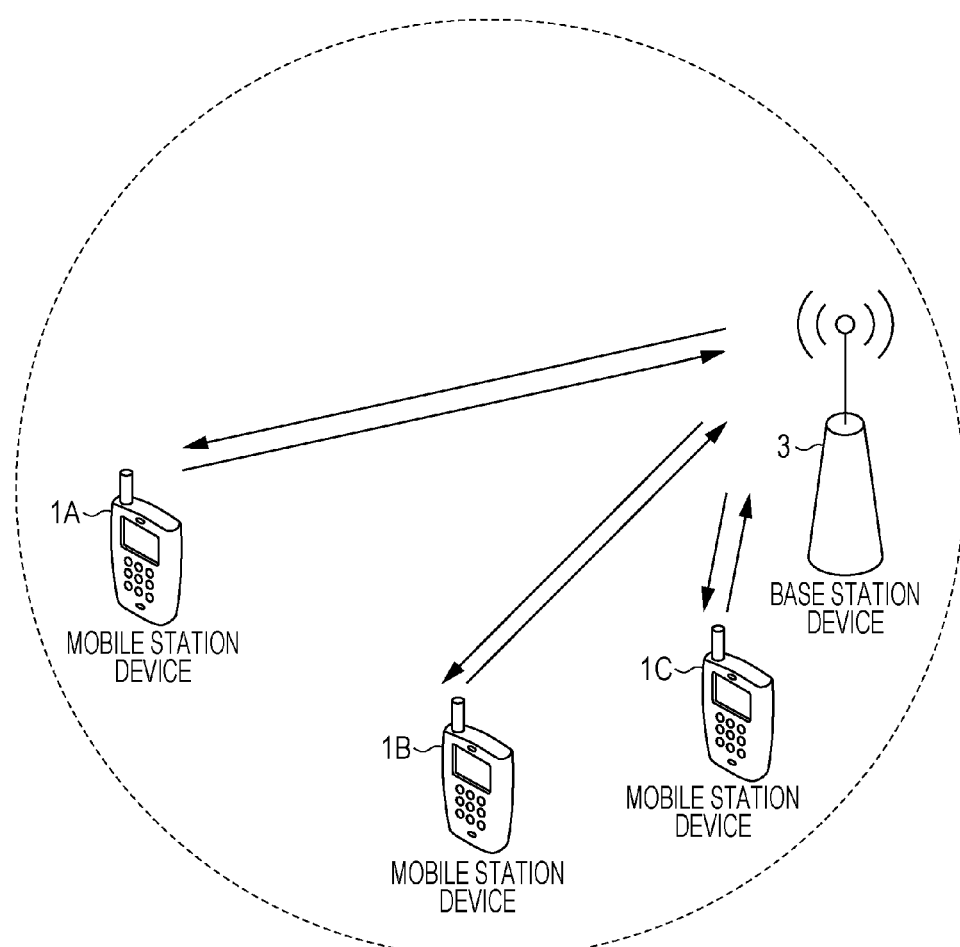
FIG. 1 is a conceptual diagram of a radio communication system of this embodiment.

FIG. 1 is a conceptual diagram of a radio communication system of this embodiment. In FIG. 1, the radio communication system includes mobile station devices 1A to 1C, and a base station device 3. Hereinafter, the mobile station devices 1A to 1C are referred to as mobile station devices 1.

Physical channels and physical signals of this embodiment will be described.

In FIG. 1, in radio communication of an uplink from the mobile station devices 1 to the base station device 3, uplink physical channels are used. The uplink physical channels can be used to transmit information output from a higher layer. The uplink physical channels include a PUCCH (Physical Uplink Control Channel), a PUSCH (Physical Uplink Shared Channel), a PRACH (Physical Random Access Channel), and the like.

The PUCCH is a physical channel which is used to transmit uplink control information (UCI). The uplink control information includes downlink channel state information (CSI), a scheduling request (SR) representing a request of a PUSCH resource, and ACK (acknowledgement)/NACK (negative-acknowledgement) to downlink data (Transport block, Downlink-Shared Channel: DL-SCH). ACK/NACK is also referred to as HARQ-ACK, HARQ feedback, or response information.

The PUSCH is a physical channel which is used to transmit uplink data (Uplink-Shared Channel: UL-SCH). The PUSCH may be used to transmit HARQ-ACK and/or channel state information along with uplink data. The PUSCH may be used to transmit only channel state information, or may be used to transmit only HARQ-ACK and channel state information.

The PRACH is a physical channel which is used to transmit a random access preamble. The PRACH has a primary purpose of synchronization between the mobile station devices 1 and the base station device 3 in time domain. In addition, the PRACH is used to represent an initial connection establishment procedure, a handover procedure, a connection re-establishment procedure, synchronization to uplink transmission (timing adjustment), and a request of a PUSCH resource.

In FIG. 1, in radio transmission of an uplink, an uplink physical signal is used. The uplink physical signal includes an uplink reference signal (ULRS) or the like. As the uplink reference signal, a DMRS (Demodulation Reference Signal), a SRS (Sounding Reference Signal), or the like is used. The DMRS is related to the transmission of the PUSCH or the PUCCH. The DMRS is time-multiplexed on the PUSCH or the PUCCH. The base station device 3 uses the DMRS to perform channel compensation of the PUSCH or the PUCCH. Hereinafter, the transmission of both the PUSCH and the DMRS is simply referred to as the transmission of the PUSCH. Hereinafter, the transmission of both the PUCCH and the DMRS is simply referred to as the transmission of the PUCCH. The DMRS of the uplink is also referred to as UL-DMRS. The SRS is not related to the transmission of the PUSCH or the PUCCH. The base station device 3 uses the SRS to measure the channel state of the uplink.

In FIG. 1, in radio communication of a downlink from the base station device 3 to the mobile station devices 1, downlink physical channels are used. The downlink physical channels can be used to transmit information output from a higher layer. The downlink physical channels include a PBCH (Physical Broadcast Channel), a PCFICH (Physical Control Format Indicator Channel), a PHICH (Physical Hybrid automatic repeat request Indicator Channel), a PDCCH (Physical Downlink Control Channel), an EPDCCH (Enhanced Physical Downlink Control Channel), a PDSCH (Physical Downlink Shared Channel), a PMCH (Physical Multicast Channel), and the like.

The PBCH is used to broadcast of a master information block (MIB, Broadcast Channel: BCH) to be commonly used in the mobile station devices 1. The MIB is updated at an interval of 40 ms. The PBCH is repeatedly transmitted in a period of 10 ms. Specifically, the initial transmission of the MIB is performed in a subframe 0 of radio frames satisfying SFN mod 4=0, and the retransmission (repetition) of the MIB is performed in a subframe 0 of all other radio frames. A SFN (system frame number) is the number of each radio frame. The MIB is system information. For example, the MIB includes information specifying the SFN.

The PCFICH is used to transmit information indicating a region (OFDM symbol) for use in transmitting the PDCCH.

The PHICH is used to transmit a HARQ indicator (HARQ feedback, response information) representing ACK (ACKnowledgement) or NACK (Negative ACKnowledgement) to uplink data (Uplink Shared Channel: UL-SCH) received by the base station device 3. For example, when the mobile station devices 1 receive a HARQ indicator representing ACK, corresponding uplink data is not retransmitted. For example, when the mobile station devices 1 receive a HARQ indicator representing NACK, corresponding uplink data is retransmitted. A single PHICH transmits a HARQ indicator to single piece of uplink data. The base station device 3 transmits HARQ indicators to a plurality of pieces of uplink data included in the same PUSCH using a plurality of PHICHs.

The PDCCH and EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of a signal PDSCH in a single cell. The downlink grant is used for scheduling of the PDSCH in the same subframe as a subframe where the downlink grant is transmitted. The uplink grant is used for scheduling of a single PUSCH in a single cell. The uplink grant is used for scheduling of a single PUSCH in the fourth or later subframe after a subframe where the uplink grant is transmitted.

The DCI format is appended with a CRC (Cyclic Redundancy Check) parity bit. The CRC parity bit is scrambled by a C-RNTI (Cell-Radio Network Temporary Identifier) or a SPS C-RNTI (Semi Persistent Scheduling Cell-Radio Network Temporary Identifier). The C-RNTI and the SPS C-RNTI are identifiers for identifying a mobile station device in a cell. The C-RNTI is used to control the PDSCH or the PUSCH in a single subframe. The SPS C-RNTI is used to allocate the resource of the PDSCH or the PUSCH cyclically.

The PDSCH is used to transmit downlink data (Downlink Shared Channel: DL-SCH).

The PMCH is used to transmit multicast data (Multicast Channel: MCH).

In FIG. 1, in the radio communication of the downlink, the following downlink physical signals are used. The downlink physical signals include a synchronization signal (SS), a downlink reference signal (DL RS), and the like.

The synchronization signal is used when the mobile station devices 1 synchronize the frequency domain and the time domain of the downlink. The synchronization signal is mapped in predetermined subframes of a radio frame. For example, in the TDD system, the synchronization signal is mapped in subframes 0, 1, 5, and 6 of a radio frame. In the FDD, the synchronization signal is mapped in subframes 0 and 5 of a radio frame.

The downlink reference signal is used when the mobile station devices 1 correct the propagation path of the downlink physical channels. The downlink reference signal is used when the mobile station devices 1 calculate channel state information of the downlink. The downlink reference signal is used when the mobile station devices 1 measure the geographical positions thereof.

The downlink reference signal includes a CRS (Cell-specific Reference Signal), a URS (UE-specific Reference Signal) related to the PDSCH, a DMRS (Demodulation Reference Signal) related to the EPDCCH, NZP CSI-RS (Non-Zero Power Channel State Information—Reference Signal), ZP CSI-RS (Zero Power Chanel State Information—Reference Signal), a MBSFN RS (Multimedia Broadcast and Multicast Service over Single Frequency Network Reference signal), a PRS (Positioning Reference Signal), a TRS (Tracking Reference Signal), and the like.

The CRS is transmitted in the entire band of a subframe. The CRS is used to demodulate the PBCH/PDCCH/PHICH/PCFICH/PDSCH. The CRS may be used when the mobile station devices 1 calculate the channel state information of the downlink. The PBCH/PDCCH/PHICH/PCFICH is transmitted through an antenna port for use in transmitting the CRS.

The URS related to the PDSCH is transmitted in a subframe and a band for use in transmitting the PDSCH to which the URS is related. The URS is used to demodulate the PDSCH to which the URS is related.

The PDSCH is transmitted through an antenna port for use in transmitting the CRS or the URS. A DCI format 1A is used for scheduling of the PDSCH which is transmitted through an antenna port for use in transmitting the CRS. A DCI format 2D is used for scheduling of the PDSCH which is transmitted through an antenna port for use in transmitting the URS.

The DMRS related to the EPDCCH is transmitted in a subframe and a band for use in transmitting the EPDCCH to which the DMRS is related. The DMRS is used to demodulate the EPDCCH to which the DMRS is related. The EPDCCH is transmitted through an antenna port for use in transmitting the DMRS.

The NZP CSI-RS is transmitted in a configured subframe. A resource where the NZP CSI-RS is transmitted is configured by the base station device. The NZP CSI-RS is used when the mobile station devices 1 calculate the channel state information of the downlink. The mobile station devices 1 perform signal measurement (channel measurement) using the NZP CSI-RS.

The resource of the ZP CSI-RS is configured by the base station device 3. The base station device 3 transmits the ZP CSI-RS with zero output. That is, the base station device 3 does not transmit the ZP CSI-RS. The base station device 3 does not transmit the PDSCH and the EPDCCH on the resources configured for the ZP CSI-RS. For example, the mobile station devices 1 can measure interference in the resource to which the NZP CSI-RS in a certain cell corresponds.

The MBSFN RS is transmitted in the entire band of a subframe for use in transmitting the PMCH. The MBSFN RS is used to demodulate the PMCH. The PMCH is transmitted through an antenna port for use in transmitting the MBSFN RS.

The PRS is used when the mobile station devices measure the geographical positions thereof.

The TRS can be mapped to predetermined subframes. For example, the TRS is mapped to subframes 0 and 5. The TRS can use the same structure as a part of the CRS. For example, in each of resource blocks, the position of resource elements to which the TRS is mapped can be the same as the position of resource elements to which a CRS of an antenna port 0 is mapped. A sequence (value) which is used for the TRS can be determined based on information configured through the PBCH, the PDCCH, the EPDCCH, or the PDSCH (RRC signaling). A sequence (value) which is used for the TRS can be determined based on parameters, such as a cell ID (for example, a physical layer cell identifier) and a slot number. A sequence (value) which is used for the TRS can be determined by a method (an equation) different from the one for a sequence (value) which is used for the CRS of the antenna port 0.

The downlink physical channels and the downlink physical signal are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. Channels which are used in a medium access control (MAC) layer are referred to as transport channels. A unit of a transport channel which is used in the MAC layer is referred to as a transport block (TB) or a MAC PDU (Protocol Data Unit). Control of a HARQ (Hybrid Automatic Repeat reQuest) is performed for each transport block in the MAC layer. The transport block is a unit of data which is delivered to a physical layer by the MAC layer. In the physical layer, the transport block is mapped to a code word, and coding is performed for each code word.

As an example of a method of signaling (notification, broadcasting) of control information from the base station device 3 to the mobile station device 1, PDCCH signaling which is signaling through a PDCCH, RRC signaling which is signaling through an RRC layer, MAC signaling which is signaling through a MAC layer, and the like are used. As the RRC signaling, dedicated RRC signaling in which notification of control information specific to the mobile station device 1 is performed, and common RRC signaling in which notification of control information specific to the base station device 3 is performed are used. In the following descriptions, when simple descriptions as the RRC signaling will be made, the RRC signaling is the dedicated RRC signaling and/or the common RRC signaling.

Hereinafter, the structure of a radio frame of this embodiment will be described.

Figure 2:
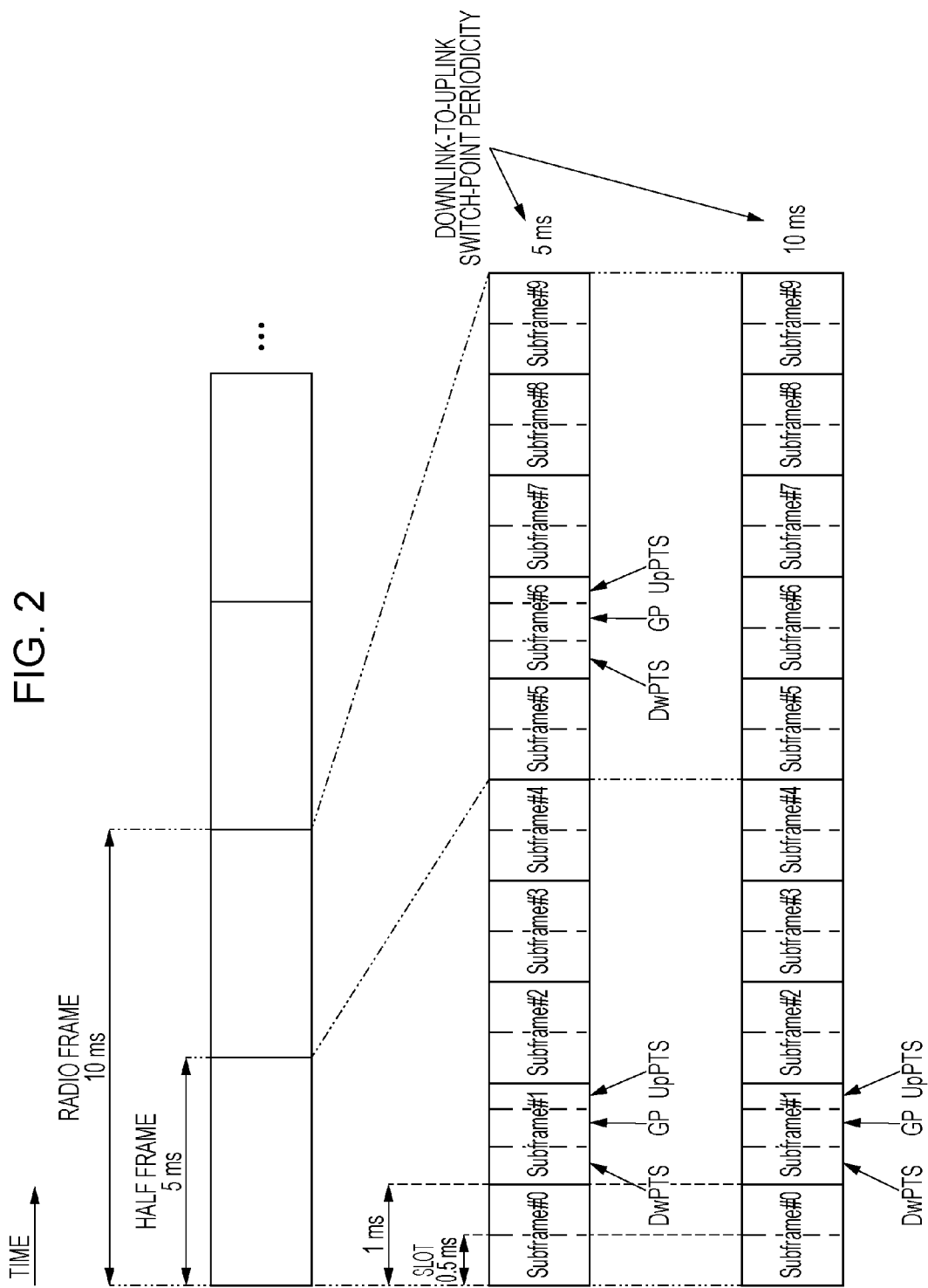
FIG. 2 is a diagram showing the schematic configuration of a radio frame of this embodiment.

FIG. 2 is a diagram showing the schematic structure of a radio frame of this embodiment. Each radio frame has a length of 10 ms. In FIG. 2, the horizontal axis is a time axis. Each radio frame has two half frames. Each half frame has a length of 5 ms. Each half frame has five subframes. Each subframe has a length of 1 ms and is defined by two consecutive slots. Each slot has a length of 0.5 ms. An i-th subframe in a radio frame has a (2×i)th slot and a (2×i+1)th slot. That is, ten subframes can be used at each internal of 10 ms.

The subframes include a downlink subframe (first subframe), an uplink subframe (second subframe), a special subframe (third subframe), and the like.

The downlink subframe is a subframe which is reserved for downlink transmission. The uplink subframe is a subframe which is reserved for uplink transmission. The special subframe has three fields. The three fields are a DwPTS (Downlink Pilot Time Slot), a GP (Guard Period), and an UpPTS (Uplink Pilot Time Slot). The total length of the DwPTS, the GP, and the UpPTS is 1 ms. The DwPTS is a field which is reserved for downlink transmission. The UpPTS is a field which is reserved for uplink transmission. The GP is a field where downlink transmission and uplink transmission are not performed. The special subframe may have only the DwPTS and the GP or may have only the GP and the UpPTS.

A single radio frame has at least a downlink subframe, an uplink subframe, and a special subframe.

The radio communication system of this embodiment supports downlink-to-uplink switch-point periodicity of 5 ms and 10 ms. When the downlink-to-uplink switch-point periodicity is 5 ms, a special subframe is included in both half frames in a radio frame. When the downlink-to-uplink switch-point periodicity is 10 ms, a special subframe is included in only the first half frame of a radio frame.

Hereinafter, the configuration of a slot of this embodiment will be described.

Figure 3:
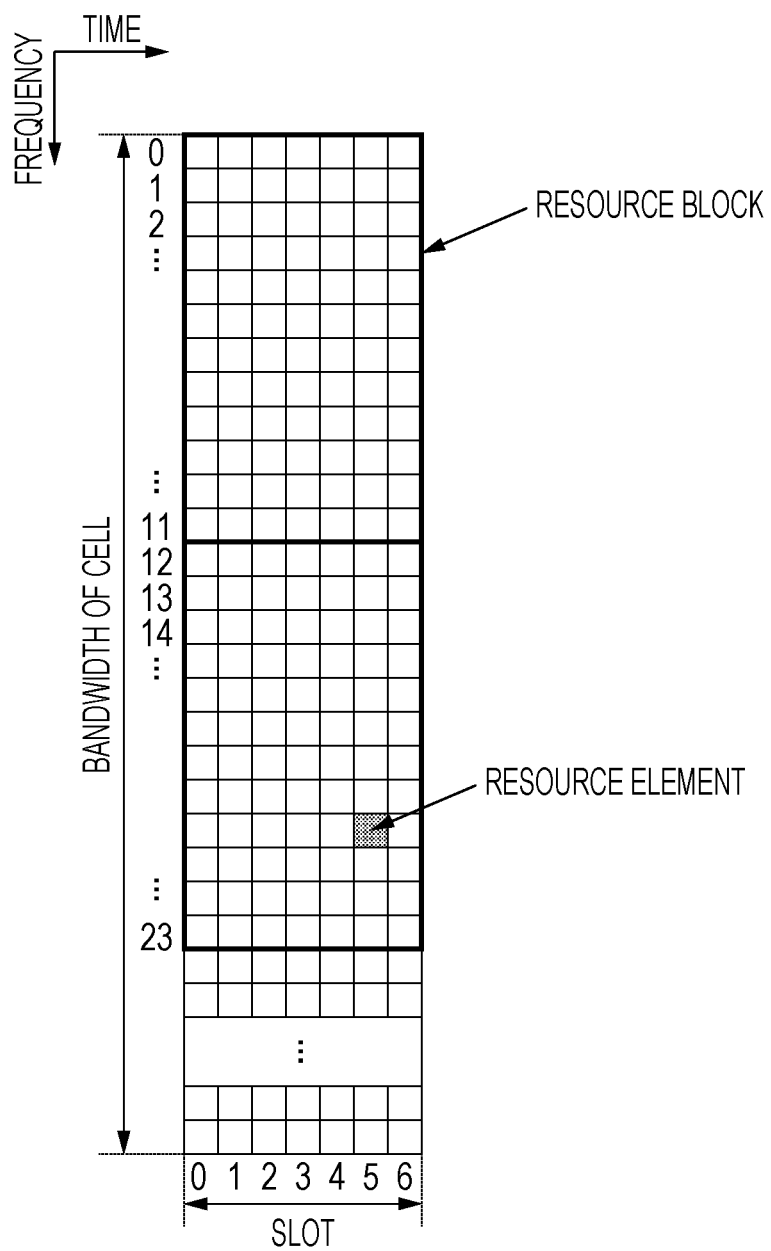
FIG. 3 is a diagram showing the configuration of a slot of this embodiment.

FIG. 3 is a diagram showing the configuration of a slot of this embodiment. In this embodiment, a normal CP (normal Cyclic Prefix) is applied to an OFDM symbol. An extended CP (extended Cyclic Prefix) may be applied to an OFDM symbol. A physical signal or a physical channel which is transmitted in each slot is expressed by a resource grid. In the downlink, a resource grid is defined by a plurality of subcarriers with respect to a frequency direction and a plurality of OFDM symbols with respect to a time direction. In the uplink, a resource grid is defined by a plurality of subcarriers with respect to a frequency direction and a plurality of SC-FDMA symbols with respect to a time direction. The number of subcarriers or resource blocks depends on a bandwidth of a cell. The number of OFDM symbols or SC-FDMA symbols of one slot is 7 for the normal CP case and 6 for the extended CP case. Each element in a resource grid is referred to as a resource element. A resource element is identified using the number of a subcarrier and the number of an OFDM symbol or SC-FDMA symbol.

A resource block is used for mapping to a resource element of a certain physical channel (PDSCH or PUSCH). In the resource block, a virtual resource block and a physical resource block are defined. A certain physical channel is first mapped to the virtual resource block. Thereafter, the virtual resource block is mapped to the physical resource block. One physical resource block is defined from seven continuous OFDM symbols or SC-FDMA symbols in a time domain and twelve contiguous subcarriers in a frequency domain. Therefore, one physical resource block has (7×12) resource elements. Furthermore, one physical resource block corresponds to one slot in the time domain, and corresponds to 180 kHz in the frequency domain. The physical resource block is numbered from 0 in the frequency domain. Moreover, two resource blocks in one subframe to which the same physical resource block number corresponds are defined as a physical resource block pair (PRB pair, RB pair).

Hereinafter, a physical channel and a physical signal which are transmitted in each subframe will be described.

Figure 4:
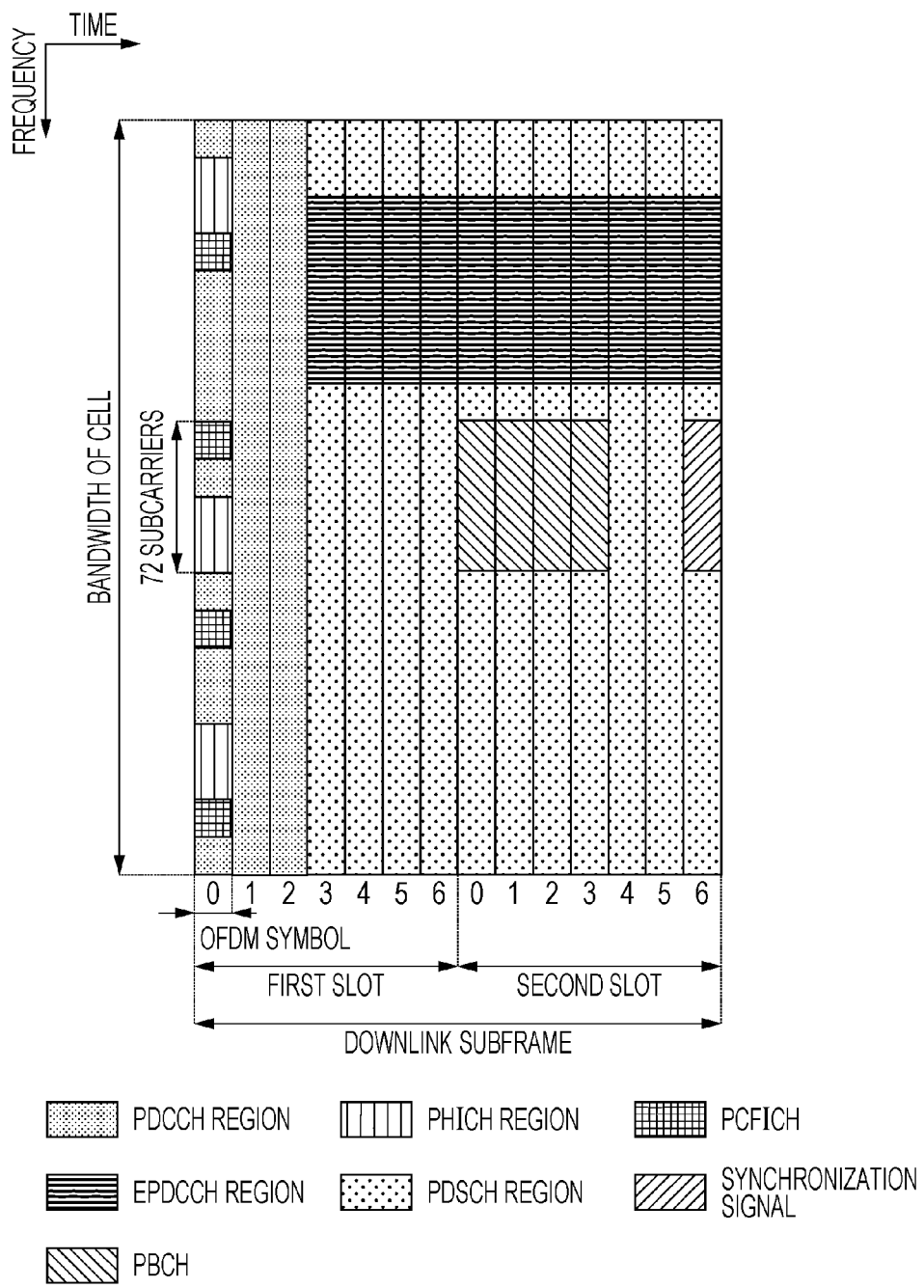
FIG. 4 is a diagram showing an example of the mapping of physical channels and physical signals in a downlink subframe of this embodiment.

FIG. 4 is a diagram showing an example of the mapping of physical channels and physical signals in the downlink subframe of this embodiment. The base station device 3 can transmit the downlink physical channels (PBCH, PCFICH, PHICH, PDCCH, EPDCCH, PDSCH) and/or the downlink physical signals (synchronization signal, downlink reference signal) in the downlink subframe. The PBCH is transmitted in only the subframe 0 of the radio frame. The downlink reference signal is mapped in the resource elements distributed in the frequency domain and the time domain. For simplification of description, the downlink reference signal is not shown in FIG. 4.

In a PDCCH region, a plurality of PDCCHs may be frequency, time, and/or spatial-multiplexed. In an EPDCCH region, a plurality of EPDCCHs may be frequency, time, and/or spatial-multiplexed. In a PDSCH region, a plurality of PDSCHs may be frequency, time, and/or spatial-multiplexed. The PDCCH, the PDSCH, and/or the EPDCCH may be frequency, time, and/or spatial-multiplexed.

Figure 5:
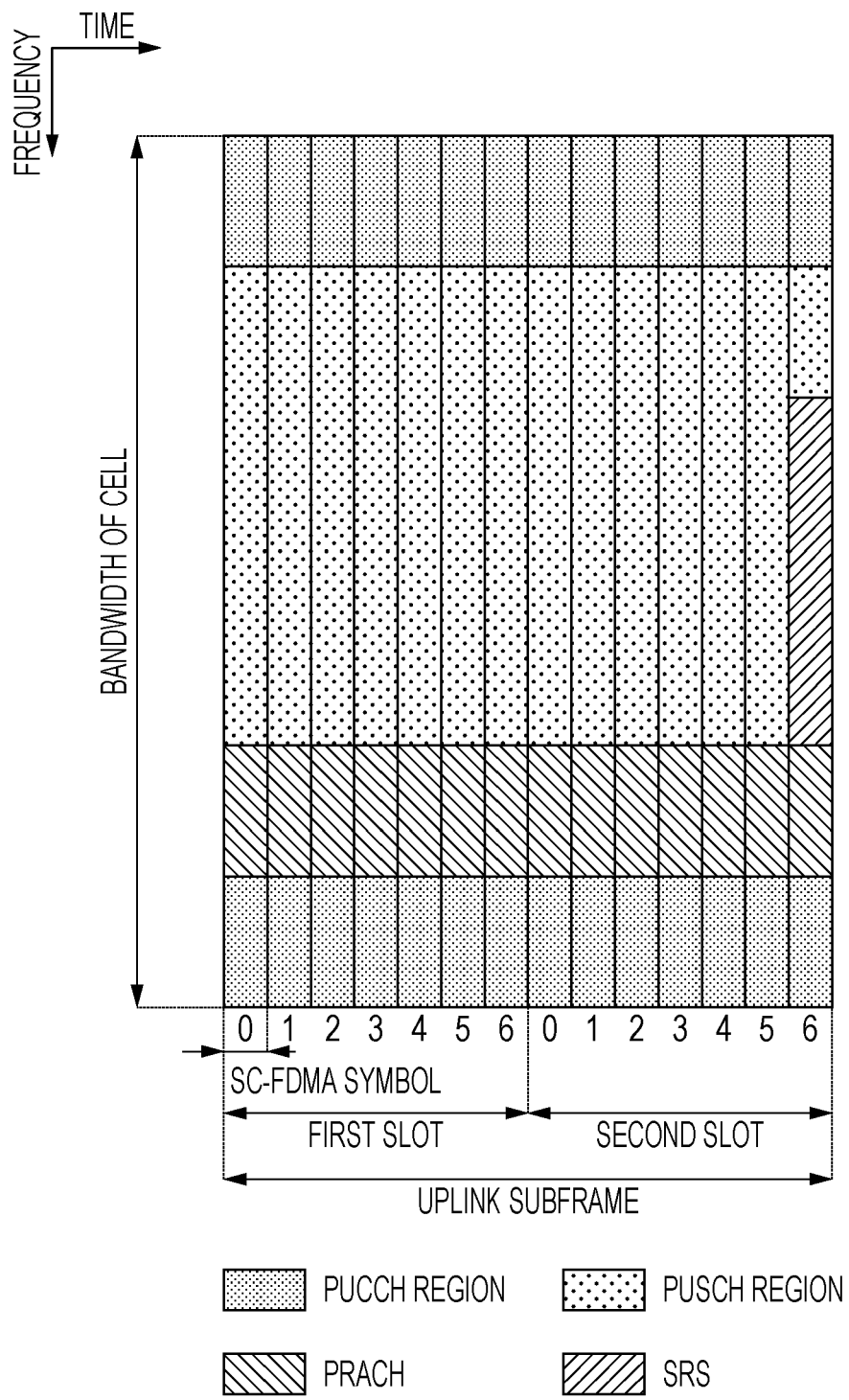
FIG. 5 is a diagram showing an example of the mapping of physical channels and physical signals in an uplink subframe of this embodiment.

FIG. 5 is a diagram showing an example of the mapping of physical channels and physical signals in an uplink subframe of this embodiment. The mobile station devices 1 may transmit the uplink physical channels (PUCCH, PUSCH, PRACH) and the uplink physical signals (UL-DMRS, SRS) in the uplink subframe. In a PUCCH region, a plurality of PUCCHs are frequency, time, space, and/or code-multiplexed. In a PUSCH region, a plurality of PUSCHs are frequency, time, space, and/or code-multiplexed. The PUCCH and the PUSCH may be frequency, time, space, and/or code-multiplexed. The PRACH may be allocated over a single subframe or two subframes. A plurality of PRACHs may be code-multiplexed.

The SRS is transmitted using the last SC-FDMA symbol in the uplink subframe. That is, the SRS is mapped in the last SC-FDMA symbol in the uplink subframe. The mobile station devices 1 can limit simultaneous transmission of the SRS and the PUCCH/PUSCH/PRACH in a single SC-FDMA symbol of a single cell. In a single uplink subframe of a single cell, the mobile station devices 1 can transmit the PUSCH and/or the PUCCH using SC-FDMA symbols excluding the last SC-FDMA symbol in the uplink subframe and can transmit the SRS using the last SC-FDMA symbol in the uplink subframe. That is, the mobile station devices 1 can transmit the SRS, and the PUSCH and the PUCCH in the single uplink subframe in the single cell. The DMRS is time-multiplexed on the PUCCH or the PUSCH. For simplification of description, the DMRS is not shown in FIG. 5.

Figure 6:
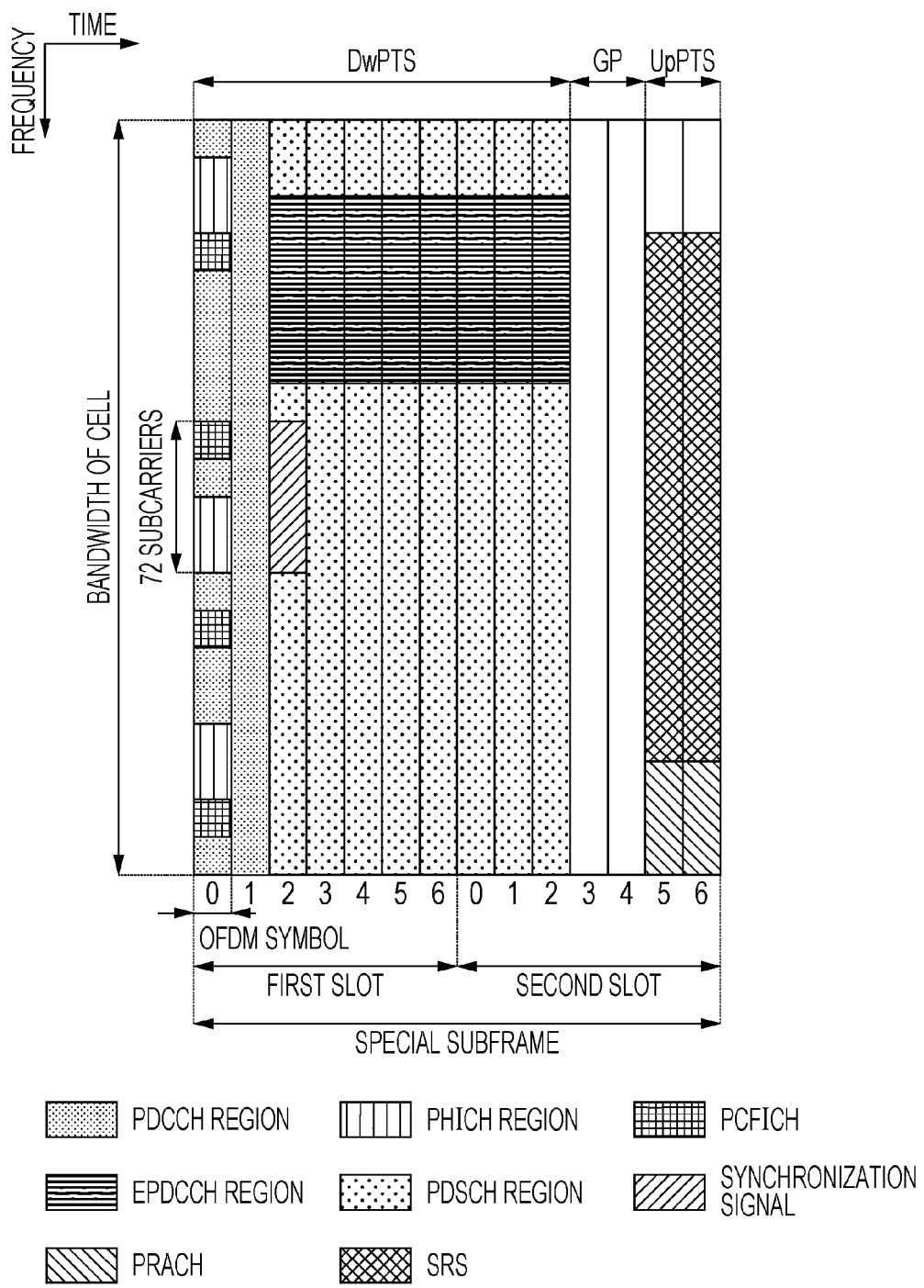
FIG. 6 is a diagram showing an example of the mapping of physical channels and physical signals in a special subframe of this embodiment.

FIG. 6 is a diagram showing an example of the mapping of physical channels and physical signals in a special subframe of this embodiment. In FIG. 6, the DwPTS has the first to tenth SC-FDMA symbols in the special subframe, the GP has the eleventh and twelfth SC-FDMA symbols in the special subframe, and the UpPTS has the thirteenth and fourteenth SC-FDMA symbols in the special subframe.

The base station device 3 may transmit the PCFICH, the PHICH, the PDCCH, the EPDCCH, the PDSCH, the synchronization signal, and the downlink reference signal in the DwPTS of the special subframe. The base station device 3 can limit the transmission of the PBCH in the DwPTS of the special subframe. The mobile station devices 1 may transmit the PRACH and the SRS in the UpPTS of the special subframe. That is, the mobile station devices 1 can limit the transmission of the PUCCH, the PUSCH, and the DMRS in the UpPTS of the special subframe.

Figure 7:
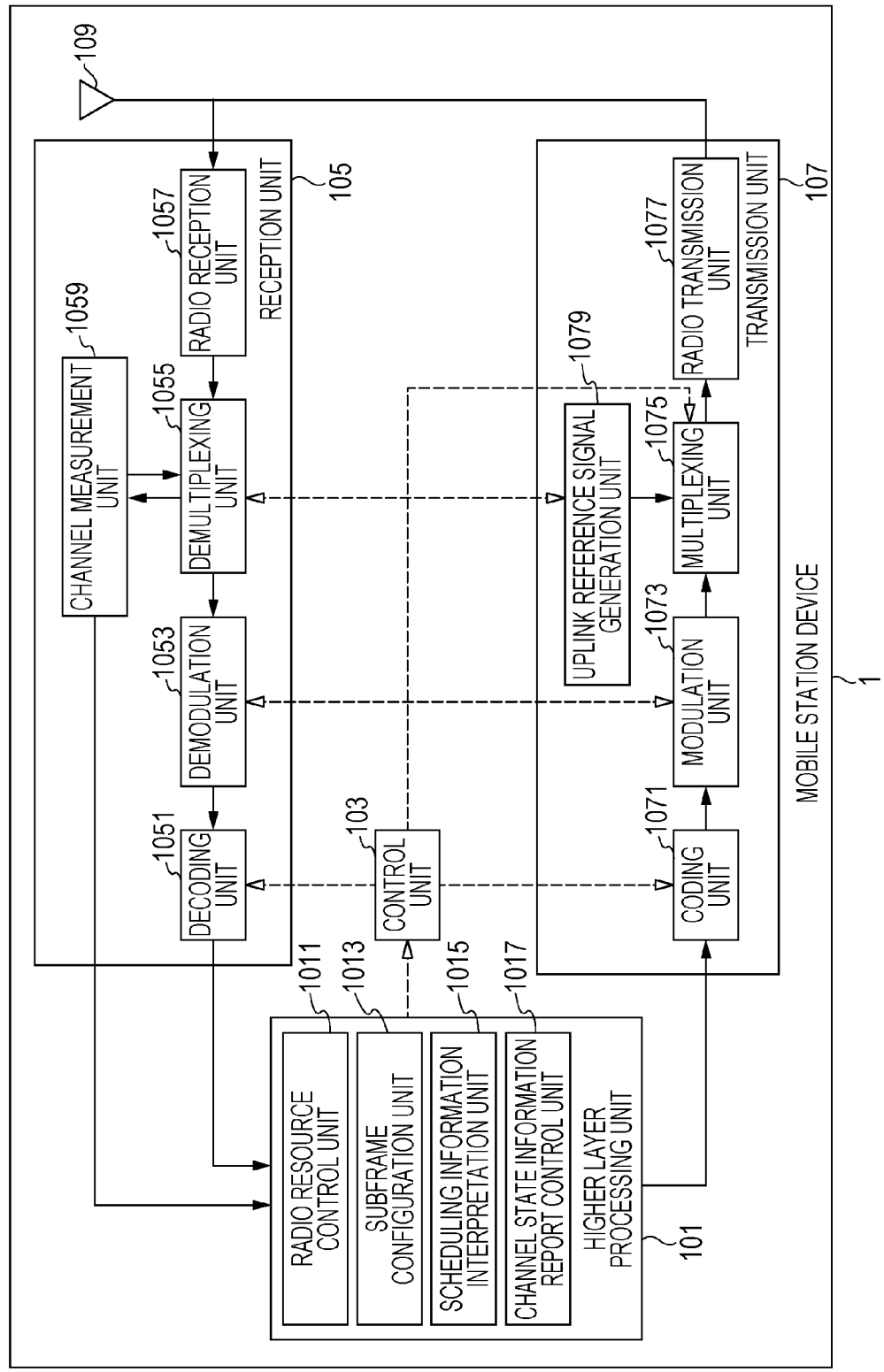
FIG. 7 is a schematic block diagram showing the configuration of a mobile station device 1 of this embodiment.

FIG. 7 is a schematic block diagram showing the structure of a mobile station device 1 of this embodiment. As shown in the drawing, the mobile station device 1 includes a higher layer processing unit 101, a control unit 103, a reception unit 105, a transmission unit 107, and a transmission/reception antenna 109. The higher layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs uplink data (transport block) generated by user's operation to the transmission unit 107. The higher layer processing unit 101 performs processing of a medium access control (MAC) layer, a packet data convergence protocol (PDCP) layer, a radio link control (RLC) layer, and a radio resource control (RRC) layer.

The radio resource control unit 1011 in the higher layer processing unit 101 manages various kinds of configuration information of the mobile station device. The radio resource control unit 1011 generates information to be mapped in each channel of the uplink and outputs the generated information to the transmission unit 107.

The subframe configuration unit 1013 in the higher layer processing unit 101 manages a subframe configuration in the base station device 3 and/or a base station device different from the base station device 3 based on information configured by the base station device 3. For example, the subframe configuration is the configuration of the uplink or downlink for a subframe. The subframe configuration includes a subframe pattern configuration, an uplink-downlink configuration, an uplink reference UL-DL configuration (Uplink reference configuration), a downlink reference UL-DL configuration (Downlink reference configuration), and/or a transmission direction UL-DL configuration (transmission direction configuration). The subframe configuration unit 1013 sets the subframe configuration, the subframe pattern configuration, the uplink-downlink configuration, the uplink reference UL-DL configuration, the downlink reference UL-DL configuration, and/or the transmission direction UL-DL configuration. The subframe configuration unit 1013 can set at least two subframe sets. The subframe pattern configuration includes an EPDCCH subframe configuration. The subframe configuration unit 1013 is also referred to as a terminal subframe configuration unit.

The scheduling information interpretation unit 1015 in the higher layer processing unit 101 interprets the DCI format (scheduling information) received through the reception unit 105, generates control information to control the reception unit 105 and the transmission unit 107 based on the interpretation result of the DCI format, and outputs the generated control information to the control unit 103.

The scheduling information interpretation unit 1015 determines the timing of transmission processing and reception processing based on the subframe configuration, the subframe pattern configuration, the uplink-downlink configuration, the uplink reference UL-DL configuration, the downlink reference UL-DL configuration, and/or the transmission direction UL-DL configuration.

The CSI report control unit 1017 specifies a CSI reference resource. The CSI report control unit 1017 instructs the channel measurement unit 1059 to derive a CQI related to the CSI reference resource. The CSI report control unit 1017 instructs the transmission unit 107 to transmit the CQI. The CSI report control unit 1017 sets a configuration which is used when the channel measurement unit 1059 calculates the CQI.

The control unit 103 generates control signals to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes reception signals received from the base station device 3 by the transmission/reception antenna 109 based on the control signals input from the control unit 103. The reception unit 105 outputs the decoded information to the higher layer processing unit 101.

The radio reception unit 1057 converts the signals of the downlink received by the transmission/reception antenna 109 to an intermediate frequency (down covert), removes unnecessary frequency components, controls an amplification level such that the signal levels are appropriately maintained, performs quadrature demodulation based on the in-phase components and quadrature components of the received signals, and converts the quadrature-demodulated analog signals to digital signals. The radio reception unit 1057 removes a portion corresponding to a guard interval (GI) from the converted digital signals, performs fast Fourier transform (FFT) on the signals with the guard interval removed, and extracts the signals of the frequency domain.

The demultiplexing unit 1055 separates the PHICH, the PDCCH, the EPDCCH, the PDSCH, and/or the downlink reference signal from the extracted signals. The demultiplexing unit 1055 performs channel compensation of the PHICH, the PDCCH, the EPDCCH, and/or the PDSCH from a channel estimation value input from the channel measurement unit 1059. The demultiplexing unit 1055 outputs the demultiplexed downlink reference signal to the channel measurement unit 1059.

The demodulation unit 1053 synthesizes the signals by multiplying the PHICH by a corresponding code, performs demodulation according to a BPSK (Binary Phase Shift Keying) modulation scheme on the synthesized signals, and outputs the demodulation result to the decoding unit 1051. The decoding unit 1051 decodes the PHICH addressed to the mobile station device and outputs the decoded HARQ indicator to the higher layer processing unit 101. The demodulation unit 1053 performs demodulation according to a QPSK modulation scheme on the PDCCH and/or the EPDCCH and outputs the demodulation result to the decoding unit 1051. The decoding unit 1051 attempts to decode the PDCCH and/or the EPDCCH, and when decoding is successful, outputs the decoded downlink control information and the RNTI, to which the downlink control information corresponds, to the higher layer processing unit 101.

The demodulation unit 1053 performs demodulation according to a modulation scheme notified by the downlink grant, such as QPSK (Quadrature Phase Shift Keying), 16QAM (Quadrature Amplitude Modulation), or 64QAM, on the PDSCH and outputs the demodulation result to the decoding unit 1051. The decoding unit 1051 performs decoding based on information concerning a coding rate notified by the downlink control information and outputs the decoded downlink data (transport block) to the higher layer processing unit 101.

The channel measurement unit 1059 measures a path loss or a channel state of the downlink from the downlink reference signal input from the demultiplexing unit 1055 and outputs the measured path loss or the measured state of the channel to the higher layer processing unit 101. The channel measurement unit 1059 calculates a channel estimation value of the downlink from the downlink reference signal and outputs the estimation value to the demultiplexing unit 1055. The channel measurement unit 1059 performs channel measurement and/or interference measurement to calculate the CQI.

The transmission unit 107 generates the uplink reference signal according to the control signals from the control unit 103, encodes and modulates uplink data (transport block) input from the higher layer processing unit 101, multiplexes the PUCCH, PUSCH, and the generated uplink reference signal, and transmits the multiplexed signals to the base station device 3 through the transmission/reception antenna 109.

The coding unit 1071 performs coding, such as convolution coding or block coding, on the uplink control information input from the higher layer processing unit 101. The coding unit 1071 performs turbo coding based on information which is used for the scheduling of the PUSCH.

The modulation unit 1073 modulates a coding bit input from the coding unit 1071 by a modulation scheme notified by the downlink control information, such as BPSK, QPSK, 16QAM, or 64QAM, or a modulation scheme determined in advance for each channel. The modulation unit 1073 determines the number of sequences of data to be spatial-multiplexed based on information which is used for the scheduling of the PUSCH, and maps a plurality of pieces of uplink data transmitted by the same PUSCH to a plurality of sequences and performs precoding on the sequences using MIMO SM (Multiple Input Multiple Output Spatial Multiplexing).

The uplink reference signal generation unit 1079 generates a sequence obtained by a rule (equation) determined in advance based on a physical layer cell identifier (physical cell identity: PCI, referred to as a cell ID or the like) for identifying the base station device 3, a bandwidth where the uplink reference signal is allocated, a cyclic shift notified by the uplink grant, the values of parameters for generation of a DMRS sequence, and the like. The multiplexing unit 1075 rearranges the modulation symbols of the PUSCH in parallel according to the control signals input from the control unit 103 and then performs discrete Fourier transform (DFT). The multiplexing unit 1075 multiplexes the signals of the PUCCH and the PUSCH and the generated uplink reference signal for each transmission antenna port. That is, the multiplexing unit 1075 maps the signals of the PUCCH and the PUSCH and the generated uplink reference signal in the resource elements for each transmission antenna port.

The radio transmission unit 1077 performs inverse fast Fourier transform (IFFT) on the multiplexed signals, performs modulation according to a SC-FDMA system, appends a guard interval to SC-FDMA modulated SC-FDMA symbols, generates baseband digital signals, converts the baseband digital signals to analog signals, generates in-phase components and quadrature components having an intermediate frequency from the analog signals, removes excessive frequency components for the intermediate frequency band, converts signals having an intermediate frequency to signals having a high frequency (up convert), removes excessive frequency components, performs power amplification, and outputs the power-amplified signals to the transmission/reception antenna 109 and transmits them.

Figure 8:
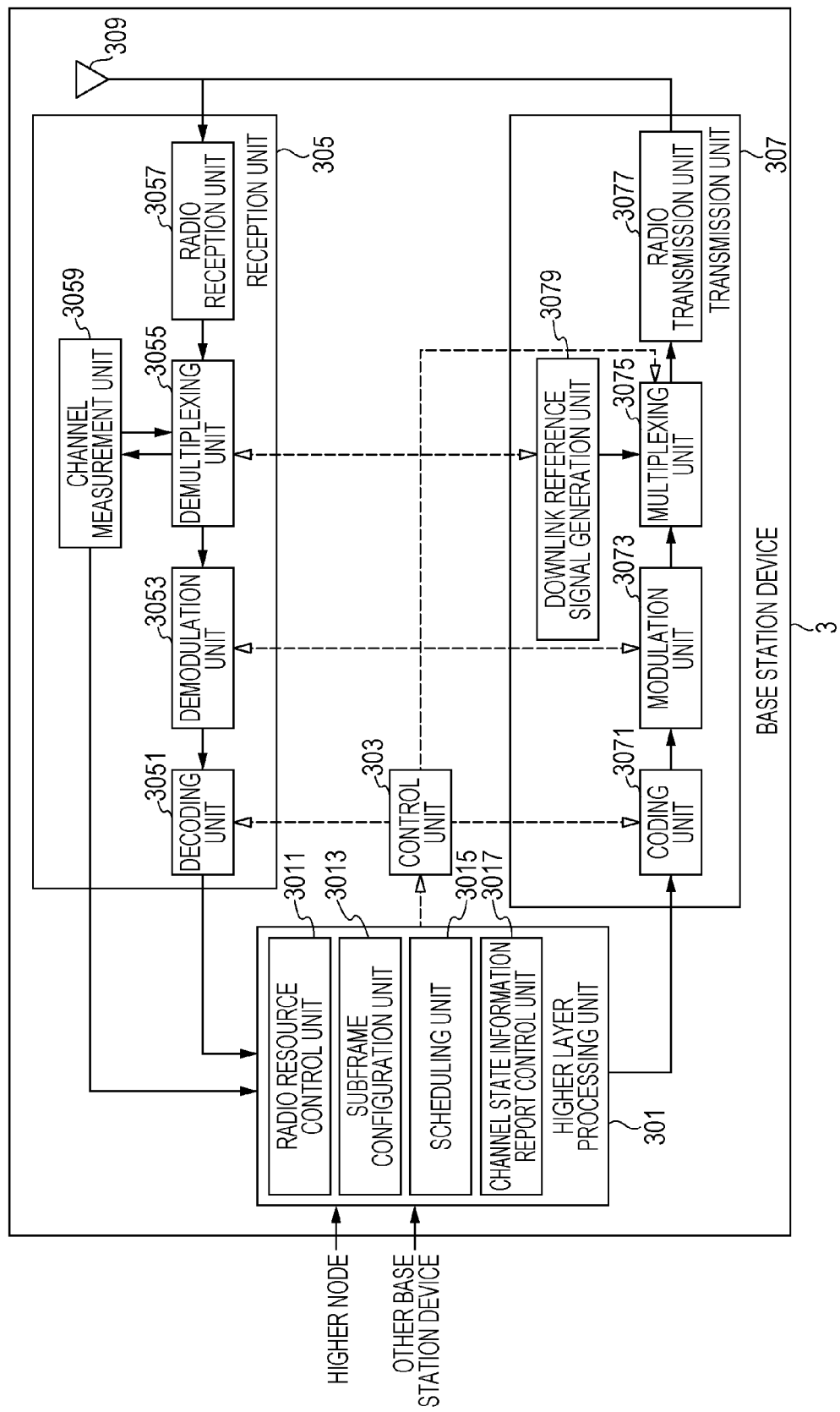
FIG. 8 is a schematic block diagram showing the configuration of a base station device 3 of this embodiment.

FIG. 8 is a schematic block diagram showing the configuration of a base station device 3 of this embodiment. As shown in the drawing, the base station device 3 includes a higher layer processing unit 301, a control unit 303, a reception unit 305, a transmission unit 307, and a transmission/reception antenna 309. The higher layer processing unit 301 includes a radio resource control unit 3011, a subframe configuration unit 3013, a scheduling unit 3015, and a CSI report control unit 3017. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. The higher layer processing unit 301 generates control information to control the reception unit 305 and the transmission unit 307 and outputs the generated control information to the control unit 303.

The radio resource control unit 3011 in the higher layer processing unit 301 generates downlink data (transport block) arranged in the PDSCH of the downlink, system information, an RRC message, a MAC CE (Control Element), and the like, or acquires downlink data, the system information, the RRC message, and the MAC CE from a higher node, and outputs downlink data, the system information, the RRC message, and the MAC CE to the transmission unit 307. The radio resource control unit 3011 manages various kinds of configuration information of each of the mobile station devices 1.

The subframe configuration unit 3013 in the higher layer processing unit 301 manages the subframe configuration, the subframe pattern configuration, the uplink-downlink configuration, the uplink reference UL-DL configuration, the downlink reference UL-DL configuration, and/or the transmission direction UL-DL configuration for each mobile station device 1. The subframe configuration unit 3013 sets the subframe configuration, the subframe pattern configuration, the uplink-downlink configuration, the uplink reference UL-DL configuration, the downlink reference UL-DL configuration, and/or the transmission direction UL-DL configuration for each mobile station device 1. The subframe configuration unit 3013 transmits information concerning the subframe configuration to the mobile station devices 1. The subframe configuration unit 3013 is also referred to as a base station subframe configuration unit.

The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the mobile station devices 1. The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the mobile station devices 1 indicated from the higher node.

For example, the subframe configuration unit 3013 may determine the subframe configuration, the subframe pattern configuration, the uplink-downlink configuration, the uplink reference UL-DL configuration, the downlink reference UL-DL configuration, and/or the transmission direction UL-DL configuration based on the traffic amount of the uplink and the traffic amount of the downlink.

The subframe configuration unit 3013 can manage at least two subframe sets. The subframe configuration unit 3013 may set at least two subframe sets for each mobile station device 1. The subframe configuration unit 3013 may set at least two subframe sets for each serving cell. The subframe configuration unit 3013 may set at least two subframe sets for each CSI process. The subframe configuration unit 3013 can transmit information representing at least two subframe sets to the mobile station devices 1 through the transmission unit 307.

The scheduling unit 3015 in the higher layer processing unit 301 determines the frequency and subframe to which the physical channels (PDSCH and PUSCH) are allocated, the coding rate and the modulation scheme of the physical channels (PDSCH and PUSCH), transmission power, and the like from the channel state information, the estimation value of the propagation path or the channel quality input from the channel measurement unit 3059, and the like. The scheduling unit 3015 determines whether or not to schedule the downlink physical channels and/or the downlink physical signals or the uplink physical channels and/or the uplink physical signals in a flexible subframe. The scheduling unit 3015 generates control information (for example, DCI format) to control the reception unit 305 and the transmission unit 307 based on the scheduling result and outputs the generated control information to the control unit 303.

The scheduling unit 3015 generates information, which is used for the scheduling of the physical channels (PDSCH and PUSCH), based on the scheduling result. The scheduling unit 3015 determines the timing (subframe) of transmission processing and reception processing based on the UL-DL configuration, the subframe pattern configuration, the uplink-downlink configuration, the uplink reference UL-DL configuration, the downlink reference UL-DL configuration, and/or the transmission direction UL-DL configuration.

The CSI report control unit 3017 in the higher layer processing unit 301 controls a CSI report of the mobile station device 1. The CSI report control unit 3017 transmits information representing various configurations, which are assumed when the mobile station device 1 derives a CQI in a CSI reference resource, to the mobile station device 1 through the transmission unit 307.

The control unit 303 generates control signals to control the reception unit 305 and the transmission unit 307 based on the control information from the higher layer processing unit 301. The control unit 303 outputs the generated control signals to the reception unit 305 and the transmission unit 307 to control the reception unit 305 and the transmission unit 307.

The reception unit 305 separates, demodulates, and decodes reception signals received from the mobile station devices 1 through the transmission/reception antenna 309 according to the control signals input from the control unit 303 and outputs the decoded information to the higher layer processing unit 301. The radio reception unit 3057 converts the signals of the uplink received through the transmission/reception antenna 309 to an intermediate frequency (down covert), removes unnecessary frequency components, controls an amplification level such that the signal levels are appropriately maintained, performs quadrature demodulation based on the in-phase components and the quadrature components of the received signals, and converts the quadrature-demodulated analog signals to digital signals.

The radio reception unit 3057 removes a portion corresponding to the guard interval (GI) from the converted digital signals. The radio reception unit 3057 performs fast Fourier transform (FFT) on the signals with the guard interval removed, extracts the signals of the frequency domain, and outputs the extracted signals to the demultiplexing unit 3055.

The demultiplexing unit 1055 separates the signals input from the radio reception unit 3057 into the PUCCH, the PUSCH, the uplink reference signal, and the like. The separation is performed based on allocation information of radio resources included in the uplink grant determined by the radio resource control unit 3011 of the base station device 3 and notified to each mobile station device 1. The demultiplexing unit 3055 performs channel compensation of the PUCCH and the PUSCH from the channel estimation value input from the channel measurement unit 3059. The demultiplexing unit 3055 outputs the separated uplink reference signal to the channel measurement unit 3059.

The demodulation unit 3053 performs inverse discrete Fourier transform (IDFT) on the PUSCH, acquires the modulation symbols, and demodulates the reception signals using a modulation scheme determined in advance, such as BPSK (Binary Phase Shift Keying), QPSK, 16QAM, or 64QAM, or a modulation scheme notified in advance from the base station device to each of the mobile station devices 1 by the uplink grant on each of the modulation symbols of the PUCCH and the PUSCH. The demodulation unit 3053 separates the modulation symbols of a plurality of pieces of uplink data transmitted in the same PUSCH using MIMO SM based on the number of sequences to be space-multiplexed notified in advance to each of the mobile station devices 1 by the uplink grant and information indicating precoding on the sequences.

The decoding unit 3051 decodes the coding bits of the demodulated PUCCH and PUSCH at a coding rate determined in advance of a coding scheme determined in advance or a coding rate notified in advance from the base station device to each of the mobile station devices 1 by the uplink grant and outputs the decoded uplink data and the uplink control information to the higher layer processing unit 101. When retransmitting the PUSCH, the decoding unit 3051 decodes a coding bit held in a HARQ buffer input from the higher layer processing unit 301 and the demodulated coding bit. The channel measurement unit 309 measures the channel estimation value, the channel quality, and the like from the uplink reference signal input from the demultiplexing unit 3055 and outputs the measurement result to the demultiplexing unit 3055 and the higher layer processing unit 301.

The transmission unit 307 generates the downlink reference signal according to the control signals input from the control unit 303, encodes and modulates the HARQ indicator and the downlink control information, and downlink data input from the higher layer processing unit 301, multiplexes the PHICH, the PDCCH, the EPDCCH, the PDSCH, and the downlink reference signal, and outputs the signals to the mobile station devices 1 through the transmission/reception antenna 309.

The coding unit 3071 encodes the HARQ indicator, the downlink control information, and downlink data input from the higher layer processing unit 301 using a coding scheme determined in advance, such as block coding, convolution coding, or turbo coding, or a coding scheme determined by the radio resource control unit 3011. The modulation unit 3073 modulates the coding bit input from the coding unit 3071 by a modulation scheme determined in advance, such as BPSK, QPSK, 16QAM, or 64QAM, or a modulation scheme determined by the radio resource control unit 3011.

The downlink reference signal generation unit 3079 generates a sequence obtained by a rule determined in advance based on the physical layer cell identifier (PCI) or the like for identifying the base station device 3 and known to the mobile station devices 1 as the downlink reference signal. The multiplexing unit 3075 multiplexes the modulation symbols of each modulated channel and the generated downlink reference signal. That is, the multiplexing unit 3075 maps the modulation symbols of each modulated channel and the generated downlink reference signal in the resource elements.

The radio transmission unit 3077 performs inverse fast Fourier transform (IFFT) on the multiplexed modulation symbols and the like, performs modulation according to an OFDM system, appends a guard interval to the OFDM-modulated OFDM symbols, generates baseband digital signals, converts the baseband digital signals to analog signals, generates in-phase components and quadrature components having an intermediate frequency from the analog signals, removes excessive frequency components for the intermediate frequency band, converts the signals having the intermediate frequency to signals having a high frequency (up convert), removes excessive frequency components, performs power amplification, and outputs and transmits the power-amplified signals to the transmission/reception antenna 309.

The PDCCH or the EPDCCH is used to notify (designate) the downlink control information (DCI) to a terminal. For example, the downlink control information includes information concerning the resource allocation of the PDSCH, information concerning MCS (Modulation and Coding scheme), information concerning scrambling identity (also referred to as scrambling identifier), information concerning reference signal sequence identity (also referred to as base sequence identity, base sequence identifier, or base sequence index), and the like.

Hereinafter, the details of the PDCCH will be described. The PDCCH (first control channel) has a plurality of control channel elements (CCE). The number of CCEs which are used by each downlink component carrier depends on a downlink component carrier bandwidth, the number of OFDM symbols of the PDCCH, and the number of transmission antenna ports of the cell-specific reference signal of the downlink according to the number of transmission antennas of the base station device 3 for communication. Each CCE has a plurality of downlink resource elements (a resource determined by one OFDM symbol and one sub-carrier).

The CCEs which are used between the base station device 3 and the mobile station devices 1 are numbered for identifying the CCEs. Numbering of the CCEs is performed specific to the base station device 3 based on a rule determined in advance. The PDCCH has one or more CCEs. The number of CCEs of one PDCCH is referred to as a CCE aggregation level. In the base station device 3, the CCE aggregation level of the PDCCH is set according to the coding rate set in the PDCCH and the number of bits of the DCI included in the PDCCH. A combination of CCE aggregation levels likely to be used for the mobile station devices 1 is determined in advance.

In addition, one CCE has nine different resource element groups (REG) distributed in the frequency domain and the time domain. One resource element group has four adjacent resource elements of the frequency domain. Specifically, interleaving is performed for all numbered resource element groups in terms of resource element groups using a block interleaver for all downlink component carriers, and one CCE has nine consecutive resource element groups having continuous numbers after interleaving.

In each terminal, a region (SS; Search Space) where the PDCCH is searched is set. The SS has a plurality of CCEs. The SS has a plurality of CCEs with consecutive numbers from the smallest CCE, and the number of a plurality of CCEs with consecutive numbers is determined in advance. The SS of each CCE aggregation level is constituted by an aggregate of candidates of a plurality of PDCCHs. The SS is classified into a CSS (Cell-specific SS) where the number is common in a cell from the smallest CCE and a USS (UE-specific SS) where the number is specific to a terminal from the smallest CCE. In the CSS, the PDCCH to which control information, such as system information or information concerning paging, read by a plurality of terminals is allocated, or the PDCCH to which a downlink/uplink grant indicating a fallback to a lower-level transmission scheme or a random access is allocated can be allocated.

The base station device 3 transmits the PDCCH using one or more CCEs in the SS set in the mobile station devices 1. The mobile station devices 1 decode the reception signals using one or more CCEs in the SS and perform processing for detecting the PDCCH addressed to the mobile station devices (referred to as blind decoding). The mobile station devices 1 set a different SS for each CCE aggregation level. Thereafter, the mobile station devices 1 perform blind decoding using a combination of CCEs determined in advance in a different SS for each CCE aggregation level. In other words, the mobile station devices 1 perform blind decoding on the candidates of each PDCCH in a different SS for each CCE aggregation level. A series of processing in the mobile station devices 1 is referred to as monitoring of the PDCCH.

Hereinafter, the details of the EPDCCH will be described. Similarly to the PDCCH, the EPDCCH is used to notify of the DCI (Downlink control information).

The EPDCCH is transmitted using an aggregation of one or more ECCEs (Enhanced control channel elements). Each ECCE consists of a plurality of EREGs (Enhanced resource element groups). The EREGs are used to define mapping to the resource elements of the EPDCCH. In each RB pair, 16 EREGs numbered 0 to 15 are defined. That is, in each RB pair, EREG0 to EREG15 are defined. In each RB pair, EREG0 to EREG15 are defined periodically with priority to the frequency direction for resource elements other than resource elements to which predetermined signals and/or channels are mapped. For example, EREGs are not defined on the resource elements to which a demodulation reference signal associated with the EPDCCH transmitted through antenna ports 107 to 110 is mapped.

The number of ECCEs used for one EPDCCH depends on an EPDCCH format and is determined based on other parameters. The number of ECCEs used for one EPDCCH is also referred to as an aggregation level. For example, the number of ECCEs used for one EPDCCH is determined based on the number of resource elements which can be used for EPDCCH transmission in one RB pair, a transmission method of the EPDCCH, and the like. For example, the number of ECCEs used for one EPDCCH is 1, 2, 4, 8, 16, or 32. The number of EREGs used for one ECCE is determined based on the type of a subframe and the type of a cyclic prefix and is 4 or 8. As the transmission method of the EPDCCH, distributed transmission and localized transmission are supported.

The EPDCCH can use the distributed transmission and the localized transmission. The distributed transmission and the localized transmission are different in mapping of the ECCEs to the EREGs and the RB pairs. For example, in the distributed transmission, one ECCE is constituted using the EREGs of a plurality of RB pairs. In the localized transmission, one ECCE is constituted using the EREGs of one RB pair.

The base station device 3 performs the configuration concerning the EPDCCH for the mobile station devices 1. The mobile station devices 1 monitor a plurality of EPDCCHs based on the configuration from the base station device 3. A set of RB pairs which the mobile station devices 1 monitor the EPDCCH can be configured. A set of RB pairs is also referred to as an EPDCCH set or an EPDCCH-PRB set. One or more EPDCCH sets can be configured for one mobile station device 1. Each EPDCCH set consists of one or more RB pairs. The configuration concerning the EPDCCH can be performed separately for each EPDCCH set.

The base station device 3 can configure a prescribed number of EPDCCH sets for the mobile station device 1. For example, up to two EPDCCH sets can be configured as an EPDCCH set 0 and/or an EPDCCH set 1. Each of the EPDCCH sets can be constituted by a prescribed number of RB pairs. Each of the EPDCCH sets constitutes one set of plural ECCEs. The number of ECCEs constituting one EPDCCH set is determined based on the number of RB pairs which are configured as the corresponding EPDCCH set, and the number of EREGs used in one ECCE. When the number of ECCEs constituting one EPDCCH set is N, each of the EPDCCH sets constitutes ECCEs numbered with 0 to N−1. For example, when the number of EREGs used in one ECCE is 4, an EPDCCH set constituted by 4 RB pairs constitutes 16 ECCEs.

The candidates of the EPDCCH which are monitored by the mobile station devices 1 are defined based on the ECCEs in the EPDCCH set. A set of candidates of the EPDCCH is defined as a search space (search region). A UE-specific search space which is a search space specific to the mobile station devices 1 and a common search space which is a search space specific to the base station device 3 (cell, transmission point, UE group) are defined. The monitoring of the EPDCCH includes that the mobile station devices 1 attempt to decode each of the candidates of the EPDCCH in the search space according to the DCI format to be monitored.

Figure 9:
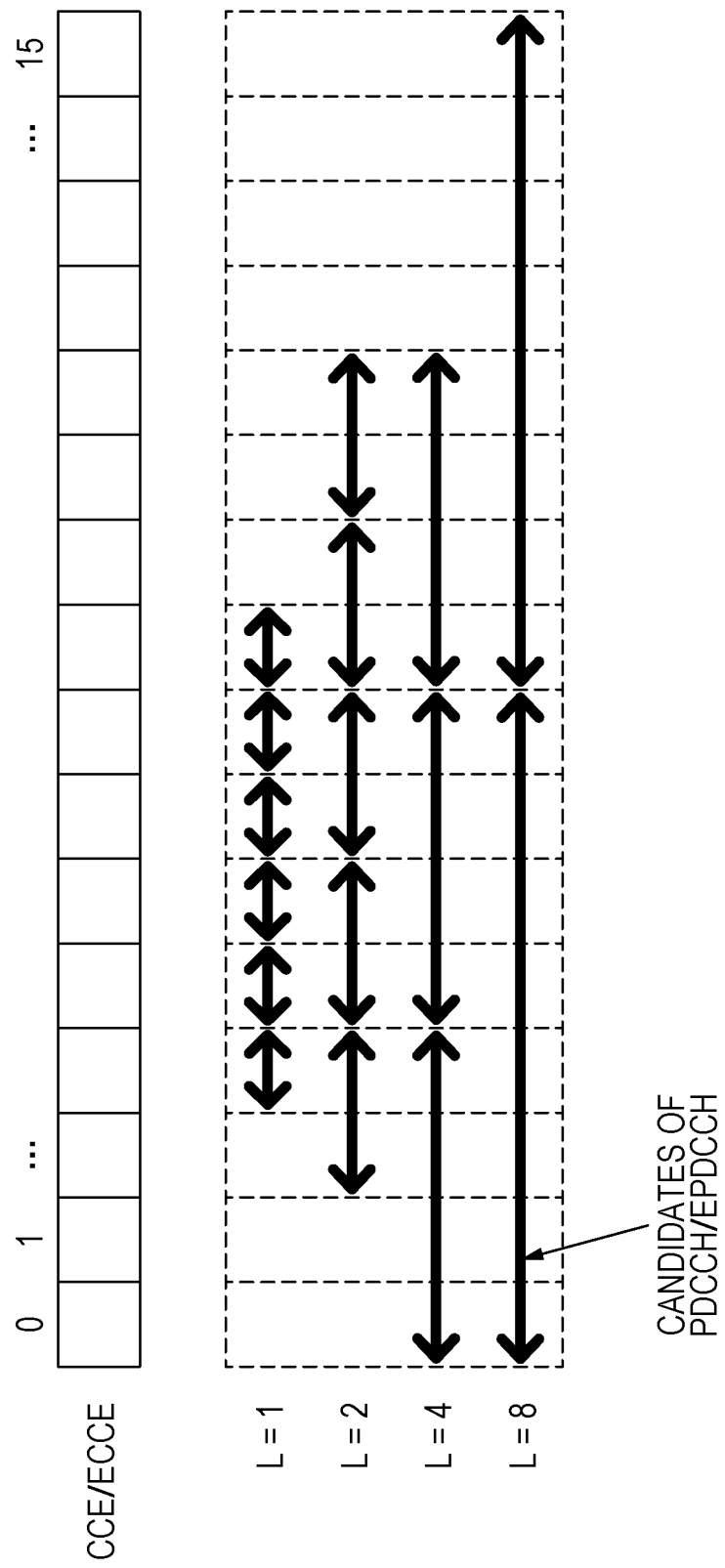
FIG. 9 is a diagram illustrating an example of an EPDCCH search space.

FIG. 9 is a diagram illustrating an example of a PDCCH/EPDCCH search space. FIG. 9 illustrates an example of search spaces when the aggregation level L is 1, 2, 4, and 8, in a case where each of the search spaces is constituted by 16 CCEs/ECCEs. In this example, when the aggregation level L is 1, 2, 4, and 8, the number of EPDCCH candidates is 6, 5, 3, and 2. CCEs/ECCEs corresponding to PDCCH/EPDCCH candidates in the search space are given by a prescribed parameter and a prescribed method (expression). For example, CCEs/ECCEs corresponding to the PDCCH/EPDCCH candidates in the search space are determined by using a start index, the aggregation level, and/or the number of CCEs/ECCEs in a prescribed region.

The start index can be independently configured by the search space. In a case of the common search space, the start index is a value specific to the base station device 3 (cell). For example, in the case of the common search space, the start index is a value which has been defined in advance, or a value which is determined based on a parameter specific to the base station device 3. In a case of the UE-specific search space, the start index is a value specific to the mobile station device 1. For example, the start index is a prescribed value, that is, is determined based on a subframe k and a RNTI (for example, C-RNTI) of the mobile station device 1. A plurality of common search spaces and/or a plurality of UE-specific search spaces may be configured to one EPDCCH set.

For example, the start index is a prescribed value, that is, is determined based on the subframe k and the RNTI (for example, Group-RNTI) specific to a group of the mobile station devices 1. The RNTI specific to a group of the mobile station devices 1 is used in transmission of a PDCCH and an EPDCCH which are specific to the group of the mobile station devices 1. The PDCCH and the EPDCCH which are specific to the group of the mobile station devices 1 can transmit control information specific to the group of the mobile station devices 1. The start index based on the RNTI specific to the group of the mobile station devices 1 can configure a search space specific to the group of the mobile station devices 1. Thus, since the base station device 3 can map a control channel for a plurality of mobile station devices with a common search space between the plurality of mobile station devices, it is possible to reduce overhead for transmitting the control information. For example, the control information specific to the group of the mobile station devices 1 is information regarding an uplink-downlink configuration in the TDD scheme. The Group-RNTI can be configured as information specific to the mobile station device 1, through RRC signaling. The search space based on the Group-RNTI is also referred to as a UE group-specific search space (GSS).

Although the search space is set in each aggregation, in the following description, a set of search spaces in each aggregation is simply referred to as a search space. That is, in the following description, a search space includes a set of search spaces.

Hereinafter, the details of the subframe configuration will be described.

For example, the subframe configuration is a configuration concerning the type of the subframe for each subframe. The type of a subframe includes a downlink subframe, an uplink subframe, a special subframe, and a flexible subframe. In the following description, the downlink subframe is also referred to as D, the uplink subframe is also referred to as U, the special subframe is also referred to as S, and the flexible subframe is also referred to as F.

The subframe configuration can be performed using information of various forms or formats. For example, the subframe configuration can be performed using explicit or implicit information for each subframe. The subframe configuration can be performed using explicit or implicit information for a predetermined number of subframes. The subframe configuration can be performed using information corresponding to a plurality of subframe configurations defined in advance.

FIG. 10 is an example of an uplink-downlink configuration. In FIG. 10, as the subframe configuration, an uplink-downlink configuration is used. Seven uplink-downlink configurations are defined in advance, and a number (index) corresponding to each uplink-downlink configuration is allocated. In each uplink-downlink configuration, the types of the subframes are defined for ten subframes in one radio frame. For example, the base station device 3 notifies each mobile station device 1 of the number of the uplink-downlink configuration, whereby the base station device 3 can perform the uplink-downlink configuration in the radio frame to the mobile station device 1. The mobile station device 1 is notified of the number of the uplink-downlink configuration from the base station device 3, whereby the mobile station device 1 can be subjected to the uplink-downlink configuration in the radio frame from the base station device 3.

The uplink-downlink configuration is a configuration concerning the pattern of a subframe in a radio frame. The uplink-downlink configuration represents whether each subframe in a radio frame is a downlink subframe, an uplink subframe, or a special subframe.

The pattern of a downlink subframe, an uplink subframe, or a special subframe represents whether each of subframes #0 to #9 is a downlink subframe, an uplink subframe, and a special subframe, and is preferably expressed by an arbitrary combination of D, U, and S having a length of 10. More preferably, the head subframe (that is, the subframe #0) is D, and the second subframe (that is, the subframe #1) is S.

In FIG. 10, the subframe 1 in the radio frame is constantly a special subframe. In FIG. 10, the subframes 0 and 5 are constantly reserved for downlink transmission, and the subframe 2 is constantly reserved for uplink transmission. In FIG. 10, when the downlink-to-uplink switch-point periodicity is 5 ms, the subframe 6 in the radio frame is a special subframe, and when the downlink-to-uplink switch-point periodicity is 10 ms, the subframe 6 in the radio frame is a downlink subframe.

The base station device 3 performs the subframe configuration in predetermined subframes to each mobile station device 1. The mobile station device 1 monitors the control channels including the PDCCH and/or the EPDCCH based on the subframe configuration set from the base station device 3.

The subframe configuration can be made by using various methods and control information. For example, the subframe configuration is made by using one or more uplink-downlink configuration and/or one or more control channel subframe configuration, for example. The control information used in the subframe configuration can be transmitted as information specific to the base station device 3 or the mobile station device 1. The control information used in the subframe configuration can be transmitted by using various methods, for example, a PDCCH, an EPDCCH, a MIB, a SIB, and/or a RRC. Notification of a control channel subframe configuration can be performed on a PDCCH and/or an EPDCCH having a CRC (Cyclic Redundancy Check) which is scrambled by using a Group-RNTI. The PDCCH and/or the EPDCCH used for the notification of the control channel subframe configuration can be allocated to a search space which is configured based on at least a Group-RNTI. For example, the control channel subframe configuration is information of a bitmap format for a prescribed subframe, or information of a format similar to an uplink-downlink configuration. For example, the control channel subframe configuration is a configuration relating to monitoring of a PDCCH and/or an EPDCCH. The control channel subframe configuration is information which indicates the subframe(s) in which the mobile station device 1 monitors a PDCCH and/or an EPDCCH, and the subframe(s) in which the mobile station device 1 does not monitor a PDCCH and/or an EPDCCH. The control channel subframe configuration is also referred to as a transmission direction UL-DL configuration. The control channel subframe configuration is used for at least notifying the mobile station device 1 of a downlink subframe in which a PDCCH and/or an EPDCCH is detected (monitored). The control channel subframe configuration may be used for notifying the mobile station device 1 of a downlink subframe in which channel state information (CSI) is defined.

The monitoring of the control channels can be switched (determined) based on the subframe configuration. For example, in the monitoring of the control channels, first monitoring and second monitoring can be switched based on the subframe configuration. The monitoring of the control channels determined based on the subframe configuration can be performed using various methods or rules.

The monitoring of the control channels can switch among different control channels and/or different search spaces. For example, in the monitoring of the control channels, a PDCCH or an EPDCCH is determined. In the monitoring of the control channels, a PDCCH search space (PDCCH-SS) or an EPDCCH search space (EPDCCH-SS) is determined. In the monitoring of the control channels, a CSS, a USS, and/or a GSS is determined. In the monitoring of the control channels, a PDCCH-CSS which is a common search space for monitoring the PDCCH, a PDCCH-USS which is a UE-specific search space for monitoring the PDCCH, an EPDCCH-CSS which is a common search space for monitoring the EPDCCH, an EPDCCH-USS which is a UE-specific search space for monitoring the EPDCCH, a PDCCH-GSS which is a UE group-specific search space for monitoring the PDCCH, and/or an EPDCCH-GSS which is a UE group-specific search space for monitoring the EPDCCH is determined. The EPDCCH-SS includes the EPDCCH-CSS, the EPDCCH-USS, and the EPDCCH-GSS. The PDCCH-SS includes the PDCCH-CSS, the PDCCH-USS, and the PDCCH-GSS.

The CSS is a search space configured by using a parameter specific to the base station device 3 (cell, transmission point) and/or a parameter which is defined in advance. For example, the CSS is a search space which can be used commonly between a plurality of mobile station devices. The base station device 3 maps a control channel which is common between the plurality of mobile station devices, with the CSS. Thus, it is possible to reduce overhead of resources for transmitting the control channel. The USS is a search space configured by using a parameter specific to at least the mobile station device 1. Since the USS can individually transmit control channels which are respectively specific to the mobile station devices 1, the base station device 3 can efficiently control the mobile station device 1. The GSS is a search space configured by using a parameter specific to a group of the mobile station devices 1. Since the GSS can transmit a control channel specific to the group of the mobile station devices 1, to the group of the mobile station devices 1, the base station device 3 can efficiently control the mobile station device 1. When a RNTI (Group-RNTI) specific to a group of mobile station devices 1, which is used in configuring of the GSS is configured as information specific to the mobile station device 1, the mobile station device 1 can consider the GSS as a USS. That is, in the mobile station device 1, a USS can be configured based on a C-RNTI, and a USS can be configured based on a Group-RNTI.

In the monitoring of the control channels, configurations, which are configured independently, can be further switched for the same control channel and/or the same search space. The configurations are processing or configurations for the control channels to be monitored. The configurations include configurations defined in advance. When a plurality of configurations are set or defined and the configurations are independent, the processing or the configurations for the control channels to be monitored are independent from one another. A configuration 1 (first configuration) and a configuration 2 (second configuration) correspond to first processing or configuration and second processing or configuration for the control channels to be monitored. The monitoring of the configuration 1 and the monitoring of the configuration 2 can be made different and are respectively referred to as first monitoring and second monitoring. For example, the configurations, which are configured independently, process mapping of the monitored control channels to the resource elements independently. The configuration 1 and the configuration 2 correspond to first mapping and second mapping of the monitored control channels to the resource elements. The monitoring of the control channels corresponding to the configurations which are configured independently of the same control channel and/or the same search space can be regarded as independent monitoring. That is, the monitoring of the control channels can switch among the configurations which are configured independently for the same control channel and/or the same search space.

The monitoring of the control channels can switch among different control channels, different search spaces, and/or different configurations. In the monitoring of the control channels corresponding to different control channels, different search spaces, and/or different configurations, the processing or the configurations of the control channels can be made different. For example, when the monitoring of the control channels is different, in the respective monitoring, the mappings (mapping methods, mapping rules) of the monitored control channels to the resource elements can be different. Specifically, different mappings are different in the resource elements which are not used for the mapping of the control channels with respect to the configuration or specification. The resource elements which are not used for the mapping of the control channels are the CRS, the NZP CSI-RS, the ZP CSI-RS, regions before a start symbol in the RB pair, and the like.

The processing or the configurations of the monitored control channels can be performed using various methods or assumptions. The processing or the configurations of the monitored control channels can be determined or switched based on the monitoring of the control channels. For example, the processing or the configurations of the monitored control channels are parameters for performing demodulation processing and/or decoding processing on the control channels. For example, the processing or the configurations of the monitored control channels are response signals to the PDSCH scheduled by the control channels.

The subframe configuration is performed in the mobile station device 1 by the base station device 3. The mobile station device 1 determines monitoring of a control channel based on the subframe configuration. The mobile station device 1 determines processing or configuration of the monitored control channel, at least based on the monitoring of the control channel. When first monitoring is determined, the mobile station device 1 determines first processing or first configuration of the monitored control channel. When second monitoring is determined, the mobile station device 1 determines second processing or second configuration of the monitored control channel. The mobile station device 1 monitors the control channel based on the determined processing or the determined configuration.

The base station device 3 performs the subframe configuration on the mobile station devices 1. The base station device 3 determines the monitoring of the control channels in the mobile station devices 1 based on the subframe configuration on the mobile station devices 1. The base station device 3 determines the processing or the configurations of the control channels of the mobile station devices 1 based on the monitoring of the control channels determined for the mobile station devices 1. When the first monitoring is determined for the mobile station devices 1, the base station device 3 determines the first processing or configuration for the control channels of the mobile station devices 1. When the second monitoring is determined for the mobile station devices 1, the base station device 3 determines the second processing or configuration for the control channels of the mobile station devices 1. The base station device 3 maps the control channels of the mobile station devices 1 to physical resources or logical resources based on the determined processing or configuration of the control channels.

Three or more kinds of the monitoring of the control channels and the processing or configurations of the monitored control channel may set or defined.

An example of the subframe configuration is performed by using one uplink-downlink configuration and one control channel subframe configuration. For example, the uplink-downlink configuration is configured as a configuration specific to the base station device 3 (cell), through a SIB. The control channel subframe configuration is configured as a configuration specific to the mobile station device 1, through RRC signaling. The control channel subframe configuration is configured as a configuration specific to a group of a plurality of mobile station devices 1, through a PDCCH, an EPDCCH, or RRC signaling. The control channel subframe configuration may be configured as a configuration specific to the base station device 3 (cell).

An example of the subframe configuration is performed by using two uplink-downlink configurations. For example, an uplink-downlink configuration 1 (UL/DL configuration 1) is configured as a configuration specific to the base station device 3 (cell), through a SIB. An uplink-downlink configuration 2 (UL/DL configuration 2) is configured as a configuration specific to the mobile station device 1, through RRC signaling. The uplink-downlink configuration 2 may be configured as a configuration specific to a group of a plurality of mobile station devices 1, through a PDCCH, an EPDCCH, or RRC signaling. The uplink-downlink configuration 1 may be an uplink reference UL-DL configuration. The uplink-downlink configuration 2 may be a downlink reference UL-DL configuration.

An example of the subframe configuration is performed by using one uplink-downlink configuration and two control channel subframe configurations. For example, an uplink-downlink configuration is configured as a configuration specific to the base station device 3 (cell), through a SIB. A control channel subframe configuration 1 and/or a control channel subframe configuration 2 are configured as a configuration specific to the mobile station device 1, through RRC signaling. The control channel subframe configuration 1 and/or the control channel subframe configuration 2 are configured as a configuration specific to a group of a plurality of mobile station devices 1, through a PDCCH, an EPDCCH, or RRC signaling. The control channel subframe configuration 1 and/or the control channel subframe configuration 2 may be configured as a configuration specific to the base station device 3 (cell).

An example of the subframe configuration is performed by using two uplink-downlink configurations and two control channel subframe configurations. For example, an uplink-downlink configuration 1 is configured as a configuration specific to the base station device 3 (cell), through a SIB. An uplink-downlink configuration 2 is configured as a configuration specific to the mobile station device 1, through RRC signaling. The uplink-downlink configuration 2 may be configured as a configuration specific to a group of a plurality of mobile station devices 1, through a PDCCH, an EPDCCH, or RRC signaling. A control channel subframe configuration 1 and/or a control channel subframe configuration 2 are configured as a configuration specific to the mobile station device 1, through RRC signaling. The control channel subframe configuration 1 and/or the control channel subframe configuration 2 are configured as a configuration specific to a group of a plurality of mobile station devices 1, through a PDCCH, an EPDCCH, or RRC signaling. The control channel subframe configuration 1 and/or the control channel subframe configuration 2 may be configured as a configuration specific to the base station device 3 (cell). The uplink-downlink configuration 1 may be an uplink reference UL-DL configuration. The uplink-downlink configuration 2 may be a downlink reference UL-DL configuration.

An example of the subframe configuration is performed by using two uplink-downlink configurations and one EPDCCH subframe configuration. For example, an uplink-downlink configuration 1 is configured as a configuration specific to the base station device 3 (cell), through a SIB. An uplink-downlink configuration 2 is configured as a configuration specific to the mobile station device 1, through RRC signaling. The uplink-downlink configuration 2 may be configured as a configuration specific to a group of a plurality of mobile station devices 1, through a PDCCH, an EPDCCH, or RRC signaling. A control channel subframe configuration is configured as a configuration specific to the mobile station device 1, through RRC signaling. The control channel subframe configuration is configured as a configuration specific to a group of a plurality of mobile station devices 1, through a PDCCH, an EPDCCH, or RRC signaling. The control channel subframe configuration may be configured as a configuration specific to the base station device 3 (cell). The uplink-downlink configuration 2 may be configured as a configuration specific to the mobile station device 1, through RRC signaling. The uplink-downlink configuration 1 may be an uplink reference UL-DL configuration. The uplink-downlink configuration 2 may be a downlink reference UL-DL configuration.

A subframe, where one of the uplink-downlink configuration 1 and the uplink-downlink configuration 2 is D or S and the other one of the uplink-downlink configuration 1 and the uplink-downlink configuration 2 is U, is also referred to as a flexible subframe. For example, the flexible subframe is a subframe where an uplink subframe or a downlink subframe can be dynamically switched. That is, the base station device 3 can dynamically determine the flexible subframe as an uplink subframe or a downlink subframe in consideration of a load of communication. For this reason, the base station device 3 can implement efficiency communication. For example, when the monitoring of the control channels is performed in the flexible subframe, the mobile station devices 1 may recognize the subframe as a downlink subframe. When the transmission of an uplink channel and/or an uplink signal in the flexible subframe is instructed, the mobile station devices 1 may recognize the subframe as an uplink subframe. When the flexible subframe is recognized as an uplink subframe, the mobile station devices 1 can configure or prescribe such that the monitoring of the control channels is not performed in the subframe. A subframe, where one of the uplink-downlink configuration 1 and the uplink-downlink configuration 2 is D or S and the other one of the uplink-downlink configuration 1 and the uplink-downlink configuration 2 is D or S, is also referred to as a fixed subframe.

A legacy mobile station device which cannot recognize the flexible subframe can recognize the flexible subframe as an uplink subframe. The legacy mobile station device which cannot recognize the flexible subframe may not perform transmission and reception processing when an uplink channel and/or an uplink signal is not indicated in the subframe. With this, the base station device 3 which uses the flexible subframe can implement communication with a mobile station device which can recognize the flexible subframe and a mobile station device which cannot recognize the flexible subframe.

The subframe configuration (uplink-downlink configuration) can be configured by using the uplink reference UL-DL configuration, the downlink reference UL-DL configuration, and/or the transmission direction UL-DL configuration (control channel subframe configuration). Hereinafter, the uplink reference UL-DL configuration, the downlink reference UL-DL configuration, and the transmission direction UL-DL configuration will be described.

The uplink reference UL-DL configuration, the downlink reference UL-DL configuration, and the transmission direction UL-DL configuration are defined by the uplink-downlink configuration (UL-DL configuration).

That is, the uplink reference UL-DL configuration, the downlink reference UL-DL configuration, and the transmission direction UL-DL configuration are defined by the patterns of a downlink subframe, an uplink subframe, and a special subframe in a radio frame.

The uplink reference UL-DL configuration is also referred to as a first parameter, a first configuration, or a serving cell uplink-downlink configuration. The downlink reference UL-DL configuration is also referred to as a second parameter or a second configuration. The transmission direction UL-DL configuration is also referred to as a third parameter or a third configuration.

When an uplink-downlink configuration i is configured as the uplink reference UL-DL configuration, this is also referred to as that an uplink reference UL-DL configuration i is configured. When the uplink-downlink configuration i is configured as the downlink reference UL-DL configuration, this is also referred to as that a downlink reference UL-DL configuration i is configured. When the uplink-downlink configuration i is configured as the transmission direction UL-DL configuration, this is also referred to as that a transmission direction UL-DL configuration i is configured.

Hereinafter, a setting method of the uplink reference UL-DL configuration, the downlink reference UL-DL configuration, and the transmission direction UL-DL configuration will be described.

The base station device 3 configures the uplink reference UL-DL configuration, the downlink reference UL-DL configuration, and the transmission direction UL-DL configuration. The base station device 3 may transmit first information (TDD-Config) indicating the uplink reference UL-DL configuration, second information indicating the downlink reference UL-DL configuration, and third information indicating the transmission direction UL-DL configuration included in at least one of a MIB, a system information block type 1 message, a system information message, an RRC message, a MAC CE (Control Element), and control information (for example, DCI format) of a physical layer. Depending on the situation, the base station device 3 may include the first information, the second information, and the third information in any of the MIB, the system information block type 1 message, the system information message, the RRC message, the MAC CE (Control Element), and the control information (for example, DCI format) of the physical layer.

The uplink reference UL-DL configuration, the downlink reference UL-DL configuration, and the transmission direction UL-DL configuration may be defined for each of a plurality of serving cells.

The base station device 3 transmits the first information, the second information, and the third information of each serving cell to the mobile station devices 1 in which a plurality of serving cells are configured. The first information, the second information, the third information may be defined for each serving cell.

The base station device 3 may transmit, to the mobile station devices 1 in which two serving cells of one primary cell and one secondary cell are configured, first information for the primary cell, second information for the primary cell, third information for the primary cell, first information for the secondary cell, second information for the secondary cell, and third information for the secondary cell.

The mobile station devices 1 in which a plurality of serving cells are configured may configure an uplink reference UL-DL configuration, a downlink reference UL-DL configuration, and a transmission direction UL-DL configuration based on the first information, the second information, and the third information for each serving cell.

The mobile station devices 1 in which two serving cells of one primary cell and one secondary cell are configured may configure the uplink reference UL-DL configuration for the primary cell, the downlink reference UL-DL configuration for the primary cell, the transmission direction UL-DL configuration for the primary cell, the uplink reference UL-DL configuration for the secondary cell, the downlink reference UL-DL configuration for the secondary cell, and the transmission direction UL-DL configuration for the secondary cell.

It is preferable that the first information for the primary cell is included in the system information block type 1 message or the RRC message. It is preferable that the first information for the secondary cell is included in the RRC message. It is preferable that the second information for the primary cell is included in the system information block type 1 message, the system information message, or the RRC message. It is preferable that the second information for the secondary cell is included in the RRC message. It is preferable that the third information is included in the control information (for example, DCI format) of the physical layer.

It is preferable that the first information is common to a plurality of mobile station devices 1 in a cell. The second information may be common to a plurality of mobile station devices 1 in a cell or may be dedicated for the mobile station device 1. The third information may be common to a plurality of mobile station devices 1 in a cell or may be dedicated for the mobile station device 1.

An initial transmission of the system information block type 1 message is performed through the PDSCH in a subframe 5 of a radio frame satisfying SFN mod 8=0 and retransmission (repetition) is performed in a subframe 5 of other radio frames satisfying SFN mod 2=0. The system information block type 1 message includes information indicating the configuration (the length of DwPTS, GP, and UpPTS) of the special subframe. The system information block type 1 message is information specific to a cell.

The system information message is transmitted through the PDSCH. The system information message is information specific to a cell. The system information message includes a system information block X other than a system information block type 1.

The RRC message is transmitted through the PDSCH. The RRC message is information/signal which is processed in an RRC layer. The RRC message may be common to a plurality of mobile station devices 1 in a cell or may be dedicated for a specific mobile station device 1.

The MAC CE is transmitted through the PDSCH. The MAC CE is information/signal which is processed in a MAC layer.

The mobile station devices 1 execute a prescribed setting method for each of a plurality of serving cells. The mobile station devices 1 set the uplink reference UL-DL configuration based on the first information for a certain serving cell. The mobile station devices 1 determine whether or not the second information for the certain serving cell is received. When the second information for the certain serving cell is received, the mobile station devices 1 sets the downlink reference UL-DL configuration based on the second information for the certain serving cell, to the certain serving cell. When the second information of the certain serving cell is not received (else/otherwise), the mobile station devices 1 sets the downlink reference UL-DL configuration based on the first information of the certain serving cell, to the certain serving cell.

A serving cell where the uplink reference UL-DL configuration and the downlink reference UL-DL configuration are configured based on the first information is also referred to as a serving cell where dynamic TDD is not configured. A serving cell where the downlink reference UL-DL configuration is configured based on the second information is also referred to as a serving cell where the dynamic TDD is configured.

The mobile station devices 1 receive the second information and determine a subframe where the transmission of the uplink signal is possible based on the second information. Next, the mobile station devices 1 monitor the third information. When the third information is received, the mobile station devices 1 determine a subframe where the transmission of the uplink signal is possible based on the third information.

Hereinafter, the uplink reference UL-DL configuration will be described.

The uplink reference UL-DL configuration is used at least for specifying a subframe where uplink transmission is possible or impossible in a serving cell.

The mobile station devices 1 do not perform the uplink transmission in a subframe which is indicated as a downlink subframe by the uplink reference UL-DL configuration. The mobile station devices 1 do not perform the uplink transmission in the DwPTS and the GP of a subframe which is indicated as a special subframe by the uplink reference UL-DL configuration.

Hereinafter, the downlink reference UL-DL configuration will be described.

The downlink reference UL-DL configuration is used at least for specifying a subframe where downlink transmission is possible or impossible in a serving cell.

The mobile station devices 1 do not perform the downlink transmission in a subframe which is indicated as an uplink subframe by the downlink reference UL-DL configuration. The mobile station devices 1 do not perform the downlink transmission in the UpPTS and the GP of a subframe which is indicated as a special subframe by the downlink reference UL-DL configuration.

The mobile station devices 1 in which the downlink reference UL-DL configuration is configured based on the first information may perform measurement (for example, measurement concerning channel state information) using the downlink signal in the DwPTS of the downlink subframe or the special subframe indicated by the uplink reference UL-DL configuration or the downlink reference UL-DL configuration.

The base station device 3 determines the downlink reference UL-DL configuration from a configuration set (set of configurations) restricted based on the uplink reference UL-DL configuration. That is, the downlink reference UL-DL configuration is an element in a configuration set restricted based on the uplink reference UL-DL configuration. The configuration set restricted based on the uplink reference UL-DL configuration includes the uplink-downlink configuration satisfying a prescribed condition.

With this, in the dynamic TDD, since the the subframe and DwPTS of the special subframe which are indicated as a downlink subframe by the uplink reference UL-DL configuration are not used for the uplink transmission, the mobile station devices 1 in which the downlink reference UL-DL configuration is set based on the first information can appropriately perform measurement using the downlink signal.

The mobile station devices 1 in which the downlink reference UL-DL configuration is configured based on the second information may perform measurement (for example, measurement concerning channel state information) using the downlink signal in the downlink subframe or the DwPTS of the special subframe which are indicated by the uplink reference UL-DL configuration.

A subframe, which is indicated as an uplink subframe by the uplink reference UL-DL configuration and is indicated as a downlink subframe by the downlink reference UL-DL configuration, is also referred to as a first flexible subframe. The first flexible subframe is a subframe which is reserved for the uplink and downlink transmission.

A subframe, which is indicated as a special subframe by the uplink reference UL-DL configuration and is indicated as a downlink subframe by the downlink reference UL-DL configuration, is also referred to as a second flexible subframe. The second flexible subframe is a subframe which is reserved for the downlink transmission. The second flexible subframe is a subframe which is reserved for the downlink transmission in the DwPTS and the uplink transmission in the UpPTS.

Hereinafter, the transmission direction UL-DL configuration will be described in detail.

The mobile station devices 1 and the base station device 3 configure the transmission direction UL-DL configuration concerning the directions (upward/downward) of transmissions in subframes. The transmission direction UL-DL configuration is used to determine the directions of transmissions in subframes.

The mobile station devices 1 control transmissions in the first flexible subframe and the second flexible subframe based on scheduling information (DCI format and/or HARQ-ACK) and the transmission direction UL-DL configuration.

The base station device 3 transmits the third information indicating the transmission direction UL-DL configuration to the mobile station devices 1. The third information is information indicating a subframe where the uplink transmission is possible. The third information is information indicating a subframe where the downlink transmission is possible. The third information is information indicating a subframe where the uplink transmission is possible in the UpPTS and the downlink transmission is possible in the DwPTS.

For example, the transmission direction UL-DL configuration is used to specify the direction of transmission in a subframe which is indicated as an uplink subframe by the uplink reference UL-DL configuration and is indicated as a downlink subframe by the downlink reference UL-DL configuration and/or a subframe which is indicated as a special subframe by the uplink reference UL-DL configuration and is indicated as a downlink subframe by the downlink reference UL-DL configuration. That is, the transmission direction UL-DL configuration is used to specify the direction of transmission in a subframe which is indicated as different subframes in the uplink reference UL-DL configuration and the downlink reference UL-DL configuration.

An example where, in the monitoring of the control channels corresponding to different control channels, different search spaces, and/or different configurations, the processing or the configurations of the control channels can be different or independent has been described. Hereinafter, another example of the processing or the configurations in the monitoring of the control channels will be described. Hereinafter, although description will be provided as to first monitoring and second monitoring, the first monitoring and the second monitoring include the monitoring of the control channels corresponding to different control channels, different search spaces, and/or different configurations.

Another example of the processing or the configurations in the monitoring of the control channels is processing or a configuration concerning a PUCCH resource of HARQ response information (HARQ-ACK). The HARQ response information includes response information to PDSCH transmission indicated by detection of the control channels and response information to the control channels including control information indicating SPS (semi-persistent scheduling) release (end). The HARQ response information represents ACK indicating that reception could be normally done, NACK indicating that reception could not be normally done, and/or DTX indicating that transmission is not performed (reception is not performed).

The mobile station devices 1 transmit the HARQ response information to the base station device 3 through the PUCCH and/or the PUSCH. The base station device 3 receives the HARQ response information from the mobile station device 1 through the PUCCH and/or the PUSCH. With this, the base station device 3 understands whether or not the mobile station devices 1 could correctly receive the PDSCH or the control channels.

Next, a PUCCH resource constituted in the base station device 3 will be described. The HARQ response information spreads to a SC-FDMA sample region using a cyclically shifted pseudo CAZAC (Constant-Amplitude Zero-Auto-Correlation) sequence and further spreads to 4 SC-FDMA symbols in a slot using an orthogonal code OCC (Orthogonal Cover Code) having a code length of 4. The symbols spread by two codes are mapped to two RBs having different frequencies. In this way, the PUCCH resource is defined by three elements of a cyclic shift amount, an orthogonal code, and/or RBs to be mapped. The cyclic shift in the SC-FDMA sample region may be expressed by phase rotation which increases uniformly in the frequency domain.

An uplink control channel region (PUCCH region) which is used for PUCCH transmission is constituted using a predetermined number of RB pairs which are RB pairs at both ends of an uplink system bandwidth. A physical resource which is used for the PUCCH transmission is constituted by two RBs having different frequencies between a first slot and a second slot. The physical resource which is used for the PUCCH transmission is expressed by m (m=0, 1, 2, . . . ). One PUCCH is allocated in a physical resource which is used for any PUCCH transmission. With this, since one PUCCH is transmitted using resources having different frequencies, a frequency diversity effect is obtained.

A PUCCH resource (uplink control channel logical resource) which is a resource for PUCCH transmission is defined using an orthogonal code, a cyclic shift amount, and/or a frequency resource. For example, a PUCCH resource can be used when it is assumed that the elements constituting the PUCCH resource are three orthogonal codes of OC0, OC1, and OC2, six cyclic shift amounts of CS0, CS2, CS4, CS6, CS8, and CS10, and m representing the frequency resource. Each combination of the orthogonal code, the cyclic shift amount, and m is defined uniquely corresponding to nPUCCH which is an index representing the PUCCH resource (uplink control channel logical resource). The index representing the PUCCH resource is referred to as a PUCCH resource number. The correspondence of the nPUCCH, the orthogonal code, the cyclic shift amount, and m is an example, and other correspondences may be used. For example, the cyclic shift amount or m may be correlated to change among the consecutive nPUCCHs. The cyclic shift amounts CS1, CS3, CS5, CS7, CS9, and CS11 different from CS0, CS2, CS4, CS6, CS8, and CS10 may be used. Here, a case where the value of m is equal to or greater than NF2. Frequency resources having m less than NF2 are NF2 frequency resources which are reserved for PUCCH transmission to feed back the channel state information.

Next, a transmission mode which is used to transmit the HARQ response information will be described. In regards to the HARQ response information prescribes, various transmission modes (transmission methods) are defined. The transmission mode which is used to transmit the HARQ response information is determined by information or the configuration specific to the base station device 3, information or the configuration specific to the mobile station devices 1, information concerning the PDCCH corresponding to the HARQ response information, the configuration of the higher layer, and the like. The transmission mode which is used to transmit the HARQ response information is HARQ response information bundling (HARQ-ACK bundling) and HARQ response information multiplexing (HARQ-ACK multiplexing).

There is a case where a plurality of pieces of HARQ response information are transmitted in a certain uplink subframe. The number of kinds of HARQ response information transmitted in a certain uplink subframe is determined by the number of code words (transport blocks) transmitted by one PDSCH, the subframe configuration, and/or the configuration of carrier aggregation. For example, one PDSCH can transmit a maximum of two code words by MIMO (Multi Input Multi Output) transmission, and the HARQ response information is generated for each code word. For example, in the TDD, the type of the subframe is determined based on the subframe configuration. For this reason, in a certain uplink subframe, when the HARQ response information to the PDSCH transmission is transmitted in a plurality of downlink subframes, a plurality of pieces of HARQ response information to the code words of the PDSCH in each downlink subframe are generated. For example, when carrier aggregation is configured by a plurality of cells, a plurality of pieces of HARQ response information to the code words of the PDSCH transmitted by each cell are generated.

When a plurality of pieces of HARQ response information are transmitted in a certain uplink subframe, these kinds of HARQ response information are transmitted using HARQ response information bundling and/or HARQ response information multiplexing.

The HARQ response information bundling performs logical operation to a plurality of pieces of HARQ response information. The HARQ response information bundling can be performed in various units. For example, the HARQ response information bundling is performed for all code words in a plurality of downlink subframes. The HARQ response information bundling is performed for all code words in one downlink subframe. The HARQ response information bundling can reduce the amount of the HARQ response information. The HARQ response information multiplexing performs multiplexing on a plurality of pieces of HARQ response information. Information subjected to the HARQ response information bundling may be further multiplexed. In the following description, information subjected to the HARQ response information bundling is simply referred to as HARQ response information.

In regards to the PUCCH which transmits the HARQ response information, a plurality of formats can be defined. The PUCCH format to transmit the HARQ response information is a PUCCH format 1a, a PUCCH format 1b, a PUCCH format 1b with channel selection (PUCCH 1b with channel selection), a PUCCH format 3, or the like. The transmission mode which is used to transmit the HARQ response information includes the PUCCH format to be transmitted.

The PUCCH format 1a is a PUCCH format which is used to transmit one bit of HARQ response information. When the HARQ response information is transmitted in the PUCCH format 1a, one PUCCH resource is allocated, and the HARQ response information is transmitted using the PUCCH resource.

The PUCCH format 1b is a PUCCH format which is used to transmit two bits of HARQ response information. When the HARQ response information is transmitted in the PUCCH format 1b, one PUCCH resource is allocated, and the HARQ response information is transmitted using the PUCCH resource.

The PUCCH format 1b with channel selection is a PUCCH format which is used to transmit two, three, or four pieces of HARQ response information. In regards to the PUCCH format which is used to transmit the two, three, or four pieces of HARQ response information, two, three, or four PUCCH resources (channels) are configured. In the channel selection, any of a plurality of configured PUCCH resources is selected, and the selected PUCCH resource is used as a part of information. Two-bit information which can be transmitted using the selected PUCCH resource is used as a part of information. The two-bit information is subjected to QPSK modulation, and thus is transmitted as one symbol. That is, in the PUCCH format 1b with channel selection, the two, three, or four pieces of HARQ response information are transmitted using a combination of the PUCCH resource selected from the plurality of configured PUCCH resources and the two bits of information which can be transmitted using the selected PUCCH resource. The combination and each piece of HARQ response information are defined in advance. The HARQ response information is ACK, NACK, DTX, or NACK/DTX. The NACK/DTX represents the NACK or the DTX. For example, when carrier aggregation is not configured, the two, three, or four pieces of HARQ response information is HARQ response information to PDSCH transmission by two, three, or four downlink subframes.

The PUCCH format 3 is a PUCCH format which is used to transmit a maximum of 20 bits of HARQ response information. In the PUCCH format 3, one PUCCH resource is configured. In the PUCCH format 3, one PUCCH resource transmits a maximum of 20 bits of HARQ response information. The PUCCH resource in the PUCCH format 1a/1b and the PUCCH resource in the PUCCH format 3 are independent. For example, it is preferable that the base station device 3 configures such that the PUCCH resource in the PUCCH format 1a/1b and the PUCCH resource in the PUCCH format 3 are constituted using different physical resources (that is, two RBs constituting a physical resource for PUCCH transmission).

When the HARQ response information is transmitted using the PUCCH, the HARQ response information is mapped to the PUCCH resource configured explicitly and/or implicitly and transmitted. The PUCCH resource which is used to transmit the HARQ response information is determined uniquely by information or the configuration specific to the base station device 3, information or the configuration specific to the mobile station devices 1, and/or, information concerning the PDCCH or the EPDCCH corresponding to the HARQ response information, and the like. For example, the PUCCH resource number which represents the PUCCH resource to be used to transmit the HARQ response information is calculated using parameters included in information and/or parameter obtained from information, and a predetermined method (arithmetic operation).

Figure 11:
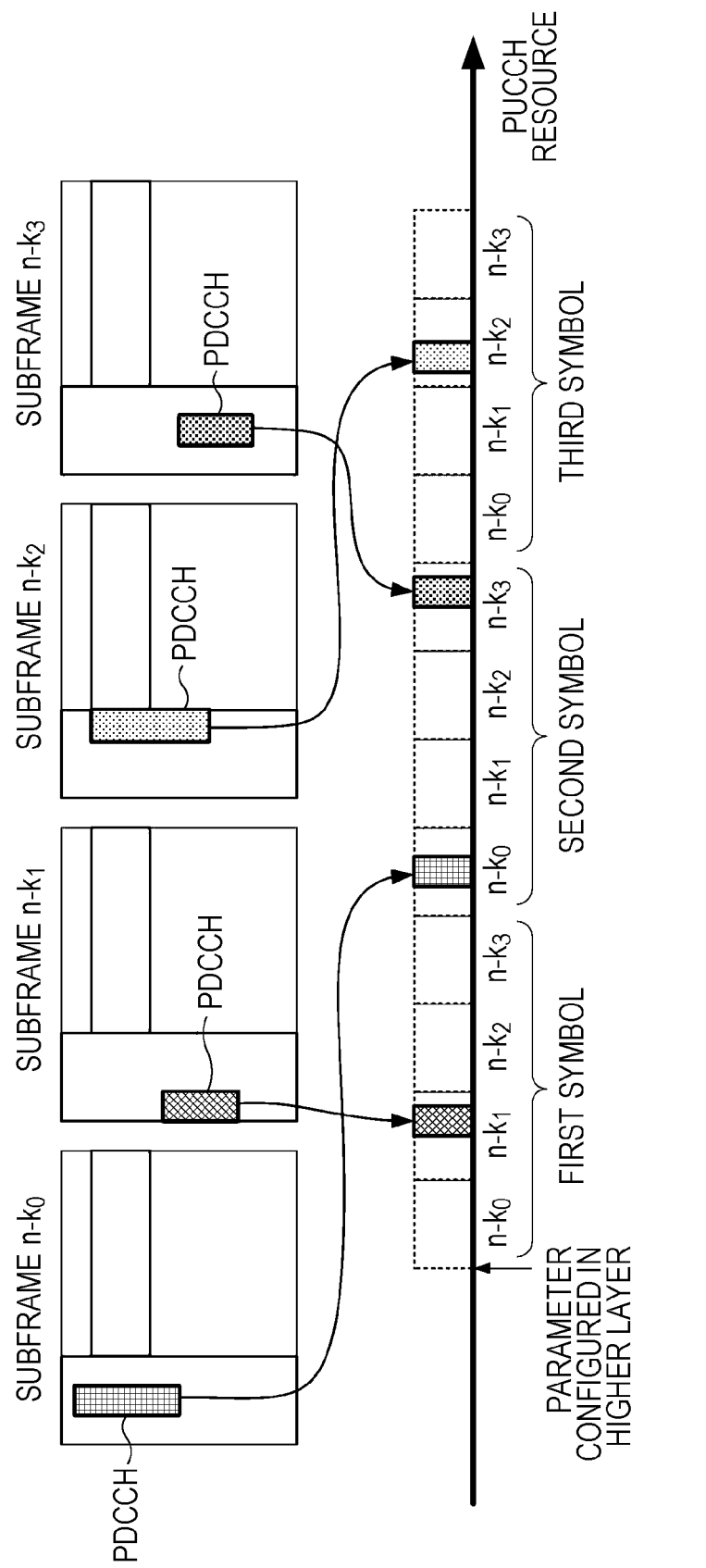
FIG. 11 is a diagram illustrating an example of HARQ response information multiplexing in PDSCH transmission, which is represented by a PDCCH.

FIG. 11 is a diagram illustrating an example of HARQ response information multiplexing in PDSCH transmission represented by a PDCCH. FIG. 11 illustrates PUCCH resources used for HARQ response information multiplexing when HARQ response information for 4 downlink subframes (4 bits) is transmitted by using a PUCCH format 1b with channel selection. FIG. 11 illustrates a PUCCH resource drawn from subframe n-$k_i$ in a certain uplink subframe n. Here, the subframe n-$k_i$ indicates a subframe being $k_i$ subframes prior to a subframe n. If the number of subframes (bits) subjected to HARQ response information multiplexing is M, i is an integer from 0 to (M−1). That is, in FIG. 11, 4-bit HARQ response information is transmitted in the subframe n by using PUCCH resources derived from four downlink subframes (subframe n-$k_0$, subframe n-$k_1$, subframe n-$k_2$, and subframe n-$k_3$). The value of M and the value of $k_i$ are defined based on the number of the subframe n and a subframe configuration. For example, the subframe configuration is determined based on the uplink-downlink configuration 1 and the uplink-downlink configuration 2.

PUCCH resources used for HARQ response information in PDSCH transmission indicated by a PDCCH are determined based on at least a parameter $N^{(1)}_{PUCCH}$ which is configured in a higher layer, and a first CCE number $n_{CCE}$ used for transmission of a PDCCH associated with the HARQ response information. As illustrated in FIG. 11, indices of the PUCCH resources used for HARQ response information in PDSCH transmission indicated by a PDCCH are given in an order from an OFDM symbol with which $n_{CCE}$ is mapped in each subframe. That is, block interleaving is performed between subframes with HARQ response information multiplexing. Thus, since the number of OFDM symbols constituting a PDCCH region in which is a PDCCH can be mapped can be configured for each subframe, a probability that the PUCCH resources are collected in front is increased. Accordingly, PUCCH resources used for HARQ response information are efficiently used.

FIG. 12 is a diagram illustrating an example of the HARQ response information multiplexing in PDSCH transmission represented by an EPDCCH. FIG. 12 illustrates PUCCH resources used for HARQ response information multiplexing when HARQ response information for 4 downlink subframes (4 bits) is transmitted by using a PUCCH format 1b with channel selection. FIG. 12 illustrates a PUCCH resource drawn from subframe n-$k_i$ in a certain uplink subframe n. Here, the subframe n-$k_i$ indicates a subframe being $k_i$ subframes prior to a subframe n. If the number of subframes (bits) subjected to HARQ response information multiplexing is M, i is an integer from 0 to (M−1). That is, in FIG. 11, 4-bit HARQ response information is transmitted in the subframe n by using PUCCH resources derived from four downlink subframes (subframe n-$k_0$, subframe n-$k_1$, subframe n-$k_2$, and subframe n-$k_3$). The value of M and the value of $k_i$ are defined based on the number of the subframe n and a subframe configuration. For example, the subframe configuration is determined based on the uplink-downlink configuration 1 and the uplink-downlink configuration 2.

PUCCH resources used for HARQ response information in PDSCH transmission indicated by an EPDCCH are determined based on at least a parameter $N^{(e1)}_{PUCCH}$ which is configured in a higher layer, and a first CCE number $n_{ECCE}$ used for transmission of an EPDCCH associated with the HARQ response information. As illustrated in FIG. 12, indices of the PUCCH resources used for HARQ response information in PDSCH transmission represented by an EPDCCH are given in an order from an EPDCCH which is mapped with the subframe n-$k_0$.

FIG. 13 is an example of a subframe configuration given by the uplink-downlink configuration 1 and the uplink-downlink configuration 2. For example, the uplink-downlink configuration 1 is configured (broadcasted) from the base station device 3 (serving cell) through the SIB so as to be specific to the base station device 3 (cell). The uplink-downlink configuration 2 is configured (notified) from the base station device 3 (serving cell) through RRC signaling so as to be specific to the mobile station device 1. The uplink-downlink configuration 1 and the uplink-downlink configuration 2 are control information using the uplink-downlink configuration illustrated in FIG. 10. The subframe configuration illustrated in FIG. 13 is given by the type of a subframe of the uplink-downlink configuration 1 and the uplink-downlink configuration 2.

A subframe in which the uplink-downlink configuration 1 and the uplink-downlink configuration 2 are D (downlink subframes) is D. A subframe in which the uplink-downlink configuration 1 and the uplink-downlink configuration 2 are S (special subframes) is S. A subframe in which the uplink-downlink configuration 1 and the uplink-downlink configuration 2 are U (uplink subframe) is U. A subframe in which the uplink-downlink configuration 1 is D and the uplink-downlink configuration 2 is U is D. A subframe in which the uplink-downlink configuration 1 is U and the uplink-downlink configuration 2 is D is F (flexible subframe).

Subframes configured as D, U, and S by the uplink-downlink configuration 1 and the uplink-downlink configuration 2 are also referred to fixed subframes. Subframes other than a subframe which is configured as F by the uplink-downlink configuration 1 and the uplink-downlink configuration 2 are also referred to fixed subframes. A subframe obtained as F by the uplink-downlink configuration 1 and the uplink-downlink configuration 2 may also be referred to a flexible subframe. For example, subframes obtained as F by the uplink-downlink configuration 1 and the uplink-downlink configuration 2 are subframes 3, 4, 7, 8 , and 9. In this case, subframes 0, 1, 2, 5, and 6 may also be referred to fixed subframes.

That is, a subframe in which the uplink-downlink configuration 1 is D is D regardless of the type of a subframe indicated by the uplink-downlink configuration 2. A subframe in which the uplink-downlink configuration 1 is U is U or F in accordance with the type of a subframe indicated by the uplink-downlink configuration 2. Thus, a mobile station device (mobile station device which can recognize a flexible subframe) in which the uplink-downlink configuration 2 is configured, and a mobile station device (mobile station device which cannot recognize a flexible subframe) in which the uplink-downlink configuration 2 is not configured can efficiently communicate in the same radio frame (serving cell).

The subframe 6 is a subframe in which the uplink-downlink configuration 1 and/or the uplink-downlink configuration 2 are S. The subframe 6 is D or S in accordance with the uplink-downlink configuration 1 and the uplink-downlink configuration 2. For example, when the subsequent subframe 7 is D, the subframe 6 may be set as D. When the subsequent subframe 7 is F or U, the subframe 6 may be set as S. Thus, a special subframe used for switching from D to U can be efficiently configured.

FIG. 13 illustrates a case where each of the uplink-downlink configuration 1 and the uplink-downlink configuration 2 uses 7 types of uplink-downlink configurations. However, it is not limited thereto. For example, the type of an uplink-downlink configuration used by the uplink-downlink configuration 1 and/or the uplink-downlink configuration 2 may be restricted. An uplink-downlink configuration used by the uplink-downlink configuration 1 and/or the uplink-downlink configuration 2 may be restricted to be 2 and 5.

Hereinafter, HARQ response information multiplexing in PDSCH transmission indicated by a PDCCH or an EPDCCH will be described in detail.

An example of details of the HARQ response information multiplexing in PDSCH transmission indicated by a PDCCH or an EPDCCH uses a downlink association set illustrated in FIG. 14 and an arithmetic operation of PUCCH resources used in transmission of the HARQ response information, which is illustrated in FIG. 15. FIG. 14 is a diagram illustrating an example of an index K: $\{k_0, k_1, \ldots, k_{M-1}\}$ of a downlink association set. FIG. 15 is a diagram illustrating an example of an expression for giving PUCCH resources used in transmission of the HARQ response information.

When the uplink-downlink configuration 2 is configured (flexible subframe can be recognized), and HARQ response information multiplexing is performed in a subframe n having M which is greater than 1, $n^{(1)}_{PUCCH,i}$ which is a PUCCH resource drawn from a subframe $n-k_i$, and HARQ-ACK(i) which is a response of ACK/NACK/DTX from a subframe $n-k_i$ are represented as follows. Here, M indicates the number of elements in a set K defined in FIG. 14. M is a value based on HARQ response information with multiplexing. The set k includes $k_i$ and i is from 0 to (M−1). For example, when the uplink-downlink configuration 1 is 0 and the uplink-downlink configuration 2 is 2, the set k in the subframe 2 is {7, 6, 4, 8}. M is 4, $k_0$ is 7, $k_1$ is 6, $k_2$ is 4, and $k_3$ is 8.

A PUCCH resource for PDSCH transmission indicated by detection of an associated PDCCH in a subframe $n-k_i$, or a PDCCH indicating a release (SPS release) of downlink SPS (Semi-Persistent Scheduling) in the subframe $n-k_i$ is given by an expression (a) in FIG. 15. Here, $n_{CCE,i}$ is the number (index) of a first CCE used for transmission of an associated PDCCH in the subframe $n-k_i$. $N^{(1)}_{PUCCH}$ is a parameter configured in a higher layer. $N^{DL}_{RB}$ is the number of resource blocks in a downlink. $N^{RB}_{sc}$ is the number of subcarriers per a resource block.

A PUCCH resource for PDSCH transmission indicated by detection of an associated EPDCCH in a subframe $n-k_i$, or an EPDCCH indicating a release (SPS release) of downlink SPS (Semi-Persistent Scheduling) in the subframe $n-k_i$ is given by an equation (b-1) and an equation (b-2) in FIG. 15. When an EPDCCH set (EPDCCH-PRB-set) q is configured with distributed transmission, the equation (b-1) in FIG. 15 is used for the PUCCH resource. When the EPDCCH set (EPDCCH-PRB-set) q is configured with localized transmission, the equation (b-2) in FIG. 15 is used for the PUCCH resource. Here, $n_{ECCE,q}$ is the number (index) of a first CCE used for transmission of DCI allocation in association with the EPDCCH set q which is the subframe $n-k_i$. That is, the number of the CCE is the lowest index of ECCEs used for constituting the EPDCCH. $N^{(e1)}_{PUCCH,q}$ is a parameter configured in a higher layer, in the EPDCCH set q. $N^{ECCE,q}_{RB}$ is the total number of resource blocks configured for the EPDCCH set q, in the subframe $n-k_i$.

That is, M pieces of PUCCH resources are given in a subframe n. The M pieces of PUCCH resources are used in transmission of a PUCCH having the PUCCH format 1b with channel selection. For example, when the uplink-downlink configuration 1 is 0, and the uplink-downlink configuration 2 is 2, four PUCCH resources are given in the subframe 2. The four PUCCH resources are used in transmission of a PUCCH having the PUCCH format 1b with channel selection.

Here, subframes represented by the set K in the table of the downlink association set illustrated in FIG. 14 are a downlink subframe, a special subframe, and/or a flexible subframe. Thus, even when a flexible subframe may be configured in addition to a downlink subframe and a special subframe, HARQ response information for a PDSCH transmitted in the downlink subframe, the special subframe, and/or the flexible subframe can be efficiently transmitted.

An example of details of the HARQ response information multiplexing in PDSCH transmission indicated by a PDCCH or an EPDCCH uses a downlink association set illustrated in FIG. 16 and an arithmetic operation of PUCCH resources used in transmission of the HARQ response information, which is illustrated in FIG. 17. FIG. 16 is a diagram illustrating an example of an index Ka: $\{k_0, k_1, \ldots, k_{Ma-1}\}$ and an index Kb: $\{k_{Ma}, k_{Ma+1}, \ldots, k_{M-1}\}$ of downlink association sets. FIG. 17 is a diagram illustrating an example of equations for giving PUCCH resources used in transmission of the HARQ response information.

When the uplink-downlink configuration 2 is configured (flexible subframe can be recognized), and HARQ response information multiplexing is performed in a subframe n having M which is greater than 1, $n^{(1)}_{PUCCH,i}$ which is a PUCCH resource drawn from a subframe $n-k_i$, and HARQ-ACK(i) which is a response of ACK/NACK/DTX from a subframe $n-k_i$ are represented as follows. Here, M is the summation of Ma and Mb. Ma indicates the number of elements in a set Ka defined by a first set (set 1) in FIG. 16. Mb indicates the number of elements in a set Kb defined by a second set (set 2) in FIG. 16. M is a value based on HARQ response information with multiplexing. The set k includes $k_i$ and i is from 0 to (M−1). The set k is a set obtained by combining the set Ka and the set Kb in this order. For example, when the uplink-downlink configuration 1 is 0 and the uplink-downlink configuration 2 is 2, the set ka in the subframe 2 is $\{7, 6\}$, the set Kb is $\{4, 8\}$, and the set K is $\{7, 6, 4, 8\}$. Ma is 2, Mb is 2, and M is 4. $k_0$ is 7, $k_1$ is 6, $k_2$ is 4, and $k_3$ is 8.

A PUCCH resource for PDSCH transmission represented by detection of an associated PDCCH in a subframe $n-k_i$, or a PDCCH indicating a release (SPS release) of downlink SPS (Semi-Persistent Scheduling) in the subframe $n-k_i$ is given by an equation (a-1) and an equation (a-2) in FIG. 17. In a case of the set Ka (in a case where i is from 0 to (Ma−1)), the PUCCH resource is given by the equation (a-1) in FIG. 17. In a case of the set Kb (in a case where i is from Ma to (M−1)), the PUCCH resource is given by the equation (a-2) in FIG. 17. Here, $n_{CCE,i}$ is the number (index) of a first CCE used for transmission of an associated PDCCH in the subframe $n-k_i$. $N^{(1)}_{PUCCH}$ is a parameter configured in a higher layer. $N^{DL}_{RB}$ is the number of resource blocks in a downlink. $N^{RB}_{sc}$ is the number of subcarriers per a resource block. $Ma*N_3$ is added for the PUCCH resource given by the expression (a-2) in FIG. 17. The $Ma*N_3$ corresponds to a PUCCH resource for the set Ka given by the expression (a-2) in FIG. 17. That is, by adding $Ma*N_3$, the PUCCH resource for the set Ka and the PUCCH resource for the set Kb are given so as to be continuative.

A PUCCH resource for PDSCH transmission indicated by detection of an associated EPDCCH in a subframe $n-k_i$, or an EPDCCH indicating a release (SPS release) of downlink SPS (Semi-Persistent Scheduling) in the subframe $n-k_i$ is given by an equation (b-1) and an equation (b-2) in FIG. 17. When an EPDCCH set (EPDCCH-PRB-set) q is configured with distributed transmission, the equation (b-1) in FIG. 17 is used for the PUCCH resource. When the EPDCCH set (EPDCCH-PRB-set) q is configured with localized transmission, the equation (b-2) in FIG. 17 is used for the PUCCH resource. Here, $n_{ECCE,q}$ is the number (index) of a first CCE used for transmission of DCI allocation in association with the EPDCCH set q which is the subframe $n-k_i$. That is, the number of the CCE is the lowest index of ECCEs used for constituting the EPDCCH. $N^{(e1)}_{PUCCH,q}$ is a parameter configured in a higher layer, in the EPDCCH set q. $N^{ECCE,q}_{RB}$ is the total number of resource blocks configured for the EPDCCH set q, in the subframe $n-k_i$.

That is, M pieces of PUCCH resources are given in a subframe n. The M pieces of PUCCH resources are used in transmission of a PUCCH having the PUCCH format 1b with channel selection. For example, when the uplink-downlink configuration 1 is 0, and the uplink-downlink configuration 2 is 2, four PUCCH resources are given in the subframe 2. The four PUCCH resources are used in transmission of a PUCCH having the PUCCH format 1b with channel selection.

Here, subframes represented by the set Ka in the table of the downlink association set illustrated in FIG. 16 are a downlink subframe and/or a special subframe. Subframes represented by the set Kb in the table of the downlink association set illustrated in FIG. 16 are flexible subframes. Thus, even when a flexible subframe may be configured in addition to a downlink subframe and a special subframe, HARQ response information for a PDSCH transmitted in the downlink subframe, the special subframe, and/or the flexible subframe can be efficiently transmitted.

Two sets of the set Ka and the set Kb are defined, and thus block interleaving which causes $n_{CCE}$ to be given to an OFDM symbol in an order of OFDM symbols mapped with $n_{CCE}$ is performed independently for each of the sets in an arithmetic operation of an index of a PUCCH resource used for HARQ response information in PDSCH transmission indicated by a PDCCH. Thus, since a PUCCH resource in a flexible subframe having a probability of being used as an uplink subframe can be determined independently from a PUCCH resource in a downlink subframe, it is possible to improve use efficiency of PUCCH resources.

The set Ka may be associated with a downlink subframe and the set Kb may be associated with a special subframe and/or a flexible subframe.

An example of details of the HARQ response information multiplexing in PDSCH transmission indicated by a PDCCH or an EPDCCH uses a downlink association set illustrated in FIG. 18, an arithmetic operation of PUCCH resources used in transmission of the HARQ response information, which is illustrated in FIG. 15, and a reference of a HARQ transmission timing illustrated in FIG. 19. FIG. 18 is a diagram illustrating an example of an index K: $\{k_0, k_1, \ldots, k_{M-1}\}$ of a downlink association set. FIG. 15 is a diagram illustrating an example of an expression for giving PUCCH resources used in transmission of the HARQ response information. FIG. 19 is a diagram illustrating an example of a reference uplink-downlink configuration (reference UL/DL configuration) by a pair of the uplink-downlink configuration 1 and the uplink-downlink configuration 2.

The downlink association set illustrated in FIG. 18 is also used in a case where the uplink-downlink configuration 2 is not configured (recognition of a flexible subframe is impossible). That is, when the uplink-downlink configuration 2 is not configured (recognition of a flexible subframe is impossible), a downlink association set is given based on an uplink-downlink configuration in a notification through the SIB, and the table illustrated in FIG. 18. The downlink association set illustrated in FIG. 18 is also used in a legacy mobile station device, in which the uplink-downlink configuration 2 is not configured (it cannot recognize a flexible subframe).

When the uplink-downlink configuration 2 is configured (flexible subframe can be recognized), and HARQ response information multiplexing is performed in a subframe n having M which is greater than 1, $n^{(1)}_{PUCCH,i}$ which is a PUCCH resource derived from a subframe n–$k_i$, and HARQ-ACK(i) which is a response of ACK/NACK/DTX from a subframe n–$k_i$ are represented as follows. Here, M indicates the number of elements in a set K defined in FIG. 18 based on the reference uplink-downlink configuration which is defined in FIG. 19. M is a value based on HARQ response information with multiplexing. The set k includes $k_i$ and i is from 0 to (M–1).

Specifically, the reference uplink-downlink configuration is given by a combination of the uplink-downlink configuration 1 and the uplink-downlink configuration 2 and by using the table in FIG. 19. The reference uplink-downlink configuration determines a HARQ transmission timing based on the set K defined in FIG. 18. For example, when the uplink-downlink configuration 1 is 0 and the uplink-downlink configuration 2 is 2, the reference uplink-downlink configuration is 2. Thus, the HARQ transmission timing is based on the downlink association set in a case where the uplink-downlink configuration in FIG. 18 is 2. For example, the set k in the subframe 2 is {8, 7, 4, 6}. M is 4, $k_0$ is 8, $k_1$ is 7, $k_2$ is 4, and $k_3$ is 6.

A PUCCH resource for PDSCH transmission represented by detection of an associated PDCCH in a subframe n–$k_i$, or a PDCCH indicating a release (SPS release) of downlink SPS (Semi-Persistent Scheduling) in the subframe n–$k_i$ is given by an expression (a) in FIG. 15. Here, $n_{CCE,i}$ is the number (index) of a first CCE used for transmission of an associated PDCCH in the subframe n–$k_i$. $N^{(1)}_{PUCCH}$ is a parameter configured in a higher layer. $N^{DL}_{RB}$ is the number of resource blocks in a downlink. $N^{RB}_{sc}$ is the number of subcarriers per a resource block.

A PUCCH resource for PDSCH transmission indicated by detection of an associated EPDCCH in a subframe n–$k_i$, or an EPDCCH indicating a release (SPS release) of downlink SPS (Semi-Persistent Scheduling) in the subframe n–$k_i$ is given by an equation (b-1) and an equation (b-2) in FIG. 15. When an EPDCCH set (EPDCCH-PRB-set) q is configured with distributed transmission, the equation (b-1) in FIG. 15 is used for the PUCCH resource. When the EPDCCH set (EPDCCH-PRB-set) q is configured with localized transmission, the equation (b-2) in FIG. 15 is used for the PUCCH resource. Here, $n_{ECCE,q}$ is the number (index) of a first CCE used for transmission of DCI allocation in association with the EPDCCH set q which is the subframe n–$k_1$. That is, the number of the CCE is the lowest index of ECCEs used for constituting the EPDCCH. $N^{(e1)}_{PUCCH,q}$ is a parameter configured in a higher layer, in the EPDCCH set q. $N^{ECCE,q}_{RB}$ is the total number of resource blocks configured for the EPDCCH set q, in the subframe n–$k_i$.

That is, M pieces of PUCCH resources are given in a subframe n. The M pieces of PUCCH resources are used in transmission of a PUCCH having the PUCCH format 1b with channel selection. For example, when the uplink-downlink configuration 1 is 0, and the uplink-downlink configuration 2 is 2, four PUCCH resources are given in the subframe 2. The four PUCCH resources are used in transmission of a PUCCH having the PUCCH format 1b with channel selection.

Here, subframes represented by the set K in the table of the downlink association set illustrated in FIG. 18 are a downlink subframe, a special subframe, and/or a flexible subframe. Thus, even when a flexible subframe may be configured in addition to a downlink subframe and a special subframe, HARQ response information for a PDSCH transmitted in the downlink subframe, the special subframe, and/or the flexible subframe can be efficiently transmitted. Since the downlink association set illustrated in FIG. 18 can be used in a case where the uplink-downlink configuration 2 is not configured (a flexible subframe cannot be recognized), it is possible to reduce storage capacity of the mobile station device 3.

An example of details of the HARQ response information multiplexing in PDSCH transmission indicated by a PDCCH or an EPDCCH uses a downlink association set illustrated in FIG. 20 and an arithmetic operation of PUCCH resources used in transmission of the HARQ response information, which is illustrated in FIG. 17. FIG. 20 is a diagram illustrating an example of an index Ka: $\{k_0, k_1, \ldots, k_{Ma-1}\}$ and an index Kb: $\{k_{Ma}, k_{Ma+1}, \ldots, k_{M-1}\}$ of downlink association sets. FIG. 17 is a diagram illustrating an example of equations for giving PUCCH resources used in transmission of the HARQ response information.

When the uplink-downlink configuration 2 is configured (flexible subframe can be recognized), and HARQ response information multiplexing is performed in a subframe n having M which is greater than 1, $n^{(1)}_{PUCCH,i}$ which is a PUCCH resource drawn from a subframe n–$k_i$, and HARQ-ACK(i) which is a response of ACK/NACK/DTX from a subframe n–$k_i$ are represented as follows. Here, M is the summation of Ma and Mb. Ma indicates the number of elements in a set Ka defined by a first set (set 1) in FIG. 20. Mb indicates the number of elements in a set Kb defined by a second set (set 2) in FIG. 20. M is a value based on HARQ response information with multiplexing. The set k includes $k_i$ and i is from 0 to (M–1). The set k is a set obtained by combining the set Ka and the set Kb in this order. For example, when the uplink-downlink configuration 1 is 0 and the uplink-downlink configuration 2 is 2, the set ka in the subframe 2 is {6}, the set Kb is {7, 4, 8}, and the set K is {6, 7, 4, 8}. Ma is 1, Mb is 3, and M is 4. $k_0$ is 6, $k_1$ is 7, $k_2$ is 4, and $k_3$ is 8.

A PUCCH resource for PDSCH transmission indicated by detection of an associated PDCCH in a subframe n–$k_i$, or a PDCCH indicating a release (SPS release) of downlink SPS (Semi-Persistent Scheduling) in the subframe n–$k_i$ is given by an equation (a-1) and an equation (a-2) in FIG. 17. In a case of the set Ka (in a case where i is from 0 to (Ma–1)), the PUCCH resource is given by the equation (a-1) in FIG. 17. In a case of the set Kb (in a case where i is from Ma to (M–1)), the PUCCH resource is given by the equation (a-2) in FIG. 17. Here, $n_{CCE,i}$ is the number (index) of a first CCE used for transmission of an associated PDCCH in the subframe n–$k_i$. $N^{(1)}_{PUCCH}$ is a parameter configured in a higher layer. $N^{DL}_{RB}$ is the number of resource blocks in a downlink. $N^{RB}_{sc}$ is the number of subcarriers per a resource block.

A PUCCH resource for PDSCH transmission indicated by detection of an associated EPDCCH in a subframe n–$k_i$, or an EPDCCH indicating a release (SPS release) of downlink SPS (Semi-Persistent Scheduling) in the subframe n–$k_i$ is given by an equation (b-1) and an equation (b-2) in FIG. 17. When an EPDCCH set (EPDCCH-PRB-set) q is configured with distributed transmission, the equation (b-1) in FIG. 17 is used for the PUCCH resource. When the EPDCCH set (EPDCCH-PRB-set) q is configured with localized transmission, the equation (b-2) in FIG. 17 is used for the PUCCH resource. Here, $n_{ECCE,q}$ is the number (index) of a first CCE used for transmission of DCI allocation in association with the EPDCCH set q which is the subframe n−$k_i$. That is, the number of the CCE is the lowest index of ECCEs used for constituting the EPDCCH. $N^{(e1)}_{PUCCH,q}$ is a parameter configured in a higher layer, in the EPDCCH set q. $N^{ECCE,q}_{RB}$ is the total number of resource blocks configured for the EPDCCH set q, in the subframe n−$k_i$.

That is, M pieces of PUCCH resources are given in a subframe n. The M pieces of PUCCH resources are used in transmission of a PUCCH having the PUCCH format 1b with channel selection. For example, when the uplink-downlink configuration 1 is 0, and the uplink-downlink configuration 2 is 2, four PUCCH resources are given in the subframe 2. The four PUCCH resources are used in transmission of a PUCCH having the PUCCH format 1b with channel selection.

Here, subframes represented by the set Ka in the table of the downlink association set illustrated in FIG. 20 are a downlink subframe and/or a special subframe. Subframes represented by the set Kb in the table of the downlink association set illustrated in FIG. 20 are a downlink subframe, a special subframe and/or a flexible subframe. The set Ka in the table of the downlink association set illustrated in FIG. 20 is the same as the set K in the table of the downlink association set illustrated in FIG. 18, in a subframe n which is an uplink subframe. The set Kb in the table of the downlink association set illustrated in FIG. 20 is a set of subframes other than subframes of the set Ka among subframes associated with the subframe n.

Two sets of the set Ka and the set Kb are defined, and thus block interleaving which causes $n_{CCE}$ to be given to an OFDM symbol in an order of OFDM symbols mapped with $n_{CCE}$ is performed independently for each of the sets in an arithmetic operation of an index of a PUCCH resource used for HARQ response information in PDSCH transmission indicated by a PDCCH.

Accordingly, an effect when a mobile station device in which the uplink-downlink configuration 2 is configured (a flexible subframe can be recognized), and a mobile station device in which the uplink-downlink configuration 2 is not configured (a flexible subframe cannot be recognized) simultaneously perform communication can be expected. That is, since the set Ka in the table of the downlink association set which is used by a mobile station device in which the uplink-downlink configuration 2 is configured (a flexible subframe can be recognized) and is illustrated in FIG. 20 is the same as the set K in the table of the downlink association set which is used by a mobile station device in which the uplink-downlink configuration 2 is not configured (a flexible subframe cannot be recognized) and is illustrated in FIG. 18, PUCCH resources can be shared, and thus it is possible to improve use efficiency of the PUCCH resources. Particularly, when block interleaving is performed between subframes with HARQ response information multiplexing, that is, when HARQ response information in PDSCH transmission indicated by a PDCCH is transmitted, a high effect is obtained.

An example of details of the HARQ response information multiplexing in PDSCH transmission represented by a PDCCH or an EPDCCH uses a downlink association set illustrated in FIG. 20 and an arithmetic operation of PUCCH resources used in transmission of the HARQ response information, which is illustrated in FIG. 21. FIG. 20 is a diagram illustrating an example of an index Ka: $\{k_0, k_1, \ldots, k_{Ma-1}\}$ and an index Kb: $\{k_{Ma}, k_{Ma+1}, \ldots, k_{M-1}\}$ of downlink association sets. FIG. 21 is a diagram illustrating an example of equations for giving PUCCH resources used in transmission of the HARQ response information. In this example, parameters for the set Ka and the set Kb, which are configured in a higher layer are independently configured. In the following descriptions, a case of using the downlink association set illustrated in FIG. 20 will be described. However, the following descriptions can be similarly applied to a case of using other downlink association sets (for example, downlink association set illustrated in FIG. 16).

When the uplink-downlink configuration 2 is configured (flexible subframe can be recognized), and HARQ response information multiplexing is performed in a subframe n having M which is greater than 1, $n^{(1)}_{PUCCH,i}$ which is a PUCCH resource drawn from a subframe n−$k_i$, and HARQ-ACK(i) which is a response of ACK/NACK/DTX from a subframe n−$k_i$ are represented as follows. Here, M is the summation of Ma and Mb. Ma indicates the number of elements in the set Ka defined by a first set (set 1) in FIG. 20. Mb indicates the number of elements in the set Kb defined by a second set (set 2) in FIG. 20. M is a value based on HARQ response information with multiplexing. The set k includes $k_i$ and i is from 0 to (M−1). The set k is a set obtained by combining the set Ka and the set Kb in this order. For example, when the uplink-downlink configuration 1 is 0 and the uplink-downlink configuration 2 is 2, the set ka in the subframe 2 is $\{6\}$, the set Kb is $\{7, 4, 8\}$, and the set K is $\{6, 7, 4, 8\}$. Ma is 1, Mb is 3, and M is 4. $k_0$ is 6, $k_1$ is 7, $k_2$ is 4, and $k_3$ is 8.

A PUCCH resource for PDSCH transmission indicated by detection of an associated PDCCH in a subframe n−$k_i$, or a PDCCH indicating a release (SPS release) of downlink SPS (Semi-Persistent Scheduling) in the subframe n−$k_i$ is given by an equation (a-1) and an equation (a-2) in FIG. 21. In a case of the set Ka (in a case where i is from 0 to (Ma−1)), the PUCCH resource is given by the equation (a-1) in FIG. 21. In a case of the set Kb (in a case where i is from Ma to (M−1)), the PUCCH resource is given by the equation (a-2) in FIG. 21. Here, $n_{CCE,i}$ is the number (index) of a first CCE used for transmission of an associated PDCCH in the subframe n−$k_i$. $N^{(1)}_{PUCCH,Ka}$ is a parameter configured in a higher layer and is used in the set Ka. $N^{(1)}_{PUCCH,Kb}$ is a parameter configured in a higher layer and is used in the set Kb. $N^{DL}_{RB}$ is the number of resource blocks in a downlink. $N^{RB}_{sc}$ is the number of subcarriers per a resource block.

A PUCCH resource for PDSCH transmission indicated by detection of an associated EPDCCH in a subframe n−$k_i$, or an EPDCCH indicating a release (SPS release) of downlink SPS (Semi-Persistent Scheduling) in the subframe n−$k_i$ is given by an equation (b-1), an equation (b-2), an equation (b-3), and an equation (b-4) in FIG. 21. In a case of the set Ka (case where i is from 0 to (Ma−1)) and a case where an EPDCCH set (EPDCCH-PRB-set) q is configured with distributed transmission, the equation (b-1) in FIG. 21 is used for the PUCCH resource. In a case of the set Ka (case where i is from 0 to (Ma−1)) and a case where the EPDCCH set (EPDCCH-PRB-set) q is configured with localized transmission, the equation (b-2) in FIG. 21 is used for the PUCCH resource. In a case of the set Kb (case where i is from Ma to (M−1)) and a case where the EPDCCH set (EPDCCH-PRB-set) q is configured with distributed transmission, the equation (b-3) in FIG. 21 is used for the PUCCH resource. In a case of the set Kb (case where i is from Ma to (M−1)) and a case where the EPDCCH set (EPDCCH-PRB-set) q is configured with localized transmission, the equation (b-4) in FIG. 21 is used for the PUCCH resource. Here, $n_{ECCE,q}$ is the number (index) of a first CCE used for transmission of DCI allocation in association with the EPDCCH set q which is the subframe n–$k_i$. That is, the number of the CCE is the lowest index of ECCEs used for constituting the EPDCCH. $N^{(e1)}_{PUCCH,Ka,q}$ is a parameter configured in a higher layer and is used in the set ka, in the EPDCCH set q. $N^{(e1)}_{PUCCH,Xb,q}$ is a parameter configured in a higher layer and is used in the set kb, in the EPDCCH set q. $N^{ECCE,q}_{RB}$ is the total number of resource blocks configured for the EPDCCH set q, in the subframe n–$k_i$.

That is, M pieces of PUCCH resources are given in a subframe n. The M pieces of PUCCH resources are used in transmission of a PUCCH having the PUCCH format 1b with channel selection. For example, when the uplink-downlink configuration 1 is 0, and the uplink-downlink configuration 2 is 2, four PUCCH resources are given in the subframe 2. The four PUCCH resources are used in transmission of a PUCCH having the PUCCH format 1b with channel selection.

Here, subframes represented by the set Ka in the table of the downlink association set illustrated in FIG. 20 are a downlink subframe and/or a special subframe. Subframes represented by the set Kb in the table of the downlink association set illustrated in FIG. 20 are a downlink subframe, a special subframe and/or a flexible subframe. The set Ka in the table of the downlink association set illustrated in FIG. 20 is the same as the set K in the table of the downlink association set illustrated in FIG. 18, in a subframe n which is an uplink subframe. The set Kb in the table of the downlink association set illustrated in FIG. 20 is a set of subframes other than subframes of the set Ka among subframes associated with the subframe n.

Two sets of the set Ka and the set Kb are defined, and thus block interleaving which causes $n_{CCE}$ to be given to an OFDM symbol in an order of OFDM symbols mapped with $n_{CCE}$ is performed independently for each of the sets in an arithmetic operation of an index of a PUCCH resource used for HARQ response information in PDSCH transmission indicated by a PDCCH.

Accordingly, an effect when a mobile station device in which the uplink-downlink configuration 2 is configured (a flexible subframe can be recognized), and a mobile station device in which the uplink-downlink configuration 2 is not configured (a flexible subframe cannot be recognized) simultaneously perform communication can be expected. That is, since the set Ka in the table of the downlink association set which is used by a mobile station device in which the uplink-downlink configuration 2 is configured (a flexible subframe can be recognized) and is illustrated in FIG. 20 is the same as the set K in the table of the downlink association set which is used by a mobile station device in which the uplink-downlink configuration 2 is not configured (a flexible subframe cannot be recognized) and is illustrated in FIG. 18, PUCCH resources can be shared, and thus it is possible to improve use efficiency of the PUCCH resources. Particularly, when block interleaving is performed between subframes with HARQ response information multiplexing, that is, when HARQ response information in PDSCH transmission indicated by a PDCCH is transmitted, a high effect is obtained.

Since parameters for the set Ka and the set Kb, which are configured in a higher layer are independently configured, it is possible to improve flexibility for configuration of PUCCH resources.

An example of details of the HARQ response information multiplexing in PDSCH transmission represented by a PDCCH or an EPDCCH uses the downlink association set illustrated in FIG. 20 and an arithmetic operation of PUCCH resources used in transmission of the HARQ response information, which is illustrated in FIG. 22. FIG. 20 is a diagram illustrating an example of an index Ka: $\{k_0, k_1, \ldots, k_{Ma-1}\}$ and an index Kb: $\{k_{Ma}, k_{Ma+1}, \ldots, k_{M-1}\}$ of downlink association sets. FIG. 22 is a diagram illustrating an example of equations for giving PUCCH resources used in transmission of the HARQ response information. In this example, in the set Kb, block interleaving between subframes with HARQ response information multiplexing is not performed and PUCCH resources are given in an order of subframes. In the following descriptions, a case of using the downlink association set illustrated in FIG. 20 will be described. However, the following descriptions can be similarly applied to a case of using other downlink association sets (for example, downlink association set illustrated in FIG. 16).

When the uplink-downlink configuration 2 is configured (flexible subframe can be recognized), and HARQ response information multiplexing is performed in a subframe n having M which is greater than 1, $n^{(1)}_{PUCCH,i}$ which is a PUCCH resource drawn from a subframe n–$k_i$, and HARQ-ACK(i) which is a response of ACK/NACK/DTX from a subframe n–$k_i$ are represented as follows. Here, M is the summation of Ma and Mb. Ma indicates the number of elements in the set Ka defined by the first set (set 1) in FIG. 20. Mb indicates the number of elements in the set Kb defined by the second set (set 2) in FIG. 20. M is a value based on HARQ response information with multiplexing. The set k includes $k_i$ and i is from 0 to (M−1). The set k is a set obtained by combining the set Ka and the set Kb in this order. For example, when the uplink-downlink configuration 1 is 0 and the uplink-downlink configuration 2 is 2, the set ka in the subframe 2 is $\{6\}$, the set Kb is $\{7, 4, 8\}$, and the set K is $\{6, 7, 4, 8\}$. Ma is 1, Mb is 3, and M is 4. $k_0$ is 6, $k_1$ is 7, $k_2$ is 4, and $k_3$ is 8.

A PUCCH resource for PDSCH transmission indicated by detection of an associated PDCCH in a subframe n–$k_i$, or a PDCCH indicating a release (SPS release) of downlink SPS (Semi-Persistent Scheduling) in the subframe n–$k_i$ is given by an equation (a-1) and an equation (a-2) in FIG. 22. In a case of the set Ka (in a case where i is from 0 to (Ma−1)), the PUCCH resource is given by the equation (a-1) in FIG. 22. In a case of the set Kb (in a case where i is from Ma to (M−1)), the PUCCH resource is given by the equation (a-2) in FIG. 22. Here, $n_{CCE,i}$ is the number (index) of a first CCE used for transmission of an associated PDCCH in the subframe n–$k_i$. $N^{(1)}_{PUCCH}$ is a parameter configured in a higher layer. $N^{DL}_{RB}$ is the number of resource blocks in a downlink. $N^{RB}_{sc}$ is the number of subcarriers per a resource block. (i−1)*$N_3$ in the equation (a-2) of FIG. 22 corresponds to PUCCH resources for subframes to a (i−1)th subframe. Thus, a PUCCH resource for a i-th subframe is given so as to be subsequent to a PUCCH resource for a subframes to a (i−1)th subframe, by adding (i−1)*$N_3$. That is, PUCCH resources for elements in the set Kb using the equation (a-2) in FIG. 22 are given so as to be continuative element-to-element (subframe-to-subframe).

A PUCCH resource for PDSCH transmission indicated by detection of an associated EPDCCH in a subframe n–$k_i$, or an EPDCCH indicating a release (SPS release) of downlink SPS (Semi-Persistent Scheduling) in the subframe n–$k_i$ is given by an equation (b-1) and an equation (b-2) in FIG. 22. When an EPDCCH set (EPDCCH-PRB-set) q is configured with distributed transmission, the equation (b-1) in FIG. 22 is used for the PUCCH resource. When the EPDCCH set (EPDCCH-PRB-set) q is configured with localized transmission, the equation (b-2) in FIG. 22 is used for the PUCCH resource. Here, $n_{ECCE,q}$ is the number (index) of a first CCE used for transmission of DCI allocation in association with the EPDCCH set q which is the subframe n−$k_i$. That is, the number of the CCE is the lowest index of ECCEs used for constituting the EPDCCH. $N^{(e1)}_{PUCCH,q}$ is a parameter configured in a higher layer, in the EPDCCH set q. $N^{ECCE,q}_{RB}$ is the total number of resource blocks configured for the EPDCCH set q, in the subframe n−$k_i$.

That is, M pieces of PUCCH resources are given in a subframe n. The M pieces of PUCCH resources are used in transmission of a PUCCH having the PUCCH format 1b with channel selection. For example, when the uplink-downlink configuration 1 is 0, and the uplink-downlink configuration 2 is 2, four PUCCH resources are given in the subframe 2. The four PUCCH resources are used in transmission of a PUCCH having the PUCCH format 1b with channel selection.

Here, subframes represented by the set Ka in the table of the downlink association set illustrated in FIG. 20 are a downlink subframe and/or a special subframe. Subframes represented by the set Kb in the table of the downlink association set illustrated in FIG. 20 are a downlink subframe, a special subframe and/or a flexible subframe. The set Ka in the table of the downlink association set illustrated in FIG. 20 is the same as the set K in the table of the downlink association set illustrated in FIG. 18, in a subframe n which is an uplink subframe. The set Kb in the table of the downlink association set illustrated in FIG. 20 is a set of subframes other than subframes of the set Ka among subframes associated with the subframe n.

Accordingly, an effect when a mobile station device in which the uplink-downlink configuration 2 is configured (a flexible subframe can be recognized), and a mobile station device in which the uplink-downlink configuration 2 is not configured (a flexible subframe cannot be recognized) simultaneously perform communication can be expected. That is, since the set Ka in the table of the downlink association set which is used by a mobile station device in which the uplink-downlink configuration 2 is configured (a flexible subframe can be recognized) and is illustrated in FIG. 20 is the same as the set K in the table of the downlink association set which is used by a mobile station device in which the uplink-downlink configuration 2 is not configured (a flexible subframe cannot be recognized) and is illustrated in FIG. 18, PUCCH resources can be shared, and thus it is possible to improve use efficiency of the PUCCH resources. Particularly, when block interleaving is performed between subframes with HARQ response information multiplexing, that is, when HARQ response information in PDSCH transmission represented by a PDCCH is transmitted, a high effect is obtained.

When an index of a PUCCH resource used for HARQ response information in PDSCH transmission indicated by a PDCCH is subjected to arithmetic operation, in the set Kb, block interleaving between subframes with HARQ response information multiplexing is not performed and PUCCH resources are given in an order of subframes. When a flexible subframe included in the set Kb is used as an uplink subframe, a PUCCH resource for the subframe is unnecessary. PUCCH resources are given in an order of subframes, and thus the unnecessary PUCCH resource is easily used. Thus, it is possible to improve use efficiency of the PUCCH resources.

In the above descriptions, a case where HARQ response information multiplexing in PDSCH transmission indicated by a PDCCH or an EPDCCH is performed based on the uplink-downlink configuration 1 and the uplink-downlink configuration 2 is described. The HARQ response information multiplexing in PDSCH transmission indicated by a PDCCH or an EPDCCH can be performed based on a control channel subframe configuration (transmission direction UL-DL configuration) in addition to the uplink-downlink configuration 1 and the uplink-downlink configuration 2.

As an example of the HARQ response information multiplexing based on the uplink-downlink configuration 1, the uplink-downlink configuration 2, and the control channel subframe configuration, a PUCCH resource of the corresponding subframe among subframes configured as flexible subframes by the uplink-downlink configuration 1 and the uplink-downlink configuration 2 may be switched in accordance with the control channel subframe configuration. In a subframe which is not configured (scheduled) as a downlink subframe by the control channel subframe configuration, among subframes configured as flexible subframes by the uplink-downlink configuration 1 and the uplink-downlink configuration 2, it is considered that there is no PUCCH resource for the corresponding subframe.

As an example of the HARQ response information multiplexing based on the uplink-downlink configuration 1, the uplink-downlink configuration 2, and the control channel subframe configuration, a PUCCH resource of the corresponding subframe among subframes configured as downlink subframes, special subframes, or flexible subframes by the uplink-downlink configuration 1 and the uplink-downlink configuration 2 may be switched in accordance with the control channel subframe configuration. In a subframe which is not configured (scheduled) as a downlink subframe by the control channel subframe configuration, among subframes configured as downlink subframes, special subframes, or flexible subframes by the uplink-downlink configuration 1 and the uplink-downlink configuration 2, it is considered that there is no PUCCH resource for the corresponding subframe.

As an example of the HARQ response information multiplexing based on the uplink-downlink configuration 1, the uplink-downlink configuration 2, and the control channel subframe configuration, when the set Ka and the set Kb are defined (configured), a PUCCH resource of the corresponding subframe among subframes corresponding to the elements of the set Kb may be switched in accordance with the control channel subframe configuration. When the set Ka and the set Kb are defined (configured), it is considered that there is no PUCCH resource for a subframe, in the subframe which is not configured (scheduled) as a downlink subframe by the control channel subframe configuration among subframes corresponding to the elements of the set Kb.

For example, as already described, when the downlink association set illustrated in FIG. 20 can be used, the set Ka in the table of the downlink association set which is used by a mobile station device in which the uplink-downlink configuration 2 is configured (a flexible subframe can be recognized) and is illustrated in FIG. 20 is the same as the set K in the table of the downlink association set which is used by a mobile station device in which the uplink-downlink configuration 2 is not configured (a flexible subframe cannot be recognized) and is illustrated in FIG. 18, and thus PUCCH resources can be shared. Accordingly, it is not preferably considered that there is no subframe corresponding to an element in the set Ka, which can share a PUCCH resource, in a view of sharing. The set Kb cannot share a PUCCH resource with a mobile station device in which the uplink-downlink configuration 2 is not configured (recognition of a flexible subframe is impossible). Thus, it can be considered that there is no subframe corresponding to an element in the set Kb, which can share a PUCCH resource, in a view of sharing.

As a method of realizing a subframe which is considered as that there is no PUCCH resource, various methods can be used. For example, it can be considered that an element in the set K corresponding to a subframe which is considered as that there is no PUCCH resource is not present in the arithmetic operation for a PUCCH resource. For example, realization can be made by setting $N_{ECCE,q,n\text{-}kil}$ for a subframe considered as that there is not PUCCH resource to 0, in HARQ response information multiplexing in PDSCH transmission indicated by an EPDCCH.

Hereinafter, an element in the set K (including the set Ka and the set Kb) in a subframe n will be described in detail.

An example of an element in the set K (including the set Ka and the set Kb) in a subframe n is a value of 4 or more. That is, in a subframe n, HARQ response information for a subframe being 4 subframes prior is transmitted. Thus, the mobile station device 1 may enable completion of processes from reception processing of a PDSCH to generation of HARQ response information for the PDSCH, within at least 4 subframes.

As an example of an element in the set K (including the set Ka and the set Kb) in a subframe n, when two or more uplink subframes are configured in a radio frame, the number of elements is defined so as to be as equivalent between uplink subframes as possible. That is, when two or more uplink subframes are configured in a radio frame, the number of subframes with HARQ response information multiplexing is defined so as not to be uneven between uplink subframes. For example, when two uplink subframes are configured in a radio frame, the number (that is, M) of elements in the set K in each of the uplink subframes is 4. When three uplink subframes are configured in a radio frame, the number (that is, M) of elements in the set K in the uplink subframes is respectively 3, 2, and 2. When four uplink subframes are configured in a radio frame, the number (that is, M) of elements in the set K in the uplink subframes is respectively 2, 1, 2, and 1. When five uplink subframes are configured in a radio frame, the number (that is, M) of elements in the set K in each of the uplink subframes is 1.

An example of an order of elements in the set K (including the set Ka and the set Kb) is an order of a downlink subframe, a special subframe, and a flexible subframe which are configured by the uplink-downlink configuration 1 and the uplink-downlink configuration 2. Thus, since a PUCCH resource corresponding to a flexible subframe which has a probability of being used as an uplink subframe can be configured in the rear, it is possible to improve use efficiency of PUCCH resources. The subframe 6 can be considered as a special subframe in determination of the order of subframes even when the subframe 6 is a downlink subframe.

An example of an order of elements in the set K (including the set Ka and the set Kb) is an order of a downlink subframe, a flexible subframe, and a special subframe which are configured by the uplink-downlink configuration 1 and the uplink-downlink configuration 2. Since the special subframe has a relatively small region to which a PDSCH is allocated, when a probability of allocating a PDSCH to the special subframe is low, a PUCCH resource corresponding to the special subframe can be configured in the rear. Thus, it is possible to improve use efficiency of PUCCH resources. The subframe 6 can be considered as a special subframe in determination of the order of subframes even when the subframe 6 is a downlink subframe.

When the number of elements is plural in each of a downlink subframe, a special subframe, and a flexible subframe, the order of the elements is an order of a value ($k_i$) of the element being increased (order of a subframe being received).

When the number of elements is plural in a flexible subframe, the order of the elements is an order of the forward subframe from a subframe in the rear of a radio frame (that is, an order of a subframe number being increased in the radio frame). When a certain subframe is a subframe used as a downlink subframe, a flexible subframe right after the subframe may not be used as an uplink subframe. When a certain subframe is a subframe used as an uplink subframe, a flexible subframe right after the subframe can be used as an uplink subframe or a downlink subframe. That is, when flexible subframes are configured so as to be continuative in a radio frame, a probability of the rear subframe being used as a downlink subframe becomes high. For this reason, the order of elements in a flexible subframe is an order of the toward subframe from the rear subframe in a radio frame, and thus a PUCCH resource corresponding to a subframe which has a low probability of being used as a downlink subframe can be configured in the rear. Accordingly, it is possible to improve use efficiency of PUCCH resources.

An effect will be described by setting the order of elements in the set K (including the set Ka and the set Kb) in a subframe n to be an order of a subframe having a high probability of a PDSCH being allocated. A PUCCH resource used for HARQ response information in PDSCH transmission is implicitly given to at least a CCE number or an ECCE number. However, PUCCH resources which are actually used are preferably gathered as much as possible. Particularly, since PUCCH resources are configured in an order from resource blocks at both ends of an uplink subframe, the PUCCH resources are gathered in the front in an order of the corresponding indices, and thus a resource block which is not used in transmission of a PUCCH can be used in transmission of other channels such as a PUSCH or a signal. Accordingly, it is possible to improve use efficiency of PUCCH resources and thus it is possible to improve use efficiency of all of uplink subframes.

The PUCCH resource may be determined further using ARO (HARQ-ACK Resource Offset). The ARO is the offset of the PUCCH resource. The value of the ARO is selected from a plurality of values defined in advance by an ARO field of the DCI transmitted by the PDCCH or the EPDCCH. For example, the ARO field can notify of two bits of information (ARO), and four values of the ARO are defined. For example, the value of the ARO defined in advance is 0, −1, −2, or 2.

A PUCCH resource used to transmit HARQ response information is determined by using an $n_{CCE}$ or an $n_{ECCE}$, a parameter set by the higher layer, the number of CCEs or the number of ECCEs in other subframes, and the ARO. The PUCCH resource number is calculated by adding the $n_{CCE}$ or $n_{ECCE}$, the parameters configured by the higher layer, the number of CCEs or the number of ECCEs in other subframes, and the value of the ARO.

In the above descriptions, a method of implicitly determining a PUCCH resource is described as a method of determining a PUCCH resource used in transmission of HARQ response information. As another method (arithmetic operation) which determines a PUCCH resource used in transmission of HARQ response information, a method of explicitly determining a PUCCH resource number can be used. For example, the PUCCH resource is determined by one parameter configured by the higher layer. For example, the PUCCH resource is determined by one parameter selected by the PDCCH or the EPDCCH selected from a plurality of parameters configured by the higher layer. For example, the parameter configured by the higher layer is one of 0 to 2047. In regards to the determination of the PUCCH resource in the PUCCH format 3, only the method of explicitly being determined may be used.

As the method of determining a PUCCH resource used in transmission of HARQ response information, when the uplink-downlink configuration 2 is configured (when a flexible subframe can be recognized), a PUCCH resource for an element in the set Kb is given based on a parameter which is configured in a higher layer, in an example of implicitly being determined. When M which is the number of elements in the set K is 1 or 2, the HARQ response information is transmitted in the PUCCH format 1b using channel selection. When M which is the number of elements in the set Kb is equal to or greater than 3, the HARQ response information is transmitted in a PUCCH format 3. A PUCCH resource used in transmission of the PUCCH format 1b using channel selection, and the PUCCH format 3 is subjected to RRC signaling, as information specific to the mobile station device 3. When the uplink-downlink configuration 2 is not configured (when a flexible subframe cannot be recognized), the method of implicitly determining a PUCCH resource for an element in the set K is used, as already described.

As the method of determining a PUCCH resource used in transmission of HARQ response information, when the uplink-downlink configuration 2 is configured (when a flexible subframe can be recognized), a PUCCH resource for an element in the set K is given based on a parameter which is configured in a higher layer, in an example of implicitly being determined. When M which is the number of elements in the set K is equal to or less than 4, the HARQ response information is transmitted in the PUCCH format 1b using channel selection. When M which is the number of elements in the set K is greater than 4, the HARQ response information is transmitted in the PUCCH format 3. A PUCCH resource used in transmission of the PUCCH format 1b using channel selection, and the PUCCH format 3 is subjected to RRC signaling, as information specific to the mobile station device 3. When the uplink-downlink configuration 2 is not configured (when a flexible subframe cannot be recognized), the method of implicitly determining a PUCCH resource for an element in the set K is used, as already described.

As the method of determining a PUCCH resource used in transmission of HARQ response information, when the uplink-downlink configuration 2 is configured (when a flexible subframe can be recognized), a PUCCH resource for an element in the set Kb is given based on a parameter which is configured in a higher layer, in an example of implicitly being determined. When M which is the number of elements in the set K is equal to or less than 4, the HARQ response information is transmitted in the PUCCH format 1b using channel selection, by using a PUCCH resource correlated with an element in the set K. For example, four independent PUCCH resources are configured in a higher layer and elements in the set Kb are sequentially correlated with each of the PUCCH resources. As the four independent PUCCH resources which are configured in a higher layer, PUCCH resources which are configured in order to transmit the HARQ response information for a PDSCH of the SPS can be used. When M which is the number of elements in the set K is greater than 4, the HARQ response information is transmitted in the PUCCH format 3. A PUCCH resource used in transmission of the PUCCH format 3 is subjected to RRC signaling, as information specific to the mobile station device 3. When the uplink-downlink configuration 2 is not configured (when flexible subframe cannot be recognized), the method of implicitly determining a PUCCH resource for an element in the set K is used, as already described.

As the method of determining a PUCCH resource used in transmission of HARQ response information, when the uplink-downlink configuration 2 is configured (a flexible subframe can be recognized), and the set Ka and the set Kb are defined, a PUCCH resource for an element in the set Kb is given based on a parameter which is configured in a higher layer, in an example of implicitly being determined. When Mb which is the number of elements in the set Kb is 1 or 2, the HARQ response information is transmitted in the PUCCH format 1b using channel selection. When Mb which is the number of elements in the set Kb is equal to or greater than 3, the HARQ response information is transmitted in the PUCCH format 3. A PUCCH resource used in transmission of the PUCCH format 1b using channel selection, and the PUCCH format 3 is subjected to RRC signaling, as information specific to the mobile station device 3. The method of implicitly being determined is used in a PUCCH resource for an element in the set Ka, as already described. When the uplink-downlink configuration 2 is not configured (when a flexible subframe cannot be recognized), the method of implicitly determining a PUCCH resource for an element in the set K is used, as already described.

As the method of determining a PUCCH resource used in transmission of HARQ response information, when the uplink-downlink configuration 2 is configured (a flexible subframe can be recognized), and the set Ka and the set Kb are defined, a PUCCH resource for an element in the set Kb is given based on a parameter which is configured in a higher layer, in an example of implicitly being determined. When Mb which is the number of elements in the set Kb is equal to or less than 4, the HARQ response information is transmitted in the PUCCH format 1b using channel selection. When Mb which is the number of elements in the set Kb is greater than 4, the HARQ response information is transmitted in the PUCCH format 3. A PUCCH resource used in transmission of the PUCCH format 1b using channel selection, and the PUCCH format 3 is subjected to RRC signaling, as information specific to the mobile station device 3. The method of implicitly being determined is used in a PUCCH resource for an element in the set Ka, as already described. When the uplink-downlink configuration 2 is not configured (when a flexible subframe cannot be recognized), the method of implicitly determining a PUCCH resource for an element in the set K is used, as already described.

As the method of determining a PUCCH resource used in transmission of HARQ response information, when the uplink-downlink configuration 2 is configured (a flexible subframe can be recognized), and the set Ka and the set Kb are defined, a PUCCH resource for an element in the set Kb is given based on a parameter which is configured in a higher layer, in an example of implicitly being determined. When Mb which is the number of elements in the set Kb is equal to or less than 4, the HARQ response information is transmitted in the PUCCH format 1b using channel selection, by using a PUCCH resource correlated with an element in the set K. For example, four independent PUCCH resources are configured in a higher layer and elements in the set Kb are sequentially correlated with each of the PUCCH resources. As the four independent PUCCH resources which are configured in a higher layer, PUCCH resources which are configured in order to transmit the HARQ response information for a PDSCH of the SPS can be used. When Mb which is the number of elements in the set Kb is greater than 4, the HARQ response information is transmitted in the PUCCH format 3. A PUCCH resource used in transmission of the PUCCH format 3 is subjected to RRC signaling, as information specific to the mobile station device 3. The method of implicitly being determined is used in a PUCCH resource for an element in the set Ka, as already described. When the uplink-downlink configuration 2 is not configured (when a flexible subframe cannot be recognized), the method of implicitly determining a PUCCH resource for an element in the set K is used, as already described.

From other viewpoints, in the above-described method, operations of the base station device 3 and the mobile station device 1 can be switched in accordance with whether or not the uplink-downlink configuration 2 is configured (whether or not a flexible subframe can be recognized).

An example of an operation of being switched in accordance with whether or not the uplink-downlink configuration 2 is configured is a table of a downlink association set used in HARQ response information multiplexing in PDSCH transmission indicated by a PDCCH or an EPD-CCH. When the uplink-downlink configuration 2 is not configured, a PUCCH resource used in HARQ response information multiplexing in PDSCH transmission indicated by a PDCCH or an EPDCCH use a table of a downlink association set which is defined for one uplink-downlink configuration, as illustrated in FIG. 18. The table of the downlink association set illustrated in FIG. 18 is used in a legacy mobile station device, in which the uplink-downlink configuration 2 cannot be configured. When the uplink-downlink configuration 2 is configured, a PUCCH resource used in HARQ response information multiplexing in PDSCH transmission represented by a PDCCH or an EPD-CCH use a table of a downlink association set which is defined for a combination (pair) of two uplink-downlink configurations (uplink-downlink configuration 1 and uplink-downlink configuration 2), as illustrated in FIG. 14, 16, 19, or 20.

The table of the downlink association set which is defined for one uplink-downlink configuration, as illustrated in FIG. 18, is also referred to as a first table. As illustrated in FIG. 14, 16, 19, or 20, the table of the downlink association set which is defined for a combination (pair) of two uplink-downlink configurations (uplink-downlink configuration 1 and uplink-downlink configuration 2) is also referred to as a second table. The first table and the second table are also simply referred to as a table.

In other words, when a second uplink-downlink configuration as information specific to a mobile station device is not configured through RRC signaling, a PUCCH resource for HARQ response information to PDSCH transmission of the mobile station device is given based on elements in a set defined by the first table. When the second uplink-downlink configuration as information specific to a mobile station device is configured through RRC signaling, a PUCCH resource for HARQ response information to PDSCH transmission of the mobile station device is given based on elements in a set defined by the second table.

An example of an operation of being switched in accordance with whether or not the uplink-downlink configuration 2 is configured is an arithmetic operation of PUCCH resources used in transmission of HARQ response information. When the uplink-downlink configuration 2 is not configured, the arithmetic operation of PUCCH resources used in transmission of HARQ response information performs block interleaving for one element in the set K, in a certain subframe n. When the uplink-downlink configuration 2 is configured, the arithmetic operation of PUCCH resources used in transmission of HARQ response information performs block interleaving for elements in the two sets Ka and Kb in the set K for each set, in a certain subframe n. Specifically, equations used in the arithmetic operation of PUCCH resources which are used in transmission of HARQ response information are switched in accordance with whether or not the uplink-downlink configuration 2 is configured.

The base station device 3 includes a transmission unit that transmits a first uplink-downlink configuration in notification through the SIB as information specific to the base station device 3, and a second uplink-downlink configuration which is configured as information specific to the mobile station device 1, through RRC signaling. The base station device 3 includes a reception unit that receives HARQ response information using PUCCH resources for the HARQ response information to PDSCH transmission of the mobile station device 1.

The mobile station device 1 includes a reception unit that receives the first uplink-downlink configuration in notification through the SIB as information specific to the base station device 3, and the second uplink-downlink configuration which is configured as information specific to the mobile station device 1, through RRC signaling. The mobile station device 1 includes a transmission unit that transmits HARQ response information using PUCCH resources for the HARQ response information to PDSCH transmission of the mobile station device 1.

An element in the set defined by the table can indicate a subframe in which PDSCH transmission for HARQ response information may be performed, in an uplink subframe in which the HARQ response information is transmitted.

A subframe in which the set defined by the second table is defined may be a fixed uplink subframe which is configured as an uplink subframe by each of the first uplink-downlink configuration and the second uplink-downlink configuration.

A PUCCH resource for a flexible subframe and a subframe in which PDSCH transmission is not performed may be assumed not to be given among subframes represented by elements in the set defined by the table or among subframes which are assumed that a PUCCH resource is not given to a subframe in which PDSCH transmission is not performed, and are represented by elements in the set defined by the table. A subframe in which PDSCH transmission is not performed can be set as a subframe in which it is configured that a control channel is not monitored. A subframe in which PDSCH transmission is not performed can be set as a subframe in which it is configured that a cell-specific reference signal is not mapped. The number of control channel elements in a subframe in which PDSCH transmission is not performed, among subframes represented by elements in the set defined by the table can be assumed to be 0. A subframe in which PDSCH transmission is not performed is determined based on control information in notification on a control channel based on a Group-RNTI which is a RNTI different from a C-RNTI which is a RNTI used in a control channel representing the PDSCH.

Each of the set Ka and the set Kb constituting the set K is also referred to as a partial set. For example, the set Ka and the set Kb are respectively also referred to as a partial set Ka and a partial set Kb. That is, the set K can be a set obtained by combining the partial set Ka and the partial set Kb in this order. The set Ka and the set Kb are respectively also referred to as a first partial set and a second partial set. That is, a certain set can be a set obtained by combining the first partial set and the second partial set in this order.

The first partial set and the second partial set are defined by the second table. Elements in the first partial set are the same as elements in the set defined by the first table. Elements in the second partial set are different from elements in the set defined by the first table.

A PUCCH resource based on an element in the first partial set can be implicitly given based on at least an index of a control channel element (CCE/ECCE) which is used for transmitting a control channel indicating PDSCH transmission.

A PUCCH resource based on an element in the second partial set can be implicitly given based on at least an index of a control channel element which is used for transmitting a control channel indicating PDSCH transmission, and all of PUCCH resources based on the elements in the first partial set (that is, all of the PUCCH resources which can be given to subframes represented by the elements in the first partial set). A first control channel element used for transmitting a control channel is the lowest index of CCEs or ECCEs constituting the control channel.

A PUCCH resource based on an element in the second partial can be explicitly given based on a parameter in notification on a control channel, among a plurality of PUCCH resources configured through RRC signaling.

Subframes represented by the elements in the first partial set can be set to be only fixed downlink subframes. Subframes represented by the elements in the second partial set can be set to be a fixed downlink subframe and/or a flexible subframe. The fixed downlink subframe can be set to be a subframe configured as a downlink subframe or a special subframe by the first uplink-downlink configuration. The flexible subframe can be set to be a subframe which is configured as an uplink subframe by the first uplink-downlink configuration and configured as a downlink subframe by the second uplink-downlink configuration.

The operations (processing) in the above descriptions are described by using a case where the uplink-downlink configuration 2 is configured. However, it is not limited thereto. For example, the operations (processing) in the above descriptions can be applied to a case of whether a flexible subframe can be recognized. The operations (processing) in the above descriptions can be applied to a case where a dynamic TDD is configured. The operations (processing) in the above descriptions can be applied to a case where a Group-RNTI is configured. The operations (processing) in the above descriptions can be applied to a case where monitoring of a search space is configured based on a Group-RNTI.

In above descriptions, a case where plural pieces of HARQ response information are multiplexed in a subframe n (that is, a case where the number M of elements in the set K is equal to or greater than 2) is described. However, the above descriptions can also be applied to a case where one piece of HARQ response information is transmitted in a subframe n (that is, a case where M is 1). Thus, transmission of HARQ response information can be realized by using similar processing and/or similar expressions, regardless of the value of M.

Hereinafter, a method of explicitly determining a PUCCH resource which is used in transmission of HARQ response information will be described in detail.

In the method of explicitly being determined, one method which selects, by a PDCCH or an EPDCCH, one parameter from a plurality of parameters configured by the higher layer uses the ARO field of the DCI transmitted by the PDCCH or EPDCCH. In the method of explicitly being determined, when determining the PUCCH resource which is used to transmit the HARQ response information, the value of the ARO field is used to select one parameter from a plurality of parameters configured by the higher layer. That is, the PUCCH resource which is used to transmit the HARQ response information is determined by a plurality of parameters configured by the higher layer and the ARO field of the DCI transmitted by the related PDCCH or EPDCCH.

In the method of explicitly being determined, another method which selects, by a PDCCH or an EPDCCH, one parameter from a plurality of parameters configured by the higher layer uses a TPC command field of the DCI transmitted by the PDCCH or EPDCCH. The TPC command field is used to notify of information (TPC command) for transmission power control. In the method of explicitly being determined, the value of the TPC command field is used to select one parameter from a plurality of parameters configured by the higher layer. That is, the PUCCH resource which is used to transmit the HARQ response information is determined by a plurality of parameters configured by the higher layer and the TPC command field of the DCI transmitted by the related PDCCH or EPDCCH.

In the method of explicitly being determined, a further method which selects, by a PDCCH or an EPDCCH, one parameter from a plurality of parameters configured by the higher layer uses the TPC command field of the DCI transmitted by the PDCCH and uses the ARO field of the DCI transmitted by the EPDCCH. That is, in the method of explicitly being determined, when the DCI is received by the PDCCH, the TPC command field of the DCI may be used to select one parameter from a plurality of parameters configured by the higher layer, and when the DCI is received by the EPDCCH, the ARO field of the DCI may be used to select one parameter from a plurality of parameters configured by the higher layer.

When one PDSCH is received in a primary cell indicated by detection of a corresponding PDCCH/EPDCCH and the UL-DL configuration of the primary cell belongs to 0, the mobile station devices 1 may select one resource of the PUCCH format 1a/1b using the method of implicitly being determined or the method of explicitly being determined. On this occasion, no PDSCH is received in a secondary cell. The secondary cell may not be configured.

When one PDSCH is received in a primary cell indicated by detection of a corresponding PDCCH/EPDCCH, the UL-DL configuration of the primary cell belongs to one of 1 to 6, and the value of a DAI (Downlink Assignment Index) field of the DCI transmitted by the PDCCH/EPDCCH is equal to 1, the mobile station devices 1 may select one resource of the PUCCH format 1a/1b using the method of implicitly being determined or the method of explicitly being determined. On this occasion, no PDSCH is received in a secondary cell. The secondary cell may not be configured.

In an uplink subframe in which HARQ response information to PDSCH transmission in a plurality of downlink subframes can be transmitted, when one PDSCH is received in a primary cell indicated by detection of a corresponding PDCCH, the UL-DL configuration of the primary cell belongs to one of 1 to 6, and the value of the DAI (Downlink Assignment Index) field of the DCI transmitted by the corresponding PDCCH is greater than 1, the mobile station devices 1 may select one resource of the PUCCH format 3 using the method of explicitly being determined. On this occasion, the TPC command field of the DCI with the DAI having a value greater than 1 may be used to select one parameter from a plurality of parameters to the PUCCH format 3.

In an uplink subframe in which HARQ response information to PDSCH transmission in a plurality of downlink subframes can be transmitted, when one PDSCH is received in a primary cell indicated by detection of a corresponding EPDCCH, the UL-DL configuration of the primary cell belongs to one of 1 to 6, and the value of the DAI (Downlink Assignment Index) of the DCI transmitted by the corresponding EPDCCH is greater than 1, the mobile station devices 1 may select one resource of the PUCCH format 3 using the method of explicitly being determined. On this occasion, the ARO field of the DCI having a value greater than 1 may be used to select one parameter from a plurality of parameters to the PUCCH format 3.

When at least one PDSCH is received in the secondary cell, the mobile station devices 1 may select one resource of the PUCCH format 3 using the method of explicitly being determined. On this occasion, the TPC command field of the DCI transmitted by a PDCCH/EPDCCH corresponding to the PDSCH in the secondary cell may be used to select one parameter from a plurality of parameters to the PUCCH format 3. On this occasion, when one PDSCH is received in the primary cell indicated by detection of a corresponding PDCCH, and the UL-DL configuration of the primary cell belongs to one of 1 to 6, the TPC command field of the DCI with the DAI having a value greater than 1 may be used to select one parameter from a plurality of parameters to the PUCCH format 3. On this occasion, when one PDSCH is received in the primary cell indicated by detection of a corresponding EPDCCH, and the UL-DL configuration of the primary cell belongs to one of 1 to 6, the ARO field of the DCI with the DAI having a value greater than 1 may be used to select one parameter from a plurality of parameters to the PUCCH format 3. On this occasion, the mobile station devices 1 may consider that the ARO field and the TPC command field which are used to select one parameter from a plurality of parameters to the PUCCH format 3 and transmitted in the primary cell and each secondary cell represent the same parameters.

That is, the mobile station devices 1 may select the method of implicitly being determined first method or the method of explicitly being determined, based on the UL-DL configuration of the primary cell, the DAI, where or not the PDSCH is received by the secondary cell, whether or not the secondary cell is configured, or the like.

The DAI is transmitted when the UL-DL configuration belongs to one of 1 to 6. The DAI represents the cumulative value of PDCCH/EPDCCH(s) which allocates PDSCH transmission and PDCCH/EPDCCH(s) indicating a downlink SPS resource up-to-present subframe(s) among a plurality of downlink subframes corresponding to one uplink subframe, in which HARQ response information to PDSCH transmission in a plurality of downlink subframes can be transmitted.

A program operating in the base station device 3 and the mobile station device 1 of the invention is a program (a program for causing a computer to function) to control a CPU (Central Processing Unit) and the like so as to implement the functions of the foregoing embodiment of the invention. Information which is handled by the devices is temporarily accumulated in a RAM (Random Access Memory) while processed, and is then stored in various ROMs, such as a Flash ROM (Read Only Memory), or an HDD (Hard Disk Drive). Information is read by the CPU as necessary, and is modified and written.

Part of the mobile station device 1 and the base station device 3 in the foregoing embodiment may be implemented by a computer. In this case, a program for implementing the control function may be recorded in a computer-readable recording medium, and the program recorded in the recording medium may be read on a computer system and executed.

The term "computer system" used herein is a computer system which is incorporated in the mobile station device 1 or the base station device 3, and includes an OS or hardware, such as peripherals. The term "computer-readable recording medium" refers to a portable medium, such as a flexible disk, a magneto-optical disk, a ROM, or a CD-ROM, or a storage device, such as a hard disk incorporated in the computer system.

The term "computer-readable recording medium" may include a medium which holds the program in a short period of time or dynamically, such as a communication line when transmitting the program through a network, such as Internet, or a communication line, such as a telephone line, and a medium which holds the program in a certain period of time, such as a volatile memory inside the computer system to be a server or a client. The program may implement some of the above-described functions or may implement the above-described functions in combination with the program already recorded in the computer system.

The base station device 3 in the foregoing embodiment may be implemented as an aggregate (device group) of a plurality of devices. Each device in the device group may include part or all of the functions or the function blocks of the base station device 3 of the foregoing embodiment. As the device group, the general functions or functional blocks of the base station device 3 may be provided. The mobile station device 1 of the foregoing embodiment may communicate with the base station device as an aggregate.

The base station device 3 in the foregoing embodiment may be EUTRAN (Evolved Universal Terrestrial Radio Access Network). The base station device 3 in the foregoing embodiment may have part or all of the functions of a higher node to eNodeB.

Part or all of the mobile station device 1 and the base station device 3 of the foregoing embodiment may be typically implemented as an LSI, which is an integrated circuit, or may be implemented as a chipset. The functional blocks of the mobile station device 1 and the base station device 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the foregoing embodiment, a mobile station device has been described as a terminal device or a communication device, the invention is not limited thereto and may be applied to stationary or immovable electronic apparatuses indoors and outdoors, for example, terminal devices, such as an AV system, kitchen equipment, cleaning and washing equipment, air conditioning equipment, office equipment, vending machine, and other living appliances, or communication devices.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

INDUSTRIAL APPLICABILITY

The embodiment of the invention can be applied to a terminal, a base station, a communication method, and the like which have a necessity of efficient communication of a mobile station device and a base station device with each other in a radio communication system using a control channel.

DESCRIPTION OF REFERENCE NUMERALS 1 (1A, 1B, 1C) mobile station device
3 base station device
101 higher layer processing unit
103 control unit
105 reception unit
107 transmission unit
301 higher layer processing unit
303 control unit
305 reception unit
307 transmission unit
1011 radio resource control unit
1013 subframe configuration unit
1015 scheduling information interpretation unit
1017 CSI report control unit
3011 radio resource control unit
3013 subframe configuration unit
3015 scheduling unit
3017 CSI report control unit

The invention claimed is:

1. A terminal comprising:
higher layer processing circuitry that sets a first uplink-downlink configuration;
reception circuitry that monitors an enhanced physical downlink control channel; and
transmission circuitry that, upon a detection of the enhanced physical downlink control channel, transmits a physical uplink control channel in a subframe n, using one of physical uplink control channel resources for channel selection, wherein
in a case that the terminal is not configured with a second uplink-downlink configuration, the physical uplink control channel resources correspond to elements within a first downlink association set for the subframe n, the first downlink association set being defined in a first table, and
in a case that the terminal is configured with the second uplink-downlink configuration, the physical uplink control channel resources consist of a first portion of the physical uplink control channel resources and a remaining portion of the physical uplink control channel resources in an order of the first portion first and then the remaining portion, the first portion corresponds to the elements within the first downlink association set, and the remaining portion corresponds to elements within a second downlink association set for the subframe n, the second downlink association set being defined in a second table.

2. The terminal of claim 1, wherein
the first table defines downlink association sets with respect to the first uplink-downlink configuration, and
the second table defines downlink association sets with respect to a combination of the first uplink-downlink configuration and the second uplink-downlink configuration.

3. The terminal of claim 1, wherein
the first uplink-downlink configuration is carried by a system information block type 1 (SIB1) message, and
the second uplink-downlink configuration is carried by a radio resource control (RRC) message dedicated to the terminal.

4. The terminal of claim 1, wherein
the physical uplink control channel carries HARQ-ACK for a physical downlink shared channel which is indicated by detection of the enhanced physical downlink control channel or for the enhanced physical downlink control channel indicating a semi-persistent-scheduling (SPS) release.

5. A base station comprising:
higher layer processing circuitry that configures a terminal with a first uplink-downlink configuration;
transmission circuitry that transmits an enhanced physical downlink control channel; and
reception circuitry that, upon a transmission of the enhanced physical downlink control channel, receives a physical uplink control channel in a subframe n, using one of physical uplink control channel resources for channel selection, wherein
in a case that the terminal is not configured with a second uplink-downlink configuration, the physical uplink control channel resources correspond to elements within a first downlink association set for the subframe n, the first downlink association set being defined in a first table, and
in a case that the terminal is configured with the second uplink-downlink configuration, the physical uplink control channel resources consist of a first portion of the physical uplink control channel resources and a remaining portion of the physical uplink control channel resources in an order of the first portion first and then the remaining portion, the first portion corresponds to the elements within the first downlink association set, and the remaining portion corresponds to elements within a second downlink association set for the subframe n, the second downlink association set being defined in a second table.

6. The base station of claim 5, wherein
the first table defines downlink association sets with respect to the first uplink-downlink configuration, and
the second table defines downlink association sets with respect to a combination of the first uplink-downlink configuration and the second uplink-downlink configuration.

7. The base station of claim 5, wherein
the first uplink-downlink configuration is carried by a system information block type 1 (SIB1) message, and
the second uplink-downlink configuration is carried by a radio resource control (RRC) message dedicated to the terminal.

8. The base station of claim 5, wherein
the physical uplink control channel carries HARQ-ACK for a physical downlink shared channel which is indicated by detection of the enhanced physical downlink control channel or for the enhanced physical downlink control channel indicating a semi-persistent-scheduling (SPS) release.

9. A communication method of a terminal, comprising:
setting a first uplink-downlink configuration;
monitoring an enhanced physical downlink control channel; and
upon a detection of the enhanced physical downlink control channel, transmitting a physical uplink control channel in a subframe n, using one of physical uplink control channel resources for channel selection, wherein
in a case that the terminal is not configured with a second uplink-downlink configuration, the physical uplink control channel resources correspond to elements within a first downlink association set for the subframe n, the first downlink association set being defined in a first table, and
in a case that the terminal is configured with the second uplink-downlink configuration, the physical uplink control channel resources consist of a first portion of the physical uplink control channel resources and a remaining portion of the physical uplink control channel resources in an order of the first portion first and then the remaining portion, the first portion corresponds to the elements within the first downlink association set, and the remaining portion corresponds to elements within a second downlink association set for the subframe n, the second downlink association set being defined in a second table.

10. A communication method of a base station, comprising:
configuring a terminal with a first uplink-downlink configuration;
transmitting an enhanced physical downlink control channel; and
upon a transmission of the enhanced physical downlink control channel, receiving a physical uplink control channel in a subframe n, by using one of physical uplink control channel resources for channel selection, wherein
in a case that the terminal is not configured with a second uplink-downlink configuration, the physical uplink control channel resources correspond to elements within a first downlink association set for the subframe n, the first downlink association set being defined in a first table, and
in a case that the terminal is configured with the second uplink-downlink configuration, the physical uplink control channel resources consist of a first portion of the physical uplink control channel resources and a remaining portion of the physical uplink control channel resources in an order of the first portion first and then the remaining portion, the first portion corresponds to elements within the first downlink association set, and the remaining portion corresponds to the elements within a second downlink association set for the subframe n, the second downlink association set being defined in a second table.

* * * * *